(12) United States Patent
Walton et al.

(10) Patent No.: US 8,233,462 B2
(45) Date of Patent: Jul. 31, 2012

(54) HIGH SPEED MEDIA ACCESS CONTROL AND DIRECT LINK PROTOCOL

(75) Inventors: Jay Rodney Walton, Carlisle, MA (US); Sanjiv Nanda, Ramona, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/964,314

(22) Filed: Oct. 13, 2004

(65) Prior Publication Data

US 2005/0135295 A1 Jun. 23, 2005

Related U.S. Application Data

(60) Provisional application No. 60/511,750, filed on Oct. 15, 2003, provisional application No. 60/511,904, filed on Oct. 15, 2003, provisional application No. 60/513,239, filed on Oct. 21, 2003, provisional application No. 60/526,347, filed on Dec. 1, 2003, provisional application No. 60/526,356, filed on Dec. 1, 2003, provisional application No. 60/532,791, filed on Dec. 23, 2003, provisional application No. 60/545,963, filed on Feb. 18, 2004, provisional application No. 60/576,545, filed on Jun. 2, 2004, provisional application No. 60/586,841, filed on Jul. 8, 2004, provisional application No. 60/600,960, filed on Aug. 11, 2004.

(51) Int. Cl.
*H04B 7/212* (2006.01)
*H04W 4/00* (2009.01)
(52) U.S. Cl. .................. 370/338; 370/321; 370/328
(58) Field of Classification Search .......... 370/236–469; 455/450–452; 709/230–241
See application file for complete search history.

(56) References Cited

U.S. PATENT DOCUMENTS

| | | | |
|---|---|---|---|
| 4,747,100 A | 5/1988 | Roach et al. | |
| 4,750,171 A | 6/1988 | Kedar et al. | |
| 5,081,623 A | 1/1992 | Ainscow | |
| 5,133,081 A | 7/1992 | Mayo | |

(Continued)

FOREIGN PATENT DOCUMENTS

CN 1263675 8/2000

(Continued)

OTHER PUBLICATIONS

International Search Report, PCT/US04/034259—International Search Authority—European Patanet Office—Mar. 7, 2005.

(Continued)

*Primary Examiner* — Man Phan
(74) *Attorney, Agent, or Firm* — Qualcomm Patent Group; Thien T. Nguyen; James H. Yancey, Jr.

(57) ABSTRACT

Techniques for MAC processing for efficient use of high throughput systems that may be backward compatible with various types of legacy systems are disclosed. In one aspect, a data frame is formed comprising a common portion for transmission in a format receivable by various stations, such as access points and remote stations. The data frame also comprises a dedicated portion, formatted for transmission to a specified remote station. In another aspect, the common portion is unsteered, and the dedicated portion is steered. In another aspect, an access point schedules an allocation in response to a data indication included in a common portion of a data frame transmitted from one remote station to another. In another aspect, a first station transmits a reference to a second station, which measures the reference and generates feedback therefrom.

18 Claims, 41 Drawing Sheets

U.S. PATENT DOCUMENTS

| | | | |
|---|---|---|---|
| 5,276,703 A | 1/1994 | Budin et al. ..................... 375/1 |
| 5,280,476 A | 1/1994 | Kojima et al. |
| 5,297,144 A * | 3/1994 | Gilbert et al. ................. 370/346 |
| 5,384,777 A | 1/1995 | Ahmadi et al. |
| 5,444,702 A | 8/1995 | Burnett et al. |
| 5,638,371 A * | 6/1997 | Raychaudhuri et al. ... 370/310.2 |
| 5,677,909 A * | 10/1997 | Heide ........................... 370/347 |
| 5,684,791 A | 11/1997 | Raychaudhuri et al. |
| 5,719,868 A | 2/1998 | Young |
| 5,729,542 A * | 3/1998 | Dupont ........................ 370/346 |
| 5,818,842 A | 10/1998 | Burkki et al. |
| 5,923,650 A | 7/1999 | Chen et al. |
| 5,970,059 A | 10/1999 | Ahopelto et al. |
| 5,974,045 A | 10/1999 | Ohkura et al. |
| 6,002,691 A * | 12/1999 | Citta et al. .................... 370/447 |
| 6,014,087 A * | 1/2000 | Krishnakumar et al. ..... 710/240 |
| 6,069,886 A | 5/2000 | Ayerst et al. |
| 6,098,142 A | 8/2000 | Leggett et al. |
| 6,111,927 A | 8/2000 | Sokoler |
| 6,130,886 A * | 10/2000 | Ketseoglou et al. .......... 370/347 |
| 6,252,854 B1 | 6/2001 | Hortensius et al. |
| 6,256,317 B1 * | 7/2001 | Holloway et al. ............. 370/447 |
| 6,307,846 B1 | 10/2001 | Willey |
| 6,404,751 B1 * | 6/2002 | Roark et al. ................... 370/330 |
| 6,433,737 B2 | 8/2002 | Katz |
| 6,438,104 B1 | 8/2002 | Fodor et al. |
| 6,452,917 B1 | 9/2002 | Leung |
| 6,456,599 B1 | 9/2002 | Elliott |
| 6,483,819 B1 | 11/2002 | Take et al. |
| 6,504,506 B1 | 1/2003 | Thomas et al. |
| 6,512,773 B1 | 1/2003 | Scott |
| 6,532,225 B1 * | 3/2003 | Chang et al. ................. 370/341 |
| 6,542,490 B1 | 4/2003 | Ahmadvand et al. |
| 6,553,020 B1 | 4/2003 | Hughes et al. |
| 6,563,816 B1 | 5/2003 | Nodoushani et al. ......... 370/352 |
| 6,574,237 B1 | 6/2003 | Bullman et al. |
| 6,580,704 B1 | 6/2003 | Wellig et al. |
| 6,587,441 B1 * | 7/2003 | Urban et al. ................... 370/310 |
| 6,600,754 B1 | 7/2003 | Young et al. |
| 6,609,866 B2 | 8/2003 | Huang et al. |
| 6,611,525 B1 | 8/2003 | Rochberger et al. |
| 6,611,529 B1 * | 8/2003 | Krishnakumar et al. ..... 370/437 |
| 6,621,805 B1 | 9/2003 | Kondylis et al. |
| 6,621,827 B1 | 9/2003 | Rezvani et al. |
| 6,625,171 B1 | 9/2003 | Matsudo |
| 6,633,564 B1 | 10/2003 | Steer et al. |
| 6,643,260 B1 | 11/2003 | Kloth et al. |
| 6,671,511 B1 | 12/2003 | Forssell et al. |
| 6,724,740 B1 * | 4/2004 | Choi et al. .................... 370/335 |
| 6,741,635 B2 | 5/2004 | Lo et al. |
| 6,751,187 B2 | 6/2004 | Walton et al. |
| 6,760,388 B2 | 7/2004 | Ketchum et al. |
| 6,768,730 B1 | 7/2004 | Whitehill |
| 6,771,706 B2 | 8/2004 | Ling et al. |
| 6,788,702 B1 | 9/2004 | Garcia-Luna-Aceves et al. |
| 6,791,962 B2 * | 9/2004 | Wentink ....................... 370/338 |
| 6,791,996 B1 | 9/2004 | Watanabe et al. |
| 6,795,409 B1 * | 9/2004 | Youssefmir et al. .......... 370/328 |
| 6,795,418 B2 | 9/2004 | Choi |
| 6,795,419 B2 | 9/2004 | Parantainen |
| 6,813,260 B1 * | 11/2004 | Fogle ........................... 370/338 |
| 6,847,626 B1 * | 1/2005 | Carneal et al. ................ 370/345 |
| 6,868,133 B2 | 3/2005 | Hicks et al. |
| 6,898,441 B1 | 5/2005 | Kogiantis et al. |
| 6,907,020 B2 | 6/2005 | Periyalwar et al. |
| 6,912,225 B1 | 6/2005 | Kohsuki et al. |
| 6,944,688 B1 | 9/2005 | Batcher |
| 6,961,311 B2 * | 11/2005 | Rakotoarivelo et al. ...... 370/238 |
| 6,963,549 B1 * | 11/2005 | Jayaraman et al. ........... 370/328 |
| 6,977,944 B2 | 12/2005 | Brockmann et al. |
| 7,006,848 B2 | 2/2006 | Ling et al. |
| 7,031,274 B2 * | 4/2006 | Sherman ...................... 370/321 |
| 7,031,287 B1 * | 4/2006 | Ho et al. ....................... 370/338 |
| 7,046,639 B2 | 5/2006 | Garcia-Luna-Aceves et al. |
| 7,046,654 B2 | 5/2006 | Chen |
| 7,046,690 B2 * | 5/2006 | Sherman ...................... 370/445 |
| 7,058,074 B2 | 6/2006 | Ho et al. |
| 7,065,144 B2 | 6/2006 | Walton et al. |
| 7,068,633 B1 * | 6/2006 | Ho ................................ 370/338 |
| 7,079,552 B2 | 7/2006 | Cain et al. |
| 7,082,117 B2 * | 7/2006 | Billhartz ....................... 370/338 |
| 7,085,281 B2 | 8/2006 | Thomas et al. |
| 7,092,737 B2 | 8/2006 | Horng et al. |
| 7,095,732 B1 | 8/2006 | Watson, Jr. |
| 7,099,300 B2 | 8/2006 | Sugaya |
| 7,099,671 B2 * | 8/2006 | Liang ........................... 455/450 |
| 7,116,652 B2 | 10/2006 | Lozano |
| 7,123,627 B2 | 10/2006 | Kowalski |
| 7,130,289 B2 | 10/2006 | Kuan et al. |
| 7,142,527 B2 | 11/2006 | Garcia-Luna-Aceves |
| 7,145,895 B2 | 12/2006 | Mueckenheim et al. |
| 7,149,245 B2 | 12/2006 | Budka et al. |
| 7,154,876 B2 * | 12/2006 | Benveniste ................... 370/342 |
| 7,158,504 B2 | 1/2007 | Kadaba et al. |
| 7,158,803 B1 | 1/2007 | Elliott |
| 7,187,691 B2 * | 3/2007 | Gavette ........................ 370/445 |
| 7,203,192 B2 | 4/2007 | Desai et al. |
| 7,206,083 B2 | 4/2007 | Shimada |
| 7,236,459 B1 | 6/2007 | Okholm et al. |
| 7,260,073 B2 | 8/2007 | Sipola |
| 7,263,083 B2 | 8/2007 | Kisigami et al. |
| 7,266,087 B2 | 9/2007 | Wahl |
| 7,269,152 B2 | 9/2007 | Vukovic et al. |
| 7,274,707 B2 * | 9/2007 | Choi et al. .................... 370/445 |
| 7,277,149 B2 | 10/2007 | Kim et al. |
| 7,277,419 B2 | 10/2007 | McGowan |
| 7,277,430 B2 | 10/2007 | Ono et al. |
| 7,280,513 B2 | 10/2007 | Cao et al. |
| 7,284,260 B2 | 10/2007 | Hilts et al. |
| 7,301,924 B1 | 11/2007 | Gurbuz et al. |
| 7,301,944 B1 | 11/2007 | Redmond |
| 7,313,104 B1 | 12/2007 | Kern et al. |
| 7,330,877 B2 | 2/2008 | Kandala |
| 7,333,556 B2 | 2/2008 | Maltsev et al. |
| 7,336,642 B2 | 2/2008 | Rich et al. |
| 7,342,940 B2 * | 3/2008 | Park ............................. 370/470 |
| 7,366,202 B2 | 4/2008 | Scherzer et al. |
| 7,372,855 B2 | 5/2008 | Kandala |
| 7,400,641 B2 | 7/2008 | Nitschke et al. |
| 7,400,642 B2 | 7/2008 | Koo et al. |
| 7,417,974 B2 | 8/2008 | Hansen |
| 7,440,573 B2 | 10/2008 | Lor et al. |
| 7,450,550 B2 | 11/2008 | Jin |
| 7,512,070 B2 | 3/2009 | Stephens |
| 7,525,994 B2 | 4/2009 | Scholte |
| 7,564,814 B2 | 7/2009 | Abraham et al. |
| 7,570,656 B2 | 8/2009 | Raphaeli et al. |
| 7,599,340 B2 | 10/2009 | Chandra et al. |
| 7,633,946 B2 | 12/2009 | Pavon et al. |
| 7,639,657 B1 * | 12/2009 | Ho et al. ....................... 370/338 |
| 7,706,399 B2 | 4/2010 | Janczak |
| 7,724,721 B2 | 5/2010 | Lim et al. |
| 7,869,432 B1 | 1/2011 | Mollyn |
| 7,881,340 B2 * | 2/2011 | Farrag et al. .................. 370/468 |
| 2001/0024173 A1 | 9/2001 | Katz |
| 2001/0053141 A1 | 12/2001 | Periyalwar et al. |
| 2002/0009999 A1 | 1/2002 | Lee et al. |
| 2002/0021698 A1 | 2/2002 | Lee et al. |
| 2002/0046257 A1 | 4/2002 | Killmer |
| 2002/0067736 A1 | 6/2002 | Garcia-Luna-Aceves et al. |
| 2002/0071413 A1 | 6/2002 | Choi |
| 2002/0071449 A1 | 6/2002 | Ho et al. |
| 2002/0093929 A1 * | 7/2002 | Mangold et al. .............. 370/336 |
| 2002/0172186 A1 | 11/2002 | Larsson |
| 2002/0172217 A1 | 11/2002 | Kadaba et al. |
| 2002/0174219 A1 | 11/2002 | Mei et al. |
| 2002/0191703 A1 | 12/2002 | Ling et al. |
| 2003/0002605 A1 | 1/2003 | Lo et al. |
| 2003/0003880 A1 | 1/2003 | Ling et al. |
| 2003/0043732 A1 | 3/2003 | Walton et al. |
| 2003/0063563 A1 | 4/2003 | Kowalski |
| 2003/0076797 A1 | 4/2003 | Lozano |
| 2003/0108117 A1 | 6/2003 | Ketchum et al. |
| 2003/0125040 A1 | 7/2003 | Walton et al. |
| 2003/0128684 A1 * | 7/2003 | Hirsch et al. ................. 370/338 |
| 2003/0147385 A1 | 8/2003 | Montalvo et al. |
| 2003/0169763 A1 * | 9/2003 | Choi et al. .................... 370/462 |

| | | | |
|---|---|---|---|
| 2003/0174645 A1 | 9/2003 | Paratainen et al. | |
| 2003/0174680 A1* | 9/2003 | Kuan et al. | 370/338 |
| 2003/0198312 A1 | 10/2003 | Budka et al. | |
| 2003/0202574 A1 | 10/2003 | Budka et al. | |
| 2003/0223365 A1 | 12/2003 | Kowalski | |
| 2003/0223418 A1* | 12/2003 | Desai et al. | 370/389 |
| 2004/0042556 A1 | 3/2004 | Medvedev et al. | |
| 2004/0047319 A1* | 3/2004 | Elg | 370/338 |
| 2004/0082356 A1 | 4/2004 | Walton et al. | |
| 2004/0105386 A1 | 6/2004 | Sipola | |
| 2004/0109433 A1 | 6/2004 | Khan | |
| 2004/0120349 A1 | 6/2004 | Border et al. | |
| 2004/0125778 A1* | 7/2004 | Lin et al. | 370/338 |
| 2004/0131019 A1 | 7/2004 | Kandala | |
| 2004/0151199 A1 | 8/2004 | Sykes et al. | |
| 2004/0156345 A1 | 8/2004 | Steer et al. | |
| 2004/0156367 A1 | 8/2004 | Albuquerque et al. | |
| 2004/0163129 A1 | 8/2004 | Chapman et al. | |
| 2004/0204104 A1 | 10/2004 | Horng et al. | |
| 2004/0246934 A1 | 12/2004 | Kim | |
| 2004/0252664 A1 | 12/2004 | Cao et al. | |
| 2004/0258039 A1 | 12/2004 | Stephens | |
| 2004/0258091 A1 | 12/2004 | Meyer et al. | |
| 2004/0264504 A1* | 12/2004 | Jin | 370/469 |
| 2004/0266451 A1 | 12/2004 | Stolyar et al. | |
| 2005/0036475 A1 | 2/2005 | Nishiyama et al. | |
| 2005/0047429 A1* | 3/2005 | Koo et al. | 370/447 |
| 2005/0053003 A1 | 3/2005 | Cain et al. | |
| 2005/0053064 A1 | 3/2005 | Wang | |
| 2005/0058078 A1 | 3/2005 | Jung et al. | |
| 2005/0111462 A1 | 5/2005 | Walton et al. | |
| 2005/0135284 A1* | 6/2005 | Nanda et al. | 370/294 |
| 2005/0135291 A1 | 6/2005 | Ketchum et al. | |
| 2005/0135318 A1* | 6/2005 | Walton et al. | 370/338 |
| 2005/0135403 A1 | 6/2005 | Ketchum et al. | |
| 2005/0135416 A1 | 6/2005 | Ketchum et al. | |
| 2005/0152465 A1 | 7/2005 | Maltsev et al. | |
| 2005/0239407 A1* | 10/2005 | Foore et al. | 455/63.4 |
| 2006/0052088 A1 | 3/2006 | Pavon et al. | |
| 2006/0092871 A1 | 5/2006 | Nishibayashi et al. | |
| 2006/0099956 A1* | 5/2006 | Harada et al. | 455/452.2 |
| 2006/0159123 A1 | 7/2006 | Fleury et al. | |
| 2006/0164969 A1* | 7/2006 | Malik et al. | 370/203 |
| 2006/0165021 A1* | 7/2006 | Tian et al. | 370/310 |
| 2006/0165036 A1 | 7/2006 | Chandra et al. | |
| 2006/0193294 A1 | 8/2006 | Jorswieck et al. | |
| 2006/0268886 A1 | 11/2006 | Sammour et al. | |
| 2006/0274844 A1 | 12/2006 | Walton et al. | |
| 2007/0037548 A1 | 2/2007 | Sammour et al. | |
| 2007/0058543 A1 | 3/2007 | Fenart et al. | |
| 2007/0058605 A1* | 3/2007 | Meylan et al. | 370/346 |
| 2007/0141522 A1* | 6/2007 | Borders et al. | 431/354 |
| 2007/0230338 A1 | 10/2007 | Shao et al. | |
| 2008/0130660 A1* | 6/2008 | Ros-Giralt et al. | 370/400 |
| 2009/0097444 A1* | 4/2009 | Lohr et al. | 370/329 |
| 2009/0103558 A1* | 4/2009 | Zangi et al. | 370/447 |
| 2009/0116434 A1* | 5/2009 | Lohr et al. | 370/329 |
| 2010/0290423 A1 | 11/2010 | Hwang et al. | |
| 2010/0309872 A1* | 12/2010 | Amini et al. | 370/329 |

FOREIGN PATENT DOCUMENTS

| | | |
|---|---|---|
| CN | 1350733 | 5/2002 |
| EP | 0475682 | 5/1991 |
| EP | 0782360 A2 | 7/1997 |
| EP | 0912016 A2 | 4/1999 |
| EP | 1052855 | 11/2000 |
| EP | 1182900 | 2/2001 |
| EP | 1089500 A2 | 4/2001 |
| EP | 1187406 A1 | 3/2002 |
| EP | 1261183 | 11/2002 |
| EP | 1317110 | 6/2003 |
| EP | 1463217 A1 | 9/2004 |
| JP | 2000174820 A | 6/2000 |
| JP | 2001160813 A | 6/2001 |
| JP | 2001160843 A | 6/2001 |
| JP | 2001507907 T | 6/2001 |
| JP | 2001522211 | 11/2001 |
| JP | 200360655 | 2/2003 |
| JP | 2003078565 | 3/2003 |
| JP | 2003249939 | 9/2003 |
| JP | 2003258807 A | 9/2003 |
| JP | 2003528507 A | 9/2003 |
| JP | 2003289309 A | 10/2003 |
| JP | 2005020163 A | 1/2005 |
| JP | 2005505148 T | 2/2005 |
| KR | 2003-0036847 | 5/2003 |
| KR | 20040076979 A | 9/2004 |
| KR | 2006-0090258 | 8/2006 |
| KR | 2006-0090259 | 8/2006 |
| TW | 200304292 | 9/2003 |
| TW | 200401549 | 1/2004 |
| WO | WO 9625811 A1 | 8/1996 |
| WO | 9905881 | 2/1999 |
| WO | WO 9957931 A1 | 11/1999 |
| WO | 0056113 | 9/2000 |
| WO | WO 0052880 A2 | 9/2000 |
| WO | WO 0119032 A1 | 3/2001 |
| WO | WO0128170 A2 | 4/2001 |
| WO | WO0171928 A2 | 9/2001 |
| WO | WO0176110 A2 | 10/2001 |
| WO | WO 0213440 A2 | 2/2002 |
| WO | 0228119 | 4/2002 |
| WO | 0233852 | 4/2002 |
| WO | WO0233582 | 4/2002 |
| WO | WO 0235873 A2 | 5/2002 |
| WO | WO02065664 A2 | 8/2002 |
| WO | 02082751 | 10/2002 |
| WO | 02093843 | 11/2002 |
| WO | 03032526 | 4/2003 |
| WO | WO03034619 A1 | 4/2003 |
| WO | WO03039074 A1 | 5/2003 |
| WO | WO03050968 A2 | 6/2003 |
| WO | WO 03107577 A2 | 12/2003 |
| WO | WO2004030287 A2 | 4/2004 |
| WO | WO2004038985 A2 | 5/2004 |
| WO | 2005039127 | 4/2005 |
| WO | 2005039133 | 4/2005 |

OTHER PUBLICATIONS

ETSI TS 125 211 v5.6.0; "Universal Mobile Telecommunications System (UMTS); Physical channels and mapping of transport channels onto physical channels (FDD)", 3GPP TS 25.211 version 5.1.0 Release 5 (Sep. 2004).
ETSI TS 125 212 v6.2.0; "Universal Mobile Telecommunications System (UMTS); Multiplexing and channel coding (FDD)", 3G TS 25.212 version 6.2.0 Release 5 (Jun. 2004).
ETSI TS 125 213 v6.0.0; "Universal Mobile Telecommunications System (UMTS); Spreading and modulation (FDD)", 3G TS 25.213 version 6.0.0 Release 5 (Dec. 2003).
ETSI TS 125 214 v6.3.0; "Universal Mobile Telecommunications System (UMTS); Physical layer procedures (FDD)", 3G TS 25.214 version 6.3.0 Release 5 (Sep. 2004).
3GPP2-C.S0002-C v1.0, "Physical Layer Standard for cdma2000 Spread Spectrum Systems", (TR 45.5), Release C, May 28, 2002.
TIA/EIA/-95-B; "Mobile Station-Base Station Compatibility Standard for Dual-Mode Wideband Spread Spectrum Cellular System", Mar. 1999.
Seung et al.,:"Multi-Stage Partial PIC Receivers for Multi-Rate DS-CDMA System with Multiple Modulaton", IEEE 2003, pp. 591-594.
Won-Tae et al., : "MMAC : An Efficient WMATM MAC for Multicast Communications", Global Telecommunications Conference—Globecom '99, IEEE , pp. 587-591.
"TIA/EIA/IS-856 Standard" CDMA2000 High Rate Packet Data Air Interface Specification, Nov. 2000, (the IS-856 standard).
3GPP2 TS 25.211: "Physical channels and mapping of transport channels onto physical channels (FDD)", Release 6, V.6.0.0, Dec. 2003.
3GPP2 TS 25.212: "Multiplexing and channel coding (FDD)", Release 5, V.510.0, Jun. 2005.
3GPP2 TS 25.213: "Spreading and modulation (FDD)", Release 5, V.5.6.0, Jun. 2005.
3GPP2 TS 25.214: "Physical layer procedures (FDD)", Release 5, V5.11.0, Jun. 2005.

TIA/EIA-95-B Mobile Station-Base Station Compatibility Standard for Dual-Mode Wideband Spread Spectrum Cellular System (IS-95 Standard), Mar. 1999.

TR-45.5 "Physical Layer Standard for cdma2000 Spread Spectrum Systems", (the IS-2000 standard).

"A Wireless Token Ring Protocol for Ad-Hoc Networks," IEEE Aerospace Conference Proceedings, 2002. vol. 3, pp. 6-1219 to 3-1228.

3GPP TS 25.211 v5.0.0 (Mar. 2002) Technical Specification Group Radio Access Network; Physical Channels and Mapping of Transport Channels onto Physical Channels (FDD) (Release 5).

3GPP TS 25.212 v6.0.0 (Dec. 2003) Technical Specification Group Radio Access Network; Multiplexing and Channel Coding (FDD) (Release 6).

3GPP TS 25.213 v6.0.0 (Dec. 2003) Technical Specification Group Radio Access Network; Spreading and Modulation (FDD) (Release 6).

3GPP TS 25.214 v6.0.0 (Dec. 2003) Technical Specification Group Radio Access Network; Physical Layer Procedures (FDD) (Release 6).

ETSI TS 125 211 v5.1.0; "Universal Mobile Telecommunications System (UMTS); Physical channels and mapping of transport channels onto physical channels (FDD)", 3GPP TS 25.211 version 5.1.0 Release 5 (Sep. 2004).

IEEE Std. 802.11a-1999 Part 11: Wireless LAN Medium Access Control (MAC) and Physical Layer (PHY) Specifications: High-speed Physical Layer in the 5 GHZ Band.

IEEE Std. 802.11b-1999 Part 11: Wireless LAN Medium Access Control (MAC) and Physical Layer (PHY) Specifications: Higher-Speed Physical Layer Extension in the 2.4 GHz Band.

IEEE Std. 802.11g-2003 Part 11: Wireless LAN Medium Access Control (MAC) and Physical Layer (PHY) Specifications, Amendment 4: Further Higher Data Rate Extension in the 2.4 GHz Band.

Mangold, et al.: "IEEE 802.11e Wireless LAN for Quality of Service," Feb. 2002, pp. 1-8, XP002251598.

Mujtaba, "TGN Sync Proposal Technical Specification," IEEE Wireless LANS, IEEE 802.11-04/0899r5, May 2005, pp. 1-134.

TIA/EIA/IS-856-A, "CDMA 2000 High Rate Packet Data Air Interface Specification", (Revision of TIA/EIA/IS-856), Apr. 2004.

TR-45.5 Physical Layer Standard for CDMA 2000 Spread Spectrum Systems, 3GPP2 C.S000-2D, Version 1.0, Feb. 13, 2004.

3GPP TS 25.211 'Physical channels and mapping of transport channels onto physical channels (FDD). Release 5, V5.0.0, Mar. 2002.

3GPP: "TIA/EIA/IS-95-B Mobile Station-Base Station Compatibility Standard for Wideband Spread Spectrum Cellular System". Feb 3, 1999.

ETSI TS 125 213 v6.0.0; "Universal Mobile Telecommunications System (UMTS); Spreading and modulation (FDD)", 3G TS 25.213 version 6.0.0 Release 6 (Dec. 2003).

European Search Report—EP10176962, Search Authority—Munich Patent Office, Nov. 5, 2010.

Miyashita, K. et al. "Eigenbeam Space Division Multiplexing (E-SDM) in a MIMO Channel", Technical Research Report by Electric Information Communication Academic Conference, May 17, 2002, vol. 102, No. 86, pp. 13-18, RCS2002-53.

Taiwanese Search report—095132750—TIPO—Nov. 15, 2010.

IEEE Std. 802.11e-2003 Part 11: Wireless LAN Medium Access Control (MAC) and Physical Layer (PHY) Specifications, Amendment 4: Further Higher Data Rate Extension in the 2.4 GHz Band.

Edfors et al, "OFDM Channel Estimation by Singular Value Decomposition," IEEE Transactions on Communications, 46(7):931-939, (Jul. 1998).

"MIMO-related Technology," Collection of Standard Technologies of the Japan Patent Office, May 25, 2005, 1-1-1, 1-1-3, URL, http://www.jpo.go.jp/shiryou/s_sonota/hyoujun_gijutsu/mimo/mokuji.htm.

TGn Sync Complete Proposal, IEEE 802.11-04/888r13, IEEE mentor, Jul. 8, 2005.

International Report on Patentability—PCT/US04/034259—IPEA/US Sep. 26, 2006.

Written Opinion—PCT/US04/034259—International Search Authority—European Patent Office—Mar. 7, 2005.

* cited by examiner

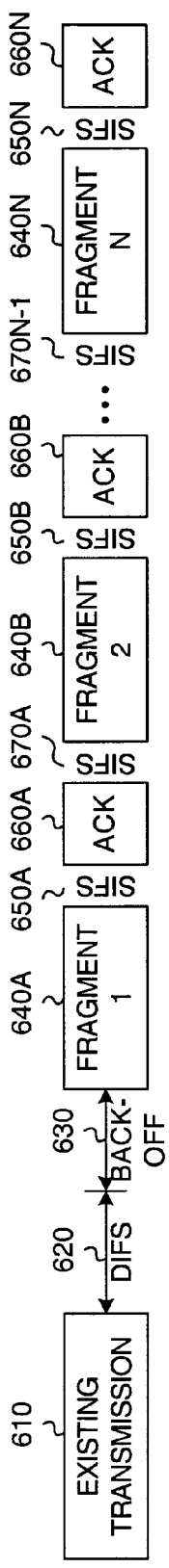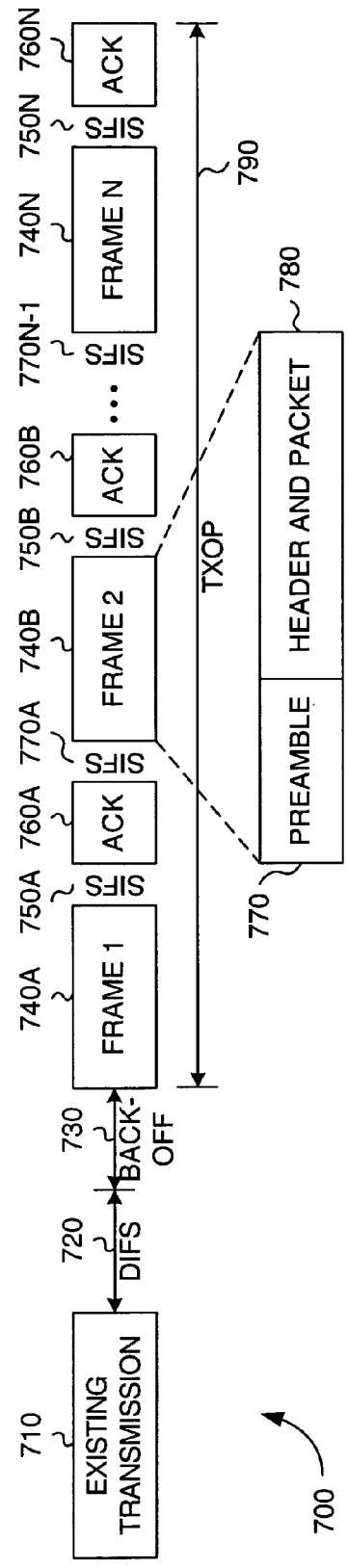
PRIOR ART
FIG. 6
PRIOR ART
FIG. 7

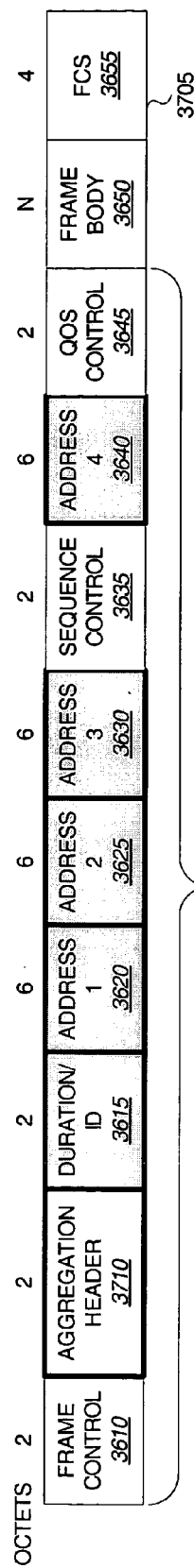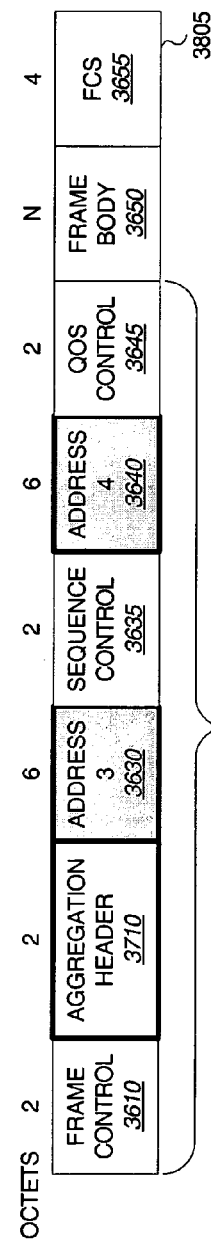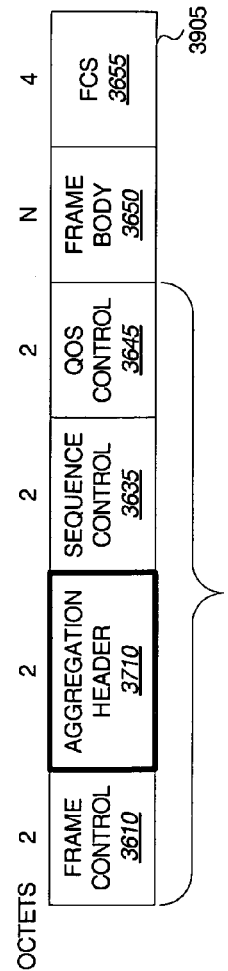

HIGH SPEED MEDIA ACCESS CONTROL AND DIRECT LINK PROTOCOL

CLAIM OF PRIORITY UNDER 35 U.S.C. §119

The present Application for Patent claims priority to the following U.S. Provisional Patent Applications:
Provisional Application No. 60/511,750 entitled "Method and Apparatus for Providing Interoperability and Backward Compatibility in Wireless Communication Systems" filed Oct. 15, 2003;
Provisional Application No. 60/511,904 entitled "Method, Apparatus, and System for Medium Access Control in a High Performance Wireless LAN Environment" filed Oct. 15, 2003;
Provisional Application No. 60/513,239 entitled "Peer-to-Peer Connections in MIMO WLAN System" filed Oct. 21, 2003;
Provisional Application No. 60/526,347 entitled "Method, Apparatus, and System for Sub-Network Protocol Stack for Very High Speed Wireless LAN" filed Dec. 1, 2003;
Provisional Application No. 60/526,356 entitled "Method, Apparatus, and System for Multiplexing Protocol data Units in a High Performance Wireless LAN Environment" filed Dec. 1, 2003;
Provisional Application No. 60/532,791 entitled "Wireless Communications Medium Access Control (MAC) Enhancements" filed Dec. 23, 2003;
Provisional Application No. 60/545,963 entitled "Adaptive Coordination Function (ACF)" filed Feb. 18, 2004;
Provisional Application No. 60/576,545 entitled "Method and Apparatus for Robust Wireless Network" filed Jun. 2, 2004;
Provisional Application No. 60/586,841 entitled "Method and Apparatus for Distribution Communication Resources Among Multiple Users" filed Jul. 8, 2004; and Provisional Application No. 60/600,960 entitled "Method, Apparatus, and System for Wireless Communications" filed Aug. 11, 2004; all assigned to the assignee hereof and hereby expressly incorporated by reference herein.

REFERENCE TO CO-PENDING APPLICATIONS FOR PATENT

The present Application for Patent is related to the following co-pending U.S. Patent Applications:
U.S. patent application Ser. No. 10/964,330, entitled "High Speed Media Access Control with Legacy System Interoperability" by Walton et al., filed concurrently herewith, assigned to the assignee hereof, and expressly incorporated by reference herein; and
U.S. patent application Ser. No. 10/964,321, entitled "High Speed Media Access Control" by Nanda et al., filed concurrently herewith, assigned to the assignee hereof, and expressly incorporated by reference herein; and
U.S. patent application Ser. No. 10/964,332, entitled "Method, Apparatus, and System for Medium Access Control" by Ketchum et al., filed concurrently herewith, assigned to the assignee hereof, and expressly incorporated by reference herein.

BACKGROUND

1. Field

The present invention relates generally to communications, and more specifically to medium access control.

2. Background

Wireless communication systems are widely deployed to provide various types of communication such as voice and data. A typical wireless data system, or network, provides multiple users access to one or more shared resources. A system may use a variety of multiple access techniques such as Frequency Division Multiplexing (FDM), Time Division Multiplexing (TDM), Code Division Multiplexing (CDM), and others.

Example wireless networks include cellular-based data systems. The following are several such examples: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard).

Other examples of wireless systems include Wireless Local Area Networks (WLANs) such as the IEEE 802.11 standards (i.e. 802.11 (a), (b), or (g)). Improvements over these networks may be achieved in deploying a Multiple Input Multiple Output (MIMO) WLAN comprising Orthogonal Frequency Division Multiplexing (OFDM) modulation techniques. IEEE 802.11(e) has been introduced to improve upon some of the shortcomings of previous 802.11 standards.

As wireless system designs have advanced, higher data rates have become available. Higher data rates have opened up the possibility of advanced applications, among which are voice, video, fast data transfer, and various other applications. However, various applications may have differing requirements for their respective data transfer. Many types of data may have latency and throughput requirements, or need some Quality of Service (QoS) guarantee. Without resource management, the capacity of a system may be reduced, and the system may not operate efficiently.

Medium Access Control (MAC) protocols are commonly used to allocate a shared communication resource between a number of users. MAC protocols commonly interface higher layers to the physical layer used to transmit and receive data. To benefit from an increase in data rates, a MAC protocol must be designed to utilize the shared resource efficiently. It is also generally desirable to maintain interoperability with alternate or legacy communication standards. There is therefore a need in the art for MAC processing for efficient use of high throughput systems. There is a further need in the art for such MAC processing that is backward compatible with various types of legacy systems.

SUMMARY

Embodiments disclosed herein address the need for MAC processing for efficient use of high throughput systems and that is backward compatible with various types of legacy systems. In one aspect, a data frame is formed comprising a common portion for transmission in a format receivable by various stations, such as access points and remote stations. The data frame also comprises a dedicated portion, formatted for transmission to a specified remote station. In another aspect, the common portion is unsteered, and the dedicated portion is steered. In another aspect, an access point schedules an allocation in response to a data indication included in a common portion of a data frame transmitted from one remote station to another.

In another aspect, a first station transmits a reference to a second station, which measures the reference and generates feedback therefrom. Upon receiving the feedback from the second station, the first station transmits data to the second station in accordance with the feedback. Various other aspects are also presented.

BRIEF DESCRIPTION OF THE DRAWINGS

FIG. 6 illustrates segmenting large packets into smaller fragments with associated SIFS;

FIG. 7 depicts an example physical layer (PHY) transmission segment illustrating a TXOP with per-frame acknowledgment;

FIG. 37 illustrates an example uncompressed frame;

FIG. 38 illustrates an example compressed frame;

FIG. 39 illustrates another example compressed frame;

DETAILED DESCRIPTION

Example embodiments are disclosed herein that support highly efficient operation in conjunction with very high bit rate physical layers for a wireless LAN (or similar applications that use newly emerging transmission technologies). The example WLAN supports bit rates in excess of 100 Mbps (million bits per second) in bandwidths of 20 MHz.

Various example embodiments preserve the simplicity and robustness of the distributed coordination operation of legacy WLAN systems, examples of which are found in 802.11 (a-e). The advantages of the various embodiments may be achieved while maintaining backward compatibility with such legacy systems. (Note that, in the description below, 802.11 systems are described as example legacy systems. Those of skill in the art will recognize that the improvements are also compatible with alternate systems and standards.)

An example WLAN may comprise a sub-network protocol stack. The sub-network protocol stack may support high data rate, high bandwidth physical layer transport mechanisms in general, including, but not limited to, those based on OFDM modulation, single carrier modulation techniques, systems using multiple transmit and multiple receive antennas (Multiple Input Multiple Output (MIMO) systems, including Multiple Input Single Output (MISO) systems) for very high bandwidth efficiency operation, systems using multiple transmit and receive antennas in conjunction with spatial multiplexing techniques to transmit data to or from multiple user terminals during the same time interval, and systems using code division multiple access (CDMA) techniques to allow transmissions for multiple users simultaneously. Alternate examples include Single Input Multiple Output (SIMO) and Single Input Single Output (SISO) systems.

One or more exemplary embodiments described herein are set forth in the context of a wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps. Method steps can be interchanged without departing from the scope of the present invention. The word "exemplary" is used herein to mean "serving as an example, instance, or illustration." Any embodiment described herein as "exemplary" is not necessarily to be construed as preferred or advantageous over other embodiments.

Figure 1:
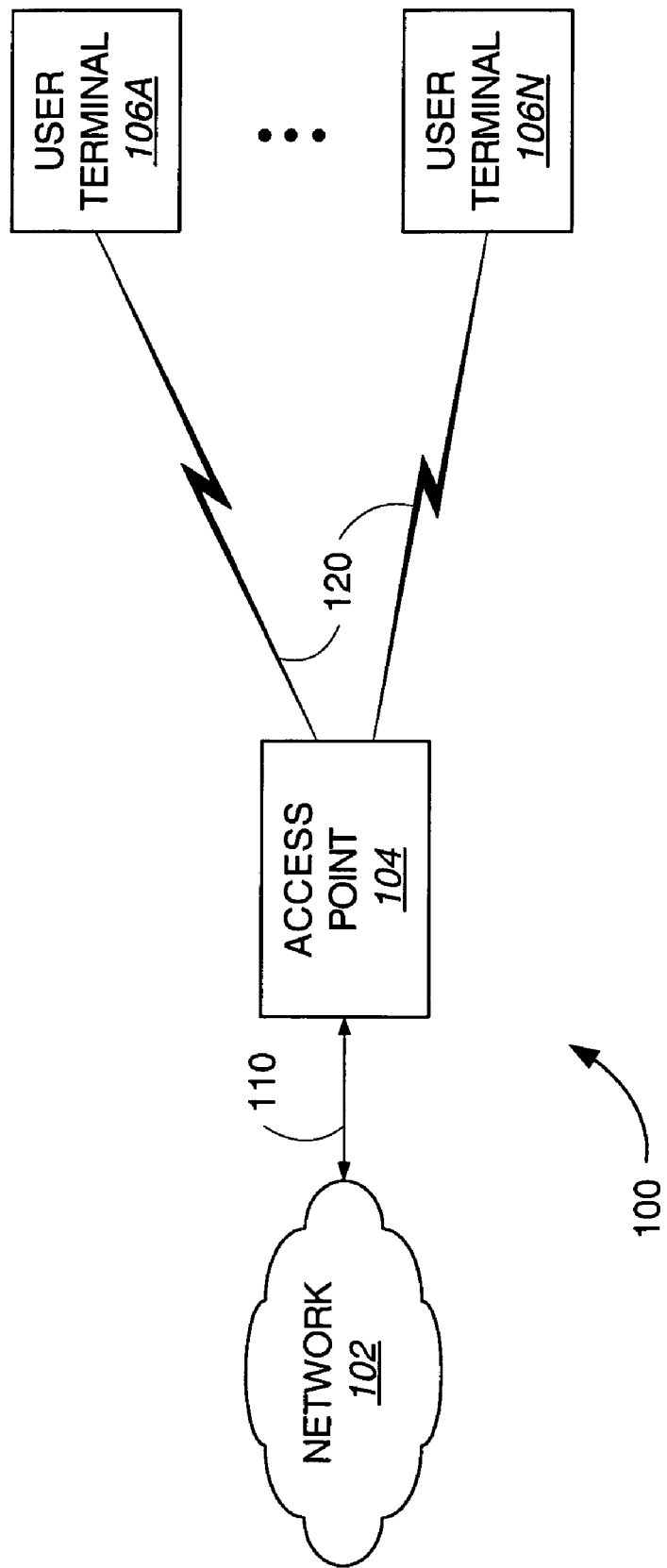
FIG. 1 is an example embodiment of a system including a high-speed WLAN.

FIG. 1 is an example embodiment of system 100, comprising an Access Point (AP) 104 connected to one or more User Terminals (UTs) 106A-N. In accordance with 802.11 terminology, in this document the AP and the UTs are also referred to as stations or STAs. The AP and the UTs communicate via Wireless Local Area Network (WLAN) 120. In the example embodiment, WLAN 120 is a high speed MIMO OFDM system. However, WLAN 120 may be any wireless LAN. Access point 104 communicates with any number of external devices or processes via network 102. Network 102 may be the Internet, an intranet, or any other wired, wireless, or optical network. Connection 110 carries the physical layer signals from the network to the access point 104. Devices or processes may be connected to network 102 or as UTs (or via connections therewith) on WLAN 120. Examples of devices that may be connected to either network 102 or WLAN 120 include phones, Personal Digital Assistants (PDAs), computers of various types (laptops, personal computers, workstations, terminals of any type), video devices such as cameras, camcorders, webcams, and virtually any other type of data device. Processes may include voice, video, data communications, etc. Various data streams may have varying transmission requirements, which may be accommodated by using varying Quality of Service (QoS) techniques.

System 100 may be deployed with a centralized AP 104. All UTs 106 communicate with the AP in one example embodiment. In an alternate embodiment, direct peer-to-peer communication between two UTs may be accommodated, with modifications to the system, as will be apparent to those of skill in the art, examples of which are illustrated below. Access may be managed by an AP, or ad hoc (i.e. contention based), as detailed below.

In one embodiment, AP 104 provides Ethernet adaptation. In this case, an IP router may be deployed in addition to the AP to provide connection to network 102 (details not shown). Ethernet frames may be transferred between the router and the UTs 106 over the WLAN sub-network (detailed below). Ethernet adaptation and connectivity are well known in the art.

In an alternate embodiment, the AP 104 provides IP Adaptation. In this case, the AP acts as a gateway router for the set of connected UTs (details not shown). In this case, IP datagrams may be routed by the AP 104 to and from the UTs 106. IP adaptation and connectivity are well known in the art.

Figure 2:
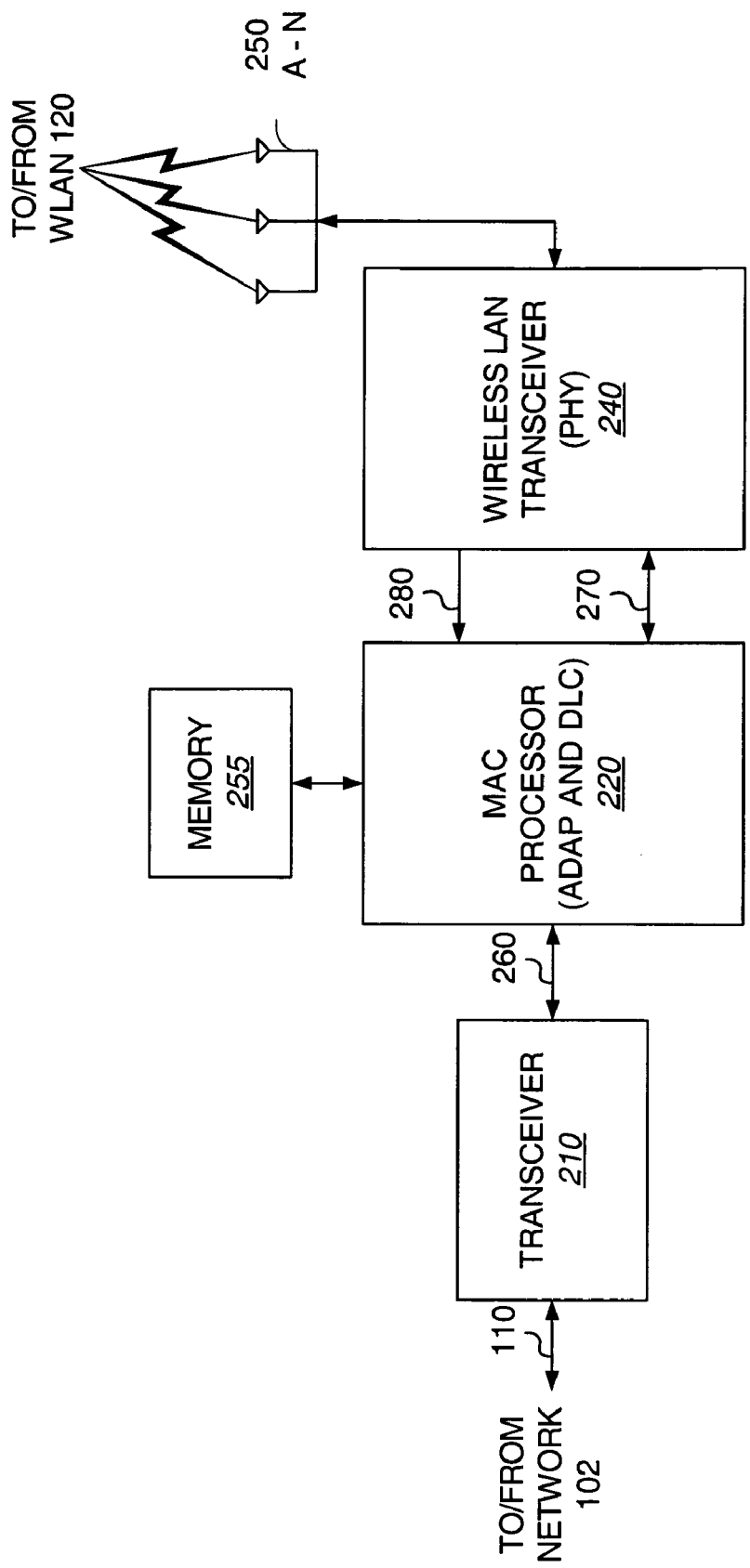
FIG. 2 depicts an example embodiment of a wireless communication device, which may be configured as an access point or user terminal.

FIG. 2 depicts an example embodiment of a wireless communication device, which may be configured as an access point 104 or user terminal 106. An access point 104 configuration is shown in FIG. 2. Transceiver 210 receives and transmits on connection 110 according to the physical layer requirements of network 102. Data from or to devices or applications connected to network 102 are delivered to MAC processor 220. These data are referred to herein as flows 260. Flows may have different characteristics and may require different processing based on the type of application associated with the flow. For example, video or voice may be characterized as low-latency flows (video generally having higher throughput requirements than voice). Many data applications are less sensitive to latency, but may have higher data integrity requirements (i.e., voice may be tolerant of some packet loss, file transfer is generally intolerant of packet loss).

MAC processor 220 receives flows 260 and processes them for transmission on the physical layer. MAC processor 220 also receives physical layer data and processes the data to form packets for outgoing flows 260. Internal control and signaling is also communicated between the AP and the UTs. MAC Protocol Data Units (MAC PDUs), also referred to as Physical layer (PHY) Protocol Data Units (PPDUs), or frames (in 802.11 parlance) are delivered to and received from wireless LAN transceiver 240 on connection 270. Example techniques for conversion from flows and commands to MAC PDUs, and vice versa, are detailed below. Alternate embodiments may employ any conversion technique. Feedback 280 corresponding to the various MAC IDs may be returned from the physical layer (PHY) 240 to MAC processor 220 for various purposes. Feedback 280 may comprise any physical layer information, including supportable rates for channels (including multicast as well as unicast channels), modulation format, and various other parameters.

In an example embodiment, the Adaptation layer (ADAP) and Data Link Control layer (DLC) are performed in MAC processor 220. The physical layer (PHY) is performed on wireless LAN transceiver 240. Those of skill in the art will recognize that the segmentation of the various functions may be made in any of a variety of configurations. MAC processor 220 may perform some or all of the processing for the physical layer. A wireless LAN transceiver may include a processor for performing MAC processing, or subparts thereof. Any number of processors, special purpose hardware, or combination thereof may be deployed.

MAC processor 220 may be a general-purpose microprocessor, a digital signal processor (DSP), or a special-purpose processor. MAC processor 220 may be connected with special-purpose hardware to assist in various tasks (details not shown). Various applications may be run on externally connected processors, such as an externally connected computer or over a network connection, may run on an additional processor within access point 104 (not shown), or may run on MAC processor 220 itself. MAC processor 220 is shown connected with memory 255, which may be used for storing data as well as instructions for performing the various procedures and methods described herein. Those of skill in the art will recognize that memory 255 may be comprised of one or more memory components of various types, that may be embedded in whole or in part within MAC processor 220.

In addition to storing instructions and data for performing functions described herein, memory 255 may also be used for storing data associated with various queues.

Wireless LAN transceiver 240 may be any type of transceiver. In an example embodiment, wireless LAN transceiver 240 is an OFDM transceiver, which may be operated with a MIMO or MISO interface. OFDM, MIMO, and MISO are known to those of skill in the art. Various example OFDM, MIMO and MISO transceivers are detailed in co-pending U.S. patent application Ser. No. 10/650,295, entitled "FREQUENCY-INDEPENDENT SPATIAL-PROCESSING FOR WIDEBAND MISO AND MIMO SYSTEMS", filed Aug. 27, 2003, assigned to the assignee of the present invention. Alternate embodiments may include SIMO or SISO systems.

Wireless LAN transceiver 240 is shown connected with antennas 250A-N. Any number of antennas may be supported in various embodiments. Antennas 250 may be used to transmit and receive on WLAN 120.

Wireless LAN transceiver 240 may comprise a spatial processor connected to each of the one or more antennas 250. The spatial processor may process the data for transmission independently for each antenna or jointly process the received signals on all antennas. Examples of the independent processing may be based on channel estimates, feedback from the UT, channel inversion, or a variety of other techniques known in the art. The processing is performed using any of a variety of spatial processing techniques. Various transceivers of this type may use beam forming, beam steering, eigen-steering, or other spatial techniques to increase throughput to and from a given user terminal. In an example embodiment, in which OFDM symbols are transmitted, the spatial processor may comprise sub-spatial processors for processing each of the OFDM subchannels, or bins.

In an example system, the AP may have N antennas, and an example UT may have M antennas. There are thus M×N paths between the antennas of the AP and the UT. A variety of spatial techniques for improving throughput using these multiple paths are known in the art. In a Space Time Transmit Diversity (STTD) system (also referred to herein as "diversity"), transmission data is formatted and encoded and sent across all the antennas as a single stream of data. With M transmit antennas and N receive antennas there may be MIN (M, N) independent channels that may be formed. Spatial multiplexing exploits these independent paths and may transmit different data on each of the independent paths, to increase the transmission rate.

Various techniques are known for learning or adapting to the characteristics of the channel between the AP and a UT. Unique pilots may be transmitted from each transmit antenna. The pilots are received at each receive antenna and measured. Channel state information feedback may then be returned to the transmitting device for use in transmission. Eigen decomposition of the measured channel matrix may be performed to determine the channel eigenmodes. An alternate technique, to avoid eigen decomposition of the channel matrix at the receiver, is to use eigen-steering of the pilot and data to simplify spatial processing at the receiver.

Thus, depending on the current channel conditions, varying data rates may be available for transmission to various user terminals throughout the system. In particular, the specific link between the AP and each UT may be higher performance than a multicast or broadcast link that may be shared from the AP to more than one UT. Examples of this are detailed further below. The wireless LAN transceiver 240 may determine the supportable rate based on whichever spatial processing is being used for the physical link between the AP and the UT. This information may be fed back on connection 280 for use in MAC processing.

The number of antennas may be deployed depending on the UT's data needs as well as size and form factor. For example, a high definition video display may comprise, for example, four antennas, due to its high bandwidth requirements, while a PDA may be satisfied with two. An example access point may have four antennas.

A user terminal 106 may be deployed in similar fashion to the access point 104 depicted in FIG. 2. Rather than having flows 260 connect with a LAN transceiver (although a UT may include such a transceiver, either wired or wireless), flows 260 are generally received from or delivered to one or more applications or processes operating on the UT or a device connected therewith. The higher levels connected to either AP 104 or UT 106 may be of any type. Layers described herein are illustrative only.

Legacy 802.11 MAC

As mentioned above, various embodiments detailed herein may be deployed so as to be compatible with legacy systems. The IEEE 802.11(e) feature set (which is turn backward compatible with earlier 802.11 standards), includes various features that will be summarized in this section, along with features introduced in earlier standards. For a detailed description of these functions, refer to the respective IEEE 802.11 standard.

The basic 802.11 MAC consists of a Carrier Sense Multiple Access/Collision Avoidance (CSMA/CA) based Distributed Coordination Function (DCF) and a Point Coordination Function (PCF). The DCF allows for access of the medium without central control. The PCF is deployed at an AP to provide central control. The DCF and PCF utilize various gaps between consecutive transmissions to avoid collisions. Transmissions are referred to as frames, and a gap between frames is referred to as an Interframe Spacing (IFS). Frames may be user data frames, control frames or management frames.

Figure 3:
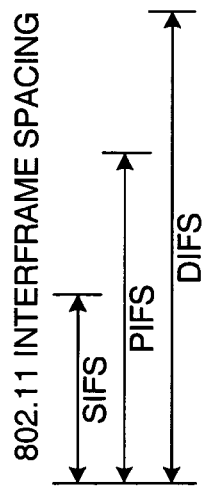
FIG. 3 depicts 802.11 interframe spacing parameters.

Interframe spacing time durations vary depending on the type of gap inserted. FIG. 3 depicts 802.11 interframe spacing parameters: a Short Interframe Spacing (SIFS), a Point Interframe Spacing (PIFS), and a DCF Interframe Spacing (DIFS). Note that SIFS<PIFS<DIFS. Thus, a transmission following a shorter time duration will have a higher priority than one which must wait longer before attempting to access the channel.

According to the carrier sense (CSMA) feature of CSMA/CA, a station (STA) may gain access to the channel after sensing the channel to be idle for at least a DIFS duration. (As used herein, the term STA may refer to any station accessing a WLAN, and may include access points as well as user terminals). To avoid collision, each STA waits a randomly selected backoff in addition to DIFS before accessing the channel. STAs with a longer backoff will notice when a higher priority STA begins transmitting on the channel, and will thus avoid colliding with that STA. (Each waiting STA may reduce its respective backoff by the amount of time it waited before sensing an alternate transmission on the channel, thus maintaining its relative priority.) Thus, following the collision avoidance (CA) feature of the protocol, the STA backs-off a random period of time between [0, CW] where CW is initially chosen to be CWmin, but increases by a factor of two at every collision, until a maximum value of CWmax.

Figure 4:
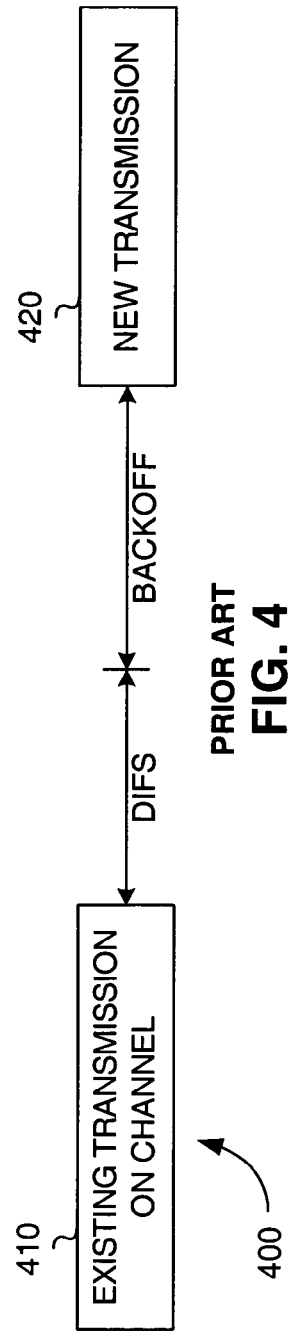
FIG. 4 depicts an example physical layer (PHY) transmission segment illustrating the use of DIFS plus backoff for access according to the DCF.

FIG. 4 depicts example physical layer (PHY) transmission segment 400, which illustrates the use of DIFS plus backoff for access according to the DCF. An existing transmission 410 utilizes the channel. When transmission 410 terminates, in this example, no higher priority accesses occur, and so new transmission 420 begins after DIFS and the associated backoff period. In the discussion below, the STA making transmission 420 is said to have earned this opportunity to transmit, in this case through contention.

SIFS is used during a frame sequence in which only a specific STA is expected to respond to the current transmission. For example, when an Acknowledgement (ACK) is transmitted in response to a received frame of data, that ACK may be transmitted immediately following the received data plus SIFS. Other transmission sequences may also use SIFS between frames. A Request To Send (RTS) frame may be followed after SIFS with a Clear To Send (CTS) frame, then the data may be transmitted a SIFS after the CTS, after which an ACK may follow the data after SIFS. As noted, such frame sequences are all interspersed with SIFS. The SIFS duration may be used for (a) the detection of energy on the channel, and to determine whether energy has gone away (i.e., the channel clears), (b) time to decode the previous message and determine whether an ACK frame will indicate the transmission was received correctly, and (c) time for the STA transceivers to switch from receive to transmit, and vice versa.

Figure 5:
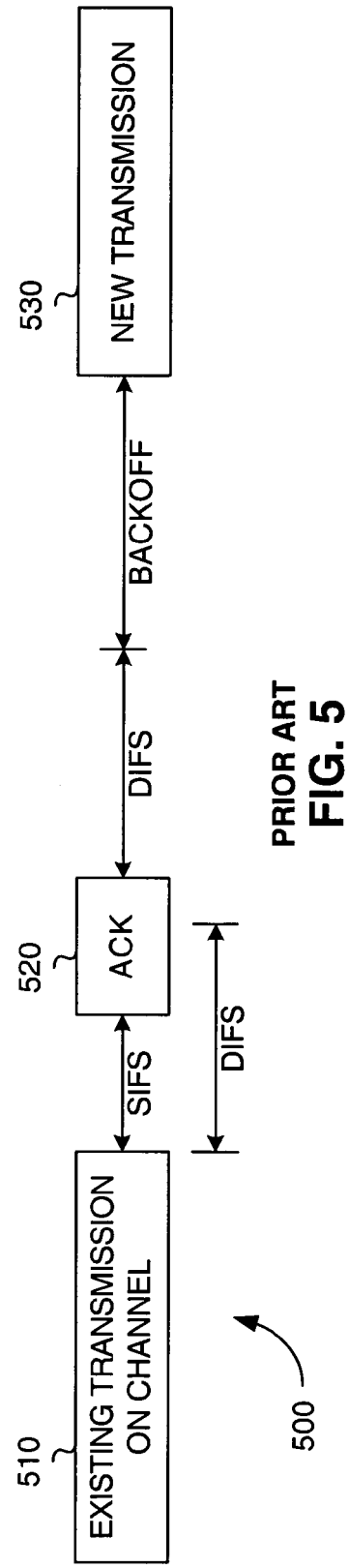
FIG. 5 depicts an example physical layer (PHY) transmission segment illustrating the use of SIFS before an ACK, with higher priority than a DIFS access.

FIG. 5 depicts example physical layer (PHY) transmission segment 500, which illustrates the use of SIFS before an ACK, with higher priority than a DIFS access. An existing transmission 510 utilizes the channel. When transmission 510 terminates, in this example, ACK 520 follows the end of transmission 510 after a SIFS. Note that ACK 520 begins before a DIFS expires, thus any other STAs attempting to earn a transmission would not succeed. In this example, after the ACK 520 completes, no higher priority accesses occur, and so new transmission 530 begins after DIFS and the associated backoff period, if any.

The RTS/CTS frame sequence (in addition to providing flow control features) may be used to improve protection for the data frame transmission. The RTS and CTS contain duration information for the subsequent data frame and ACK and any intervening SIFS. STAs hearing either the RTS or the CTS mark out the occupied duration on their Network Allocation Vector (NAV) and treat the medium as busy for the duration. Typically, frames longer than a specified length are protected with RTS/CTS, while shorter frames are transmitted unprotected.

The PCF may be used to allow an AP to provide centralized control of the channel. An AP may gain control of the medium after sensing the medium to be idle for a PIFS duration. The PIFS is shorter than the DIFS and thus has higher priority than DIFS. Once the AP has gained access to the channel it can provide contention-free access opportunities to other STAs and thus improve MAC efficiency compared to DCF. Note that SIFS has higher priority than PIFS, so the PCF must wait until any SIFS sequences complete before taking control of the channel.

Once the AP gains access to the medium using the PIFS it can establish a Contention-Free Period (CFP) during which the AP can provide polled access to associated STAs. The contention-free poll (CF-Poll), or simply poll, is transmitted by the AP and is followed by a transmission from the polled STA to the AP. Once again, the STA must wait for a SIFS duration following the CF-Poll, although the polled STA need not wait for DIFS, or any backoff. 802.11(e) introduced various enhancements, including enhancements to polling, an example of which is detailed further below with respect to FIG. 9.

The Beacon transmitted by the AP establishes the duration of the CFP. This is similar to using RTS or CTS to prevent contention access. However, hidden terminal problems can still occur from terminals that are unable to hear the Beacon, but whose transmissions may interfere with transmissions scheduled by the AP. Further protection is possible through the use of a CTS-to-self by each terminal that begins a transmission in the CFP.

ACKs and CF-Polls are permitted to be included in one frame, and may be included with data frames to improve MAC efficiency. Note that the SIFS<PIFS<DIFS relationship provides a deterministic priority mechanism for channel access. The contention access between STAs in the DCF is probabilistic based on the back-off mechanism.

Early 802.11 standards also provided for segmenting large packets into smaller fragments. One benefit of such segmenting is that an error in a segment requires less retransmission than an error in a larger packet. One drawback of segmenting in these standards is, for acknowledged transmission, the requirement of transmitting an ACK for each segment, with the additional SIFS that correspond to the additional ACK transmissions and fragment transmissions. This is illustrated in FIG. 6. The example physical layer (PHY) transmission segment 600 illustrates the transmission of N segments and their respective acknowledgement. Existing transmission 610 is transmitted. At the end of transmission 610, a first STA waits DIFS 620 and backoff 630 to earn access to the channel. The first STA transmits N fragments 640A-640N to a second STA, after which N respective delays of SIFS 650A-650N must transpire. The second STA transmits N ACK frames 660A-660N. Between each fragment, the first STA must wait SIFS, so there are N−1 SIFS 670A-670N−1 as well. Thus, in contrast to sending one packet, one ACK, and one SIFS, a segmented packet requires the same time of packet transmission, with N ACKs and 2N−1 SIFS.

The 802.11(e) standard adds enhancements to improve on the prior MAC from 802.11(a), (b), and (g). 802.11(g) and (a) are both OFDM systems, which are very similar, but operate in different bands. Various features of lower speed MAC protocols, such as 802.11(b), were carried forward to systems with much higher bit rates, introducing inefficiencies, detailed further below.

In 802.11(e), the DCF is enhanced and referred to as the Enhanced Distributed Channel Access (EDCA). The primary Quality of Service (QoS) enhancements of the EDCA are the introduction of an Arbitration Interframe Spacing (AIFS). AIFS[i] is associated with a Traffic Class (TC) identified with index i. The AP may use AIFS[i] values different from the AIFS[i] values that are allowed to be used by the other STAs. Only the AP may use an AIFS[i] value that is equal to the PIFS. Otherwise AIFS[i] is greater than or equal to DIFS. By default, the AIFS for "voice" and "video" traffic classes is chosen to be equal to DIFS. A larger AIFS implying lower priority is chosen for traffic classes "best effort" and "background".

The size of contention window is also made a function of the TC. The highest priority class is permitted to set the CW=1, i.e., no backoff. For other TCs, the different contention window sizes provide a probabilistic relative priority, but cannot be used to achieve delay guarantees.

802.11(e) introduced the Transmission Opportunity (TXOP). To improve MAC efficiency, when a STA acquires the medium through EDCA or through a polled access in HCCA, the STA may be permitted to transmit more than a single frame. The one or more frames are referred to as the TXOP. The maximum length of a TXOP on the medium depends on the traffic class and is established by the AP. Also, in the case of a polled TXOP, the AP indicates the permitted duration of the TXOP. During the TXOP, the STA can transmit a series of frames, interspersed with SIFS and ACKs from the destination. In addition to removing the need to wait DIFS plus backoff for each frame, the STA having earned a TXOP has certainty that it can retain the channel for subsequent transmissions.

During the TXOP, ACKs from the destination may be per frame (as in earlier 802.11 MACs), or may use an immediate or delayed block ACK as discussed below. Also, a no ACK policy is permitted for certain traffic flows, e.g., broadcast or multicast.

FIG. 7 depicts example physical layer (PHY) transmission segment 700, illustrating a TXOP with per-frame acknowledgment. An existing transmission 710 is transmitted. Following the transmission 710, and after waiting DIFS 720 and backoff 730, if any, a STA earns TXOP 790. TXOP 790 comprises N frames 740A-740N, each frame followed by N respective SIFS 750A-750N. The receiving STA responds with N respective ACKS 760A-760N. The ACKs 760 are followed by N−1 SIFS 770A-770N−1. Note that each frame 740 comprises a preamble 770 as well as header and packet 780. Example embodiments, detailed below, allow for greatly reducing the amount of transmission time reserved for preambles.

Figure 8:
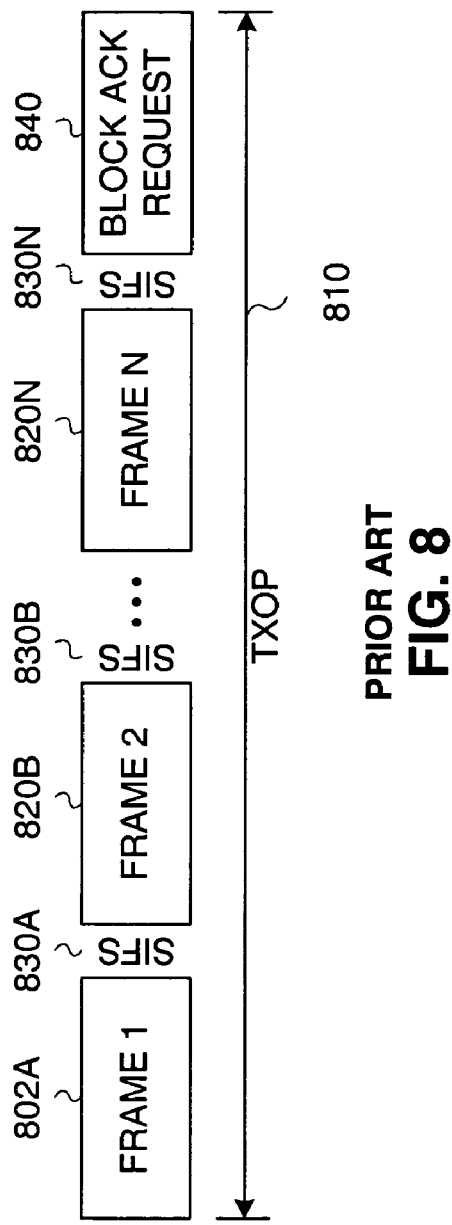
FIG. 8 illustrates a TXOP with block acknowledgment.

FIG. 8 illustrates a TXOP 810 with block acknowledgment. The TXOP 810 may be earned through contention or polling. TXOP 810 comprises N frames 820A -820N, each frame followed by N respective SIFS 830A-830N. Following the transmission of frames 820 and SIFS 830, a block ACK request 840 is transmitted. The receiving STA responds to the block ACK request at a time in the future. The Block ACK may be immediate following the completion of the transmission of a block of frames, or may be delayed to permit receiver processing in software.

Example embodiments, detailed below, allow for greatly reducing the amount of transmission time between frames (SIFS in this example). In some embodiments, there is no need to delay between consecutive transmissions (i.e. frames).

Note that, in 802.11(a) and other standards, for certain transmission formats, a signal extension is defined which adds additional delay to the end of each frame. While not technically included in the definition of SIFS, various embodiments, detailed below, also allow for the removal of the signal extensions.

The Block ACK feature provides improved efficiency. In one example, up to 64 MAC Service Data Units (SDUs) (each possibly fragmented to 16 fragments) corresponding to 1024 frames may be transmitted by a STA, while the destination STA is permitted to provide a single response at the end of the block of frames indicating the ACK status of each of the 1024 frames. Typically, at high rates, the MAC SDU will not be fragmented, and for low latency, fewer than 64 MAC SDUs may be transmitted before requiring a Block ACK from the destination. In such a case, to transmit M frames, the total time is reduced from M frames+M SIFS+M ACKs+M−1 SIFS, to M frames+M SIFS+Block ACK. Embodiments detailed below improve on the block ACK efficiency even further.

The Direct Link Protocol (DLP), introduced by 802.11(e), allows a STA to forward frames directly to another destination STA within a Basic Service Set (BSS) (controlled by the same AP). The AP may make a polled TXOP available for this direct transfer of frames between STAs. Prior to the introduction of this feature, during polled access, the destination of frames from the polled STA was always the AP, which would in turn forward the frames to the destination STA. By eliminating the two-hop frame forwarding, medium efficiency is improved. Embodiments detailed further below add substantial efficiency to DLP transfers.

802.11(e) also introduces an enhanced PCF, called the Hybrid Coordination Function (HCF). In HCF Controlled Channel Access (HCCA), the AP is allowed to access the channel at any time either to establish a Controlled Access Phase (CAP), which is like the CFP and is used to provide transmission opportunities at any time during the contention phase, not only immediately following the Beacon. The AP accesses the medium by waiting for a PIFS with no back-off.

Figure 9:
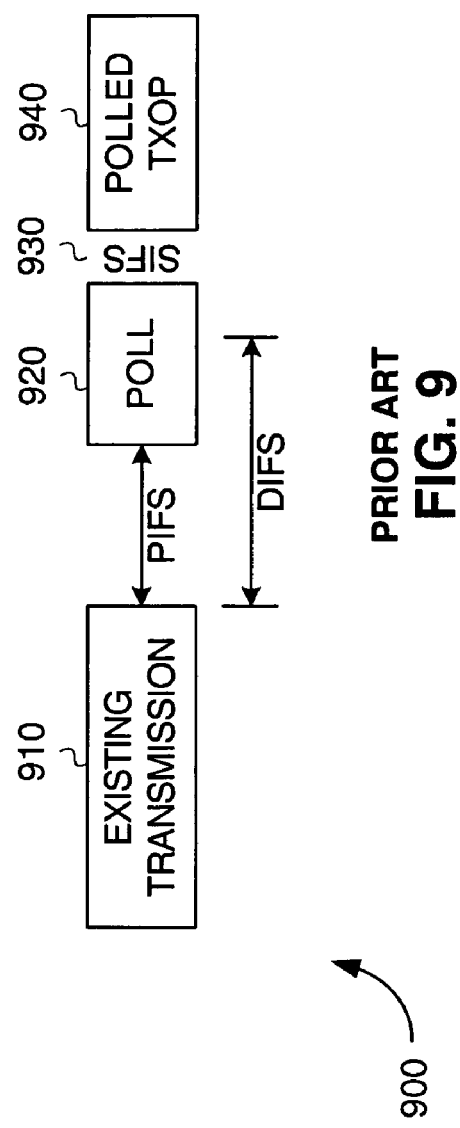
FIG. 9 depicts an example physical layer (PHY) transmission segment illustrating a polled TXOP using HCCA.

FIG. 9 depicts example physical layer (PHY) transmission segment 800, illustrating a polled TXOP using HCCA. In this example, the AP contends for the poll. An existing transmission 910 is transmitted. Following the transmission 910, the AP waits PIFS, and then transmits poll 920 addressed to a STA. Note that other STAs contending for the channel would have to wait at least DIFS, which does not occur due to the transmitted poll 920 as shown. The polled STA transmits polled TXOP 940 following the poll 920 and SIFS 930. The AP may continue to poll, waiting PIFS between each polled TXOP 940 and poll 920. In an alternate scenario, the AP may establish a CAP by waiting PIFS from a transmission 910. The AP may transmit one or more polls during the CAP.

MAC Improvements

As described above, various inefficient features of prior MACs were brought forward to later versions. For example, very long preambles, designed for 11 Mbps vs. 64 Mbps, introduce inefficiency. As the MAC Protocol Data Unit (MPDU) keeps shrinking as rates increase, keeping the various interframe spacings and/or preambles constant means a corresponding decrease in channel utilization. For example, a high data rate MIMO MPDU transmission may be just a few microseconds in length, compared to 802.11(g), which has a 72 μs preamble. Eliminating or reducing delays, such as SIFS, signal extensions, and/or preambles will increase throughput and utilization of the channel.

Figure 10:
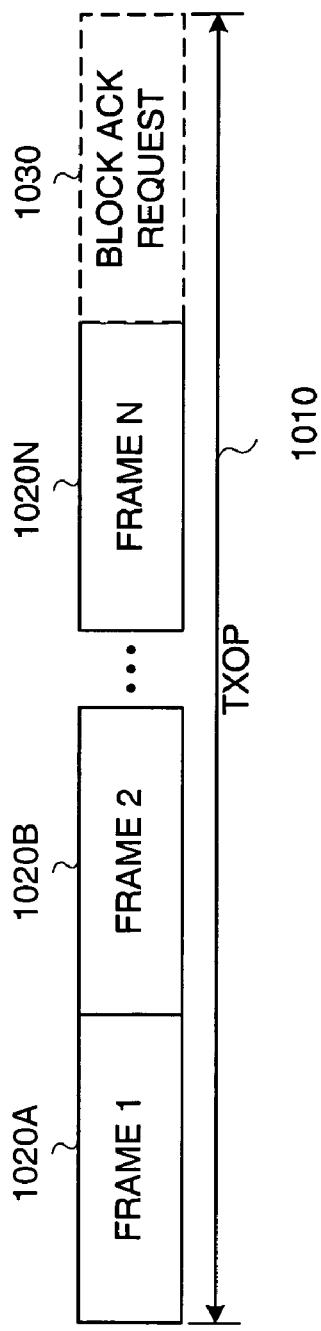
FIG. 10 is an example embodiment of a TXOP including multiple consecutive transmissions without any gaps.

FIG. 10 is an example embodiment of a TXOP 1010 including multiple consecutive transmissions without any gaps. TXOP 1010 comprises N frames 1020A-1020N which are transmitted sequentially without any gaps (compare this with the SIFS required in TXOP 810, depicted in FIG. 8). The number of frames in the TXOP is limited only by the buffer and the decoding capability of the receiver. When a STA is transmitting consecutive frames with a Block ACK in a TXOP 1010, it is unnecessary to intersperse SIFS durations since no other STA needs to gain access to the medium in between consecutive frames. An optional block ACK request 1030 is appended to the N frames. Certain classes of traffic may not require acknowledgement. A block ACK request may be responded to immediately following the TXOP, or may be transmitted at a later time. The frames 1020 do not require signal extensions. TXOP 1010 may be deployed in any of the embodiments detailed herein where a TXOP is called for.

As shown in FIG. 10, the transmission of SIFS between consecutive frames in a TXOP, when all frames are transmitted by the same STA, may be eliminated. In 802.11(e), such gaps were retained to limit the complexity requirement at the receiver. In the 802.11(e) standard, the 10 μs SIFS period and the 6 μs OFDM signal extension provide the receiver with a total of 16 μs for processing the received frame (including demodulation and decoding). However, at large PHY rates, this 16 μs results in significant inefficiency. In some embodiments, with the introduction of MIMO processing, even the 16 μs may be insufficient to complete processing. Instead, in this example embodiment, the SIFS and OFDM signal extension between consecutive transmissions from one STA to the AP or to another STA (using the Direct Link Protocol) are eliminated. Thus, a receiver requiring an additional period after the completion of the transmission, for MIMO receiver processing and channel decoding (e.g. turbo/convolutional/LDPC decoding) may perform those functions while the medium is utilized for additional transmission. An acknowledgment may be transmitted at a later time, as described above (using block ACK, for example).

Due to different propagation delays between STAs, transmissions between different pairs of STAs may be separated by guard periods to avoid collisions at a receiver between consecutive transmissions on the medium from different STAs (not shown in FIG. 10, but detailed further below). In an example embodiment, a guard period of one OFDM symbol (4 μs) is sufficient for all operating environments for 802.11. Transmissions from the same STA to different destination STAs do not need to be separated by guard periods (as shown in FIG. 10). Detailed further below, these guard periods may be referred to as Guardband Interframe Spacings (GIFS).

Instead of using SIFS and/or signal extension, the required receiver processing time (for MIMO processing and decoding, for example) may be provided through the use of a window-based ARQ scheme (e.g. go back N or selective repeat), techniques known to those of skill in the art. The stop-and-wait MAC layer ACK of legacy 802.11 has been enhanced in 802.11(e) to a window-like mechanism with up to 1024 frames and Block ACK, in this example. It may be preferable to introduce a standard window-based ARQ mechanism rather than the ad-hoc Block ACK scheme designed in 802.11(e).

The maximum permitted window may be determined by receiver processing complexity and buffering. The transmitter may be permitted to transmit enough data to fill the receiver window at the peak PHY rate achievable between the transmitter-receiver pair. For example, since the receiver processing may not be able to keep up with the PHY rate, the receiver may need to store soft demodulator outputs until they can be decoded. Therefore, the buffering requirements for physical layer processing at the peak PHY rate may be used to determine the maximum permitted window.

In an example embodiment, the receiver may advertise the maximum permitted PHY block size that it can process at a given PHY rate without overflowing its physical layer buffers. Alternately, the receiver may advertise the maximum permitted PHY block size that it can process at the maximum PHY rate without overflowing its physical layer buffers. At lower PHY rates, longer block sizes may be processed without buffer overflow. A known formula may be used by transmitters to compute the maximum permitted PHY block size for a given PHY rate, from the advertised maximum permitted PHY block size at the maximum PHY rate.

If the advertised maximum PHY block size is a static parameter, then the amount of time before the physical layer buffers may be processed and the receiver is ready for the next PHY burst is another receiver parameter that may be known at the transmitter and also at the scheduler. Alternately, the advertised maximum PHY block size may be varied dynamically according to the occupancy of the physical layer buffers.

The receiver processing delay may be used to determine the round-trip delay for the ARQ, which in turn may be used to determine the delays seen by the applications. Therefore, to enable low-latency services, the permitted PHY block size may be limited.

Figure 11:
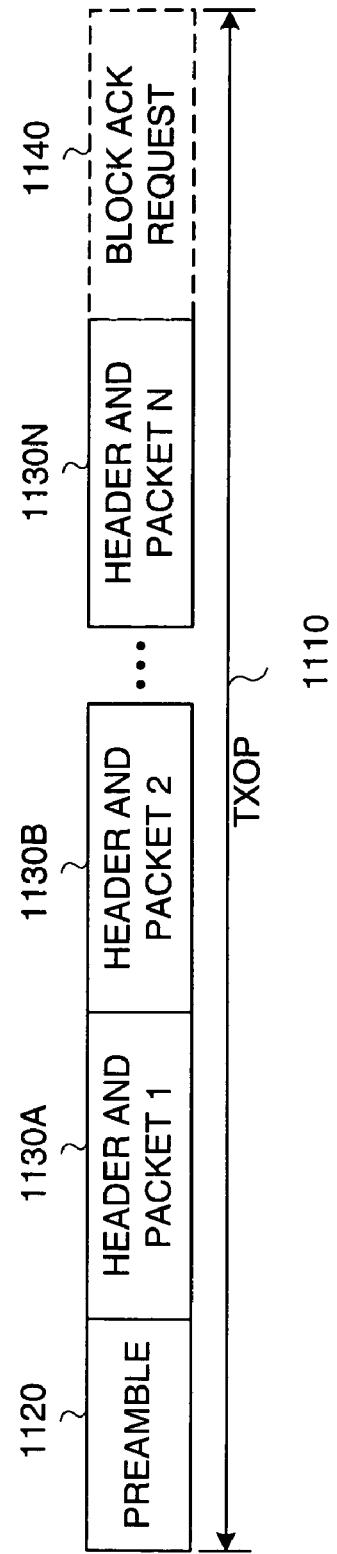
FIG. 11 depicts an example embodiment of a TXOP illustrating reducing the amount of preamble transmission required.

FIG. 11 depicts an example embodiment of a TXOP 1110 illustrating reducing the amount of preamble transmission required. TXOP 1110 comprises preamble 1120 followed by N consecutive transmissions 1130A-1130N. An optional block ACK request 1140 may be appended. In this example, a transmission 1130 comprises a header and a packet. Contrast TXOP 1110 with TXOP 790 of FIG. 7, in which each frame 740 comprises a preamble, in addition to the header and packet. By sending a single preamble, the required preamble transmission is one preamble instead of N preambles, for the same amount of transmitted data.

Thus, the preamble 1120 may be eliminated from successive transmissions. The initial preamble 1120 may be used by the receiver to acquire the signal, as well as for fine frequency acquisition for OFDM. For MIMO transmissions, the initial preamble 1120 may be extended compared to the current OFDM preamble to enable the receiver to estimate the spatial channels. However, subsequent frames within the same TXOP may not require additional preambles. Pilot tones within the OFDM symbols are generally sufficient for signal tracking. In an alternate embodiment, additional (preamble-like) symbols may be interspersed periodically during the TXOP 1110. However, the overall preamble overhead may be significantly reduced. The preamble may be sent only as necessary, and may be sent differently based on the amount of time elapsed since a previously transmitted preamble.

Note that the TXOP 1110 may incorporate features of legacy systems as well. For example, the block ACK is optional. More frequent ACKs may be supported. Even so, a lesser gap, such as GIFS, may be substituted for the longer SIFS (plus signal extension, if used). The consecutive transmissions 1130 may also include segments of a larger packet, as described above. Note further that the header for consecutive transmissions 1130 to the same receiving STA may be compressed. An example of compressing headers is detailed further below.

Figure 12:
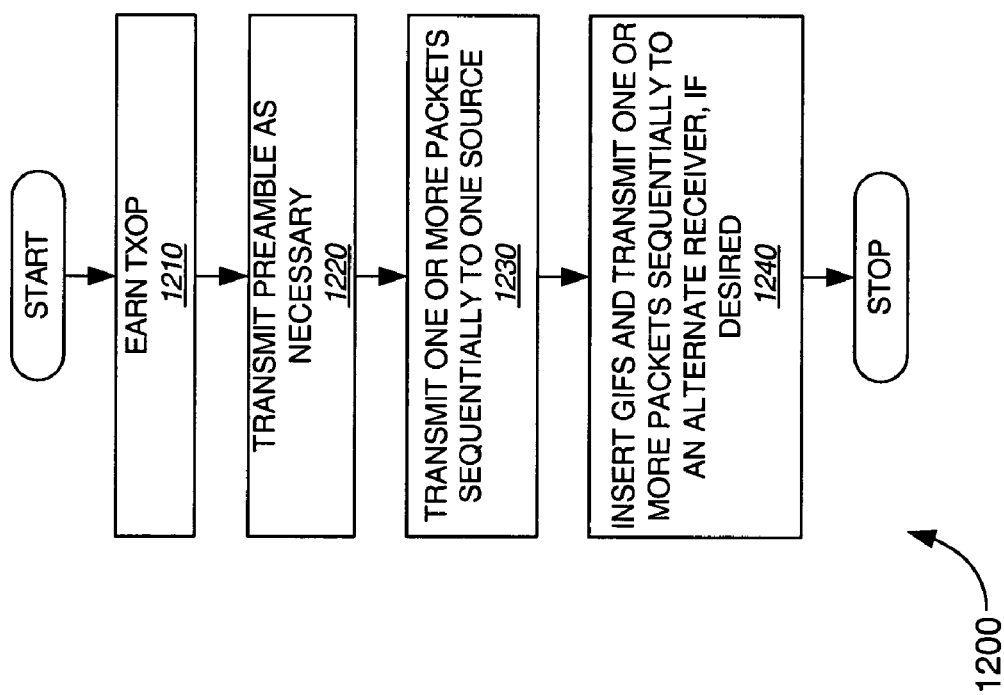
FIG. 12 depicts an example embodiment of a method for incorporating various aspects, including consolidating preambles, removing gaps such as SIFS, and inserting GIFs as appropriate.

FIG. 12 depicts an example embodiment of a method 1200 for incorporating various aspects just described, including consolidating preambles, removing gaps such as SIFS, and inserting GIFs as appropriate. The process begins in block 1210, where a STA earns a TXOP using any of the techniques detailed herein. In block 1220, a preamble is transmitted as necessary. Again, the preamble may be longer or shorter than a legacy preamble, and may vary depending on various parameters such as time elapsed since the last transmitted preamble as necessary to enable the receiving STA to estimate the MIMO spatial channel. In block 1230, the STA transmits one or more packets (or, more generally, consecutive transmissions of any kind), to a destination. Note that additional preambles need not be transmitted. In an alternate embodiment, one or more additional preambles may optionally be transmitted, or a preamble-like symbol may be interspersed as desired. In block 1240, the STA may optionally transmit to an additional receiving STA. In this case, a GIFS is inserted as necessary, and one or more consecutive transmissions may be transmitted to the additional receiving STA. Then the process may stop. In various embodiments, the STA may continue to transmit to more than two STAs, inserting GIFS and/or preambles as required for the desired level of performance.

Hence, as described above, MAC efficiency may be further improved by consolidating transmissions from a STA to multiple destination STAs into consecutive transmissions, thus eliminating many or all of the guard periods and reducing preamble overhead. A single preamble (or pilot transmission) may be used for multiple consecutive transmissions from the same STA to different destination STAs.

Additional efficiency may be gained through poll consolidation. In one example embodiment, several polls may be consolidated into a control channel, examples of which are detailed below. In one example, the AP may transmit to multiple destination STAs a signal including poll messages to assign TXOPs. By contrast, in 802.11(e), each TXOP is preceded by a CF-Poll from the AP followed by a SIFS. Improved efficiency results when several such CF-Poll messages are consolidated into a single control channel message (referred to as a SCHED message in an example embodiment, detailed below) used to assign several TXOPs. In a general embodiment, any period of time may be allocated for consolidated polls and their respective TXOPs. An example embodiment is detailed below with respect to FIG. 15, and further examples are also included herein.

A control channel (i.e. SCHED) message may be encoded with a tiered rate structure to further improve efficiency. Accordingly, a poll message to any STA may be encoded according to the channel quality between the AP and the STA. The order of transmission of poll messages need not be the order of the assigned TXOPs, but may be ordered according to coding robustness.

Figure 13:
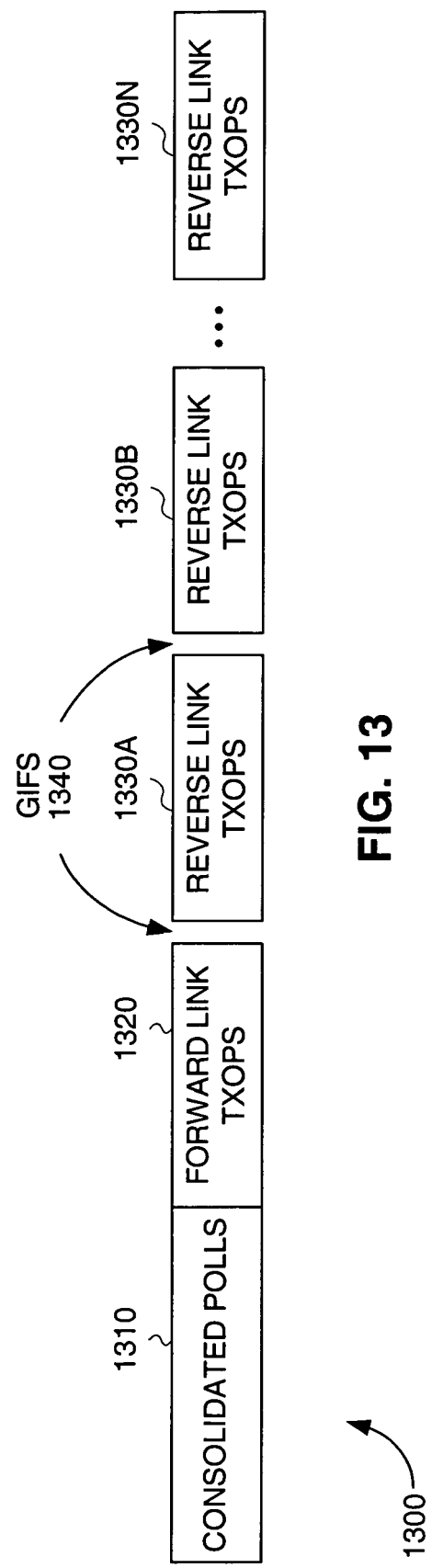
FIG. 13 depicts an example physical layer (PHY) transmission segment illustrating consolidated polls and their respective TXOPs.

FIG. 13 depicts example physical layer (PHY) transmission segment 1300, illustrating consolidated polls and their respective TXOPs. Consolidated polls 1310 are transmitted. The polls may be transmitted using a control channel structure, examples of which are detailed herein, or may be transmitted using myriad alternate techniques, which will be readily apparent to one of skill in the art. In this example, to eliminate the need for interframe spacing between the polls and any forward link TXOPs, forward link TXOPs 1320 are transmitted directly after the consolidated polls 1310. Subsequent to the forward link TXOPs 1320, various reverse link TXOPs 1330A-1330N are transmitted, with GIFS 1340 inserted as appropriate. Note that GIFS need not be included when sequential transmissions from one STA are made (similar to the lack of GIFS requirement for forward link transmissions emanating from the AP to various STAs). In this example, reverse link TXOPs include STA to STA (i.e. peer to peer) TXOPs (using DLP, for example). Note that the order of transmission shown is for illustration only. Forward and reverse link TXOPs (including peer to peer transmission) may be interchanged, or interspersed. Some configurations may not results in the elimination of as many gaps as other configurations. Those of skill in the art will readily adapt myriad alternate embodiments in light of the teaching herein.

Figure 14:
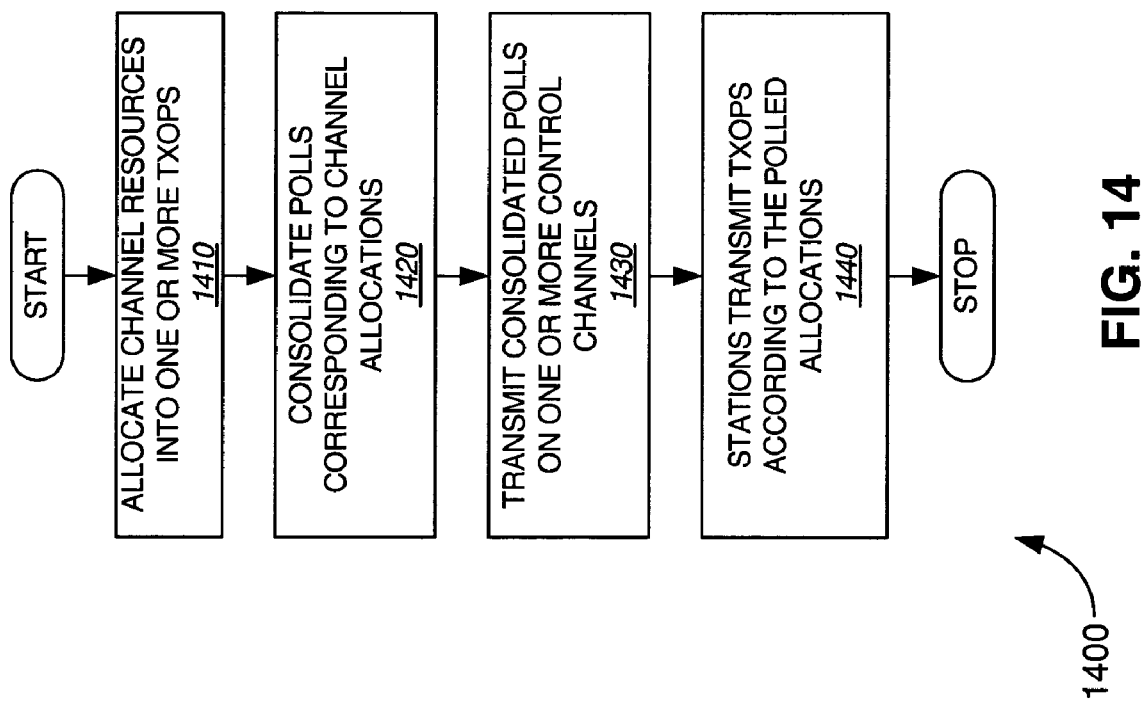
FIG. 14 depicts an example embodiment of a method for consolidating polls.

FIG. 14 depicts an example embodiment of a method 1400 for consolidating polls. The process begins in block 1410, where channel resources are allocated into one or more TXOPs. Any scheduling function may be deployed to make the TXOP allocation determination. In block 1420, polls for assigning TXOPs according to the allocation are consolidated. In block 1430, the consolidated polls are transmitted to one or more STAs on one or more control channels (i.e. the CTRLJ segments of the SCHED message, in an example embodiment detailed below). In an alternate embodiment, any messaging technique may be deployed to transmit the consolidated polls. In block 1440, STAs transmit TXOPs according to the polled allocations in the consolidated polls. Then the process may stop. This method may be deployed in conjunction with consolidated poll intervals of any length, which may comprise all or part of the system Beacon interval. Consolidated polling may be used intermittently with contention based access, or legacy polling, as described above. In an example embodiment, method 1400 may be repeated periodically, or in accordance with other parameters, such as system loading or data transmission demand.

Figure 15:
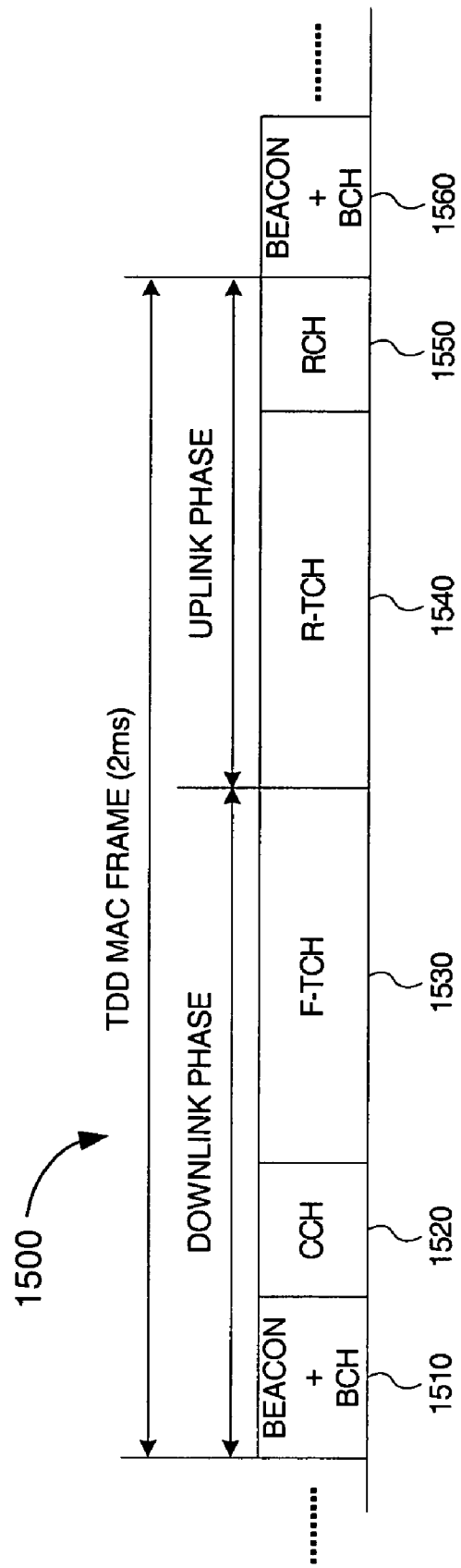
FIG. 15 illustrates an example MAC frame.
Figure 16:
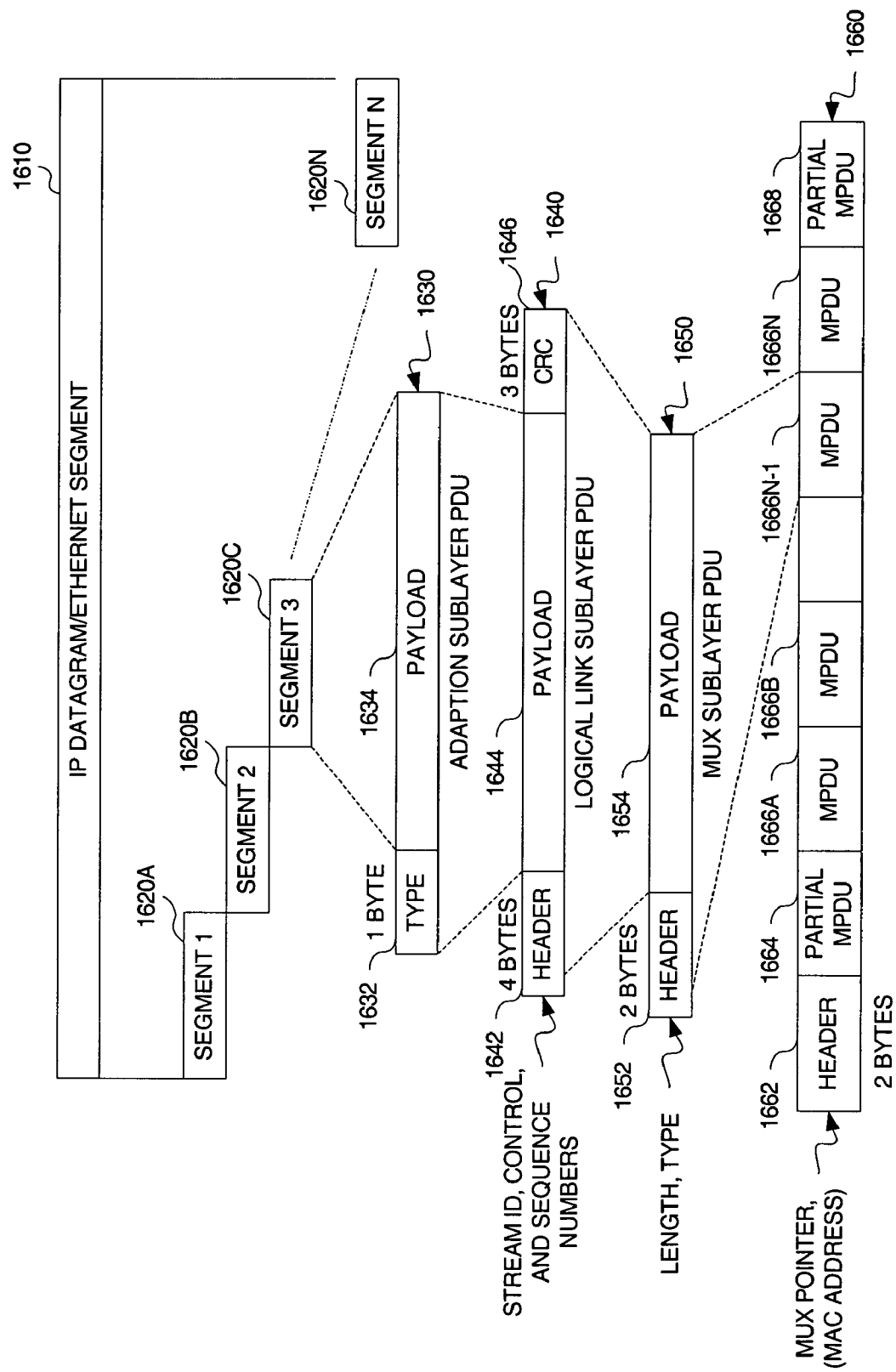
FIG. 16 illustrates an example MAC PDU.

An example embodiment of a MAC protocol illustrating various aspects is detailed with respect to FIGS. 15 and 16. This MAC protocol is detailed further in co-pending U.S. patent application Ser. Nos. 10/964,320, 10/964,332 and 10/964,237, entitled "WIRELESS LAN PROTOCOL STACK," filed concurrently herewith, and assigned to the assignee of the present invention.

An example TDD MAC frame interval 1500 is illustrated in FIG. 15. The use of the term TDD MAC frame interval in this context refers to the period of time in which the various transmission segments detailed below are defined. The TDD MAC frame interval 1500 is distinguished from the generic use of the term frame to describe a transmission in an 802.11 system. In 802.11 terms, TDD MAC frame interval 1500 may be analogous to the Beacon interval or a fraction of the Beacon interval. The parameters detailed with respect to FIGS. 15 and 16 are illustrative only. One of ordinary skill in the art will readily adapt this example to myriad alternate embodiments, using some or all of the components described, and with various parameter values. MAC function 1500 is allocated among the following transport channel segments: broadcast, control, forward and reverse traffic (referred to as the downlink phase and uplink phase, respectively), and random access.

In the example embodiment, a TDD MAC frame interval 1500 is Time Division Duplexed (TDD) over a 2 ms time interval, divided into five transport channel segments 1510-1550 as shown. Alternate orders and differing frame sizes may be deployed in alternate embodiments. Durations of allocations on the TDD MAC frame interval 1500 may be quantized to some small common time interval.

The example five transport channels within TDD MAC frame interval 1500 include: (a) the Broadcast Channel (BCH) 1510, which carries the Broadcast Control Channel (BCCH); (b) the Control Channel (CCH) 1520, which carries the Frame Control Channel (FCCH) and the Random Access Feedback Channel (RFCH) on the forward link; (c) the Traffic Channel (TCH), which carries user data and control information, and is subdivided into (i) the Forward Traffic Channel (F-TCH) 1530 on the forward link and (ii) the Reverse Traffic Channel (R-TCH) 1540 on the reverse link; and (d) the Random Access Channel (RCH) 1550, which carries the Access Request Channel (ARCH) (for UT access requests). A pilot beacon is transmitted as well in segment 1510.

The downlink phase of frame 1500 comprises segments 1510-1530. The uplink phase comprises segments 1540-1550. Segment 1560 indicates the beginning of a subsequent TDD MAC frame interval. An alternate embodiment encompassing peer-to-peer transmission is illustrated further below.

The Broadcast Channel (BCH) and beacon 1510 is transmitted by the AP. The first portion of the BCH 510 contains common physical layer overhead, such as pilot signals, including timing and frequency acquisition pilot. In an example embodiment, the beacon consists of 2 short OFDM symbols used for frequency and timing acquisition by the UTs followed by 8 short OFDM symbols of common MIMO pilot used by the UTs to estimate the channel.

The second portion of the BCH 1510 is the data portion. The BCH data portion defines the allocation of the TDD MAC frame interval with respect to the transport channel segments: CCH 1520, F-TCH 1530, R-TCH 1540 and RCH 1550, and also defines the composition of the CCH with respect to subchannels. In this example, the BCH 1510 defines the coverage of the wireless LAN 120, and so is transmitted in the most robust data transmission mode available. The length of the entire BCH is fixed. In an example embodiment, the BCH defines the coverage of a MIMO-WLAN, and is transmitted in Space Time Transmit Diversity (STTD) mode using rate 1/4 coded Binary Phase Shift Keying (BPSK). In this example, the length of the BCH is fixed at 10 short OFDM symbols. Various other signaling techniques may be deployed in alternate embodiments.

The Control Channel (CCH) 1520, transmitted by the AP, defines the composition of the remainder of the TDD MAC frame interval, and illustrates the use of consolidated polls. The CCH 1520 is transmitted using highly robust transmission modes in multiple subchannels, each subchannel with a different data rate. The first subchannel is the most robust and is expected to be decodable by all the UTs. In an example embodiment, rate 1/4 coded BPSK is used for the first CCH sub-channel. Several other subchannels with decreasing robustness (and increasing efficiency) are also available. In an example embodiment, up to three additional sub-channels are used. Each UT attempts to decode all subchannels in order until a decoding fails. The CCH transport channel segment in each frame is of variable length, the length depending on the number of CCH messages in each subchannel. Acknowledgments for reverse link random access bursts are carried on the most robust (first) subchannel of the CCH.

The CCH contains assignments of physical layer bursts on the forward and reverse links, (analogous to consolidated polls for TXOPs). Assignments may be for transfer of data on the forward or reverse link. In general, a physical layer burst assignment comprises: (a) a MAC ID; (b) a value indicating the start time of the allocation within the frame (in the F-TCH or the R-TCH); (c) the length of the allocation; (d) the length of the dedicated physical layer overhead; (e) the transmission mode; and (f) the coding and modulation scheme to be used for the physical layer burst.

Other example types of assignments on the CCH include: an assignment on the reverse link for the transmission of a dedicated pilot from a UT, or an assignment on the reverse link for the transmission of buffer and link status information from a UT. The CCH may also define portions of the frame that are to be left unused. These unused portions of the frame may be used by UTs to make noise floor (and interference) estimates as well as to measure neighbor system beacons.

The Random Access Channel (RCH) 1550 is a reverse link channel on which a UT may transmit a random access burst. The variable length of the RCH is specified for each frame in the BCH.

The Forward Traffic Channel (F-TCH) 1530 comprises one or more physical layer bursts transmitted from the AP 104. Each burst is directed to a particular MAC ID as indicated in the CCH assignment. Each burst comprises dedicated physical layer overhead, such as a pilot signal (if any) and a MAC PDU transmitted according to the transmission mode and coding and modulation scheme indicated in the CCH assignment. The F-TCH is of variable length. In an example embodiment, the dedicated physical layer overhead may include a dedicated MIMO pilot. An example MAC PDU is detailed with respect to FIG. 16.

The Reverse Traffic Channel (R-TCH) 1540 comprises physical layer burst transmissions from one or more UTs 106. Each burst is transmitted by a particular UT as indicated in the CCH assignment. Each burst may comprise a dedicated pilot preamble (if any) and a MAC PDU transmitted according to the transmission mode and coding and modulation scheme indicated in the CCH assignment. The R-TCH is of variable length.

In the example embodiment, the F-TCH 530, the R-TCH 540, or both, may use spatial multiplexing or code division multiple access techniques to allow simultaneous transmission of MAC PDUs associated with different UTs. A field containing the MAC ID with which the MAC PDU is associated (i.e. the sender on the uplink, or the intended recipient on the downlink) may be included in the MAC PDU header. This may be used to resolve any addressing ambiguities that may arise when spatial multiplexing or CDMA are used. In alternate embodiments, when multiplexing is based strictly on time division techniques, the MAC ID is not required in the MAC PDU header, since the addressing information is included in the CCH message allocating a given time period in the TDD MAC frame interval to a specific MAC ID. Any combination of spatial multiplexing, code division multiplexing, time division multiplexing, and any other technique known in the art may be deployed.

FIG. 16 depicts the formation of an example MAC PDU 1660 from a packet 1610, which may be an IP datagram or an Ethernet segment, in this example. Example sizes and types of fields are described in this illustration. Those of skill in the art will recognize that various other sizes, types, and configurations are contemplated within the scope of the present invention.

As shown, the data packet 1610 is segmented at an adaptation layer. Each adaptation sublayer PDU 1630 carries one of these segments 1620. In this example, data packet 1610 is segmented into N segments 1620A-N. An adaptation sublayer PDU 1630 comprises a payload 1634 containing the respective segment 1620. A type field 1632 (one byte in this example) is attached to the adaptation sublayer PDU 1630.

A Logical Link (LL) header 1642 (4 bytes in this example) is attached to the payload 1644, which comprises the adaptation layer PDU 1630. Example information for LL header 1642 includes a stream identifier, control information, and sequence numbers. A CRC 1646 is computed over the header 1642 and the payload 1644, and appended to form a logical link sublayer PDU (LL PDU) 1640. Logical Link Control (LLC) and Radio Link Control (RLC) PDUs may be formed in similar fashion. LL PDUs 1640, as well as LLC PDUs and RLC PDUs, are placed in queues (for example, a high QoS queue, a best effort queue, or control message queue) for service by a MUX function.

A MUX header 1652 is attached to each LL PDU 1640. An example MUX header 1652 may comprise a length and a type (the header 1652 is two bytes in this example). A similar header may be formed for each control PDU (i.e. LLC and RLC PDUs). The LL PDU 1640 (or LLC or RLC PDU) forms the payload 1654. The header 1652 and payload 1654 form the MUX sublayer PDU (MPDU) 1650 (MUX sublayer PDUs are also referred to herein as MUX PDUs).

Communication resources on the shared medium are allocated by the MAC protocol in a series of TDD MAC frame intervals, in this example. In alternate embodiments, examples of which are detailed further below, these type of TDD MAC frame intervals may be interspersed with various other MAC functions, including contention based or polled, and including interfacing with legacy systems using other types of access protocols. As described above, a scheduler may determine the size of physical layer bursts allocated for one or more MAC IDs in each TDD MAC frame interval (analogous to consolidated polled TXOPs). Note that not every MAC ID with data to be transmitted will necessarily be allocated space in any particular TDD MAC frame interval. Any access control or scheduling scheme may be deployed within the scope of the present invention. When an allocation is made for a MAC ID, a respective MUX function for that MAC ID will form a MAC PDU 1660, including one or more MUX PDUs 1650 for inclusion in the TDD MAC frame interval. One or more MUX PDUs 1660, for one or more allocated MAC IDs will be included in a TDD MAC frame interval (i.e. TDD MAC frame interval 1500, detailed with respect to FIG. 15, above).

In an example embodiment, one aspect allows for a partial MPDU 1650 to be transmitted, allowing for efficient packing in a MAC PDU 1660. In this example, the untransmitted bytes of any partial MPDUs 1650 left over from a previous transmission may be included, identified by partial MPDU 1664. These bytes 1664 will be transmitted ahead of any new PDUs 1666 (i.e. LL PDUs or control PDUs) in the current frame. Header 1662 (two bytes in this example) includes a MUX pointer, which points to the start of the first new MPDU (MPDU 1666A in this example) to be transmitted in the current frame. Header 1662 may also include a MAC address.

The MAC PDU 1660 comprises the MUX pointer 1662, a possible partial MUX PDU 1664 at the start (left over from a previous allocation), followed by zero or more complete MUX PDUs 1666A-N, and a possible partial MUX PDU 1668 (from the current allocation) or other padding, to fill the allocated portion of the physical layer burst. The MAC PDU 1660 is carried in the physical layer burst allocated to the MAC ID.

Thus, the example MAC PDU 1660 illustrates a transmission (or frame, in 802.11 terminology), that may be transmitted from one STA to another, including portions of data from one or more flows directed to that destination STA. Efficient packing is achieved with the optional use of partial MUX PDUs. Each MAC PDU may be transmitted in a TXOP (using 802.11 terminology), at a time indicated in the consolidated poll included in the CCH.

The example embodiment detailed in FIGS. 15-16 illustrates various aspects, including consolidated polls, reduced preamble transmission, and elimination of gaps by sequentially transmitting physical layer bursts from each STA (including the AP). These aspects are applicable to any MAC protocol, including 802.11 systems. Detailed further below are alternate embodiments illustrating various other techniques for achieving MAC efficiency, as well as supporting peer-to-peer transmission, and integrating with and/or cooperating with existing legacy protocols or systems.

As described above, various embodiments detailed herein may employ channel estimation and tight rate control. Enhanced MAC efficiency may be gained through minimizing unnecessary transmission on the medium, but inadequate rate control feedback may, in some cases, reduce the overall throughput. Thus, sufficient opportunities may be provided for channel estimation and feedback to maximize the transmitted rate on all MIMO modes, in order to prevent the loss of throughput due to inadequate channel estimation, which may offset any MAC efficiency gains. Therefore, as described above, and detailed further below, example MAC embodiments may be designed to provide sufficient preamble transmission opportunities, as well opportunities for receivers to provide rate control feedback to the transmitter.

In one example, the AP periodically intersperses MIMO pilot in its transmissions (at least every TP ms, where TP may be a fixed or variable parameter). Each STA may also begin its polled TXOP with a MIMO pilot that may be used by other STAs and the AP to estimate the channel. For the case of a transmission to the AP or to another STA using the Direct Link Protocol (detailed further below), the MIMO pilot may be a steered reference to help simplify receiver processing at the destination STA.

The AP may also provide opportunities to the destination STA to provide ACK feedback. The destination STA may also use these feedback opportunities to provide rate control feedback for available MIMO modes to the transmitting STA. Such rate control feedback is not defined in legacy 802.11 systems, including 802.11(e). The introduction of MIMO may increase the total amount of rate control information (per MIMO mode). In some instances, to maximize the benefit of improvements in MAC efficiency, these may be complemented by tight rate control feedback.

Another aspect introduced here, and detailed further below, is backlog information and scheduling for STAs. Each STA may begin its TXOP with a preamble followed by a requested duration of the next TXOP. This information is destined for the AP. The AP collects information on the next requested TXOP from several different STAs and determines the allocation of duration on the medium of TXOPs for a subsequent TDD MAC frame interval. The AP may use different priority or QoS rules to determine how to share the medium, or it may use very simple rules to proportionally share the medium according to the requests from the STAs. Any other scheduling technique may also be deployed. The allocations for the TXOPs for the next TDD MAC frame interval are assigned in the subsequent control channel message from the AP.

Designated Access Point

In embodiments detailed herein, a network may support operation with or without a true access point. When a true AP is present, it may be connected, for example, to a wired fat pipe connection (i.e. cable, fiber, DSL or T1/T3, Ethernet) or a home entertainment server. In this case, the true AP may be the source and sink for the majority of data flowing between devices in the network.

When no true AP exists, stations may still communicate with one another using techniques like the Distributed Coordination Function (DCF) or 802.11b/g/a or the Enhanced Distributed Channel Access of 802.11e, as described above. As detailed further below, when additional resources are required, more efficient use of the medium may be accomplished with a centralized scheduling scheme. This network architecture might arise, for example, in a home where many different devices need to communicate with one another (i.e. DVD-TV, CD-Amp-Speakers, etc.). In this case, the network stations automatically designate one station to become the AP. Note that, as detailed below, an Adaptive Coordination Function (ACF) may be utilized with a designated access point, and may be deployed with centralized scheduling, random access, ad-hoc communication, or any combination thereof.

Certain, but not necessarily all, non-AP devices may have enhanced MAC capability and are suitable for operation as a designated AP. It should be noted that not all devices need to be designed to be capable of designated AP MAC capability. When QoS (e.g., guaranteed latency), high throughput, and/or efficiency is critical, it may be necessary that one of the devices in the network be capable of designated AP operation.

This means that designated AP capability will generally be associated with devices with higher capability, e.g., with one or more attributes such as line power, large number of antennas and/or transmit/receive chains, or high throughput requirement. (Additional factors for selecting a designated AP are detailed further below.) Thus, a low-end device such as a low-end camera or phone need not be burdened with designated AP capability, while a high-end device such as high-end video source or a high definition video display may be equipped with designated AP capability.

In a no-AP network, the designated AP assumes the role of the true AP and may or may not have reduced functionality. In various embodiments, a designated AP may perform the following: (a) establish the network Basic Service Set (BSS) ID; (b) set network timing by transmitting a beacon and broadcast channel (BCH) network configuration information (the BCH may define composition of the medium until the next BCH); (c) manage connections by scheduling transmissions of stations on the network using a Forward Control Channel (FCCH); (d) manage association; (e) provide admission control for QoS flows; and/or (f) various other functions. The designate AP may implement a sophisticated scheduler, or any type of scheduling algorithm. A simple scheduler may be deployed, an example of which is detailed further below.

A modified Physical Layer Convergence Protocol (PLCP) header is detailed below with respect to peer-peer communications, that is also applicable for designated APs. In one embodiment, the PLCP header of all transmissions is transmitted at the basic data rate that can be decoded by all stations (including the designated AP). The PLCP header of transmissions from stations contains data backlog at the station associated with a given priority or flow. Alternately, it contains a request for duration of a subsequent transmission opportunity for a given priority or a flow.

The designated AP may determine backlog or transmission opportunity durations requested by the stations by "snooping" in the PLCP Headers of all station transmissions. The designated AP may determine the fraction of time to be allocated to EDCA-based (distributed access) and the fraction of time allocated to contention-free polled (centralized) access based on load, collisions, or other congestion measures. The designated AP may run a rudimentary scheduler that allocates bandwidth in proportion to the requests and schedules them in the contention-free period. Enhanced schedulers are permitted but not mandated. The scheduled transmissions may be announced by the designated AP on the CCH (control channel).

A designated AP may not be required to echo one station's transmission to another station (i.e. serve as a hop point), although this functionality is allowed. A true AP may be capable of echoing.

When selecting a designated access point, a hierarchy may be created to determine which device should serve as access point. Example factors that may be incorporated in selecting a designated access point include the following: (a) user over-ride; (b) higher preference level; (c) security level; (d) capability: line power; (e) capability: number of antennas; (f) capability: max transmit power; (g) to break a tie based on other factors: Medium Access Control (MAC) address; (h) first device powered on; (i) any other factors.

In practice, it may be desirable for the designated AP to be centrally located and have the best aggregate Rx SNR CDF (i.e. be able to receive all stations with a good SNR). In general, the more antennas a station has, the better the receive sensitivity. In addition, the designated AP may have a higher transmit power so that the designated AP may be heard by a large number of stations. These attributes can be assessed and exploited to allow the network to dynamically reconfigure as stations are added and/or moved around.

Peer-to-peer connections may be supported in cases where the network is configured with a true AP or a designated AP. Peer-to-peer connections, in general, are detailed in the next section below. In one embodiment, two types of peer-to-peer connections may be supported: (a) managed peer-to-peer, where the AP schedules transmissions for each station involved; and (b) ad-hoc, where the AP is not involved in the management or scheduling of station transmissions.

The designated AP may set the MAC frame interval and transmit a beacon at the start of the frame. The broadcast and control channels may specify allocated durations in the frame for the stations to transmit. For stations that have requested allocations for peer-to-peer transmissions (and these requests are known to the AP), the AP may provide scheduled allocations. The AP may announce these allocations in the control channel, such as, for example, with every MAC frame.

Optionally, the AP may also include an A-TCH (ad hoc) segment in the MAC frame (detailed further below). The presence of the A-TCH in the MAC frame may be indicated in the BCH and FCCH. During the A-TCH, stations may conduct peer-to-peer communication using CSMA/CA procedures. The CSMA/CA procedures of the IEEE Wireless LAN Standard 802.11 may be modified to exclude the requirement for immediate ACK. A station may transmit a MAC-PDU (Protocol Data Unit) consisting of multiple LLC-PDUs when the station seizes the channel. The maximum duration that may be occupied by a station in the A-TCH may be indicated in the BCH. For acknowledged LLC, the window size and maximum acknowledgment delay may be negotiated according to the required application delay. A modified MAC frame with an A-TCH segment, for use with both true APs and designated APs, is detailed further below with respect to FIG. 20.

In one embodiment, the unsteered MIMO pilot may enable all stations to learn the channel between themselves and the transmitting station. This may be useful in some scenarios. Further, the designated AP may use the unsteered MIMO pilot to allow channel estimation and facilitate demodulation of the PCCH from which allocations can be derived. Once the designated AP receives all requested allocations in a given MAC frame, it may schedule these for the subsequent MAC frame. Note that rate control information does not have to be included in the FCCH.

In one embodiment, the scheduler may perform the following operations: First, the scheduler collects all the requested allocations for the next MAC frame and computes the aggregate requested allocation (Total Requested). Second, the scheduler computes the total resource available for allocation to the F-TCH and the R-TCH (Total Available). Third, if Total Requested exceeds Total Available, all requested allocations are scaled by the ratio defined by Total Available/Total Requested. Fourth, for any scaled allocations that are less than 12 OFDM symbols, these allocations are increased to 12 OFDM symbols (in the example embodiment; alternate embodiments may be deployed with alternate parameters). Fifth, to accommodate the resulting allocations in the F-TCH+R-TCH, any excess OFDM symbols and/or guard times may be accommodated by reducing all allocations larger than 12 OFDM symbols, one symbol at a time in round-robin fashion starting from the largest.

An example illustrates the embodiment just described. Consider allocation requests as follows: 20, 40, 12, 48. Thus, Total Requested=120. Assume that Total Available=90. Also assume that the guard time required is 0.2 OFDM symbols. Then, as detailed in the third operation above, the scaled allocations are: 15, 30, 9, 36. As detailed in the fourth operation above, an allocation of 9 is increased to 12. According to the fifth operation, adding the revised allocations and the guard time, the total allocation is 93.8. This means that the allocations are to be reduced by 4 symbols. By starting with the largest, and removing one symbol at a time, a final allocation of 14, 29, 12, 34 is determined (i.e. a total of 89 symbols and 0.8 symbols for guard times).

In an example embodiment, when the designated AP is present, it may establish the Beacon for the BSS and set network timing. Devices associate with the designated AP. When two devices associated with a designated AP require a QoS connection, e.g. a HDTV link with low latency and high throughput requirement, they provide the traffic specification to the designated AP for admission control. The designated AP may admit or deny the connection request.

If the medium utilization is sufficiently low, the entire duration of the medium between beacons may be set aside for EDCA operation using CSMA/CA. If the EDCA operation is running smoothly, e.g., there are no excessive collisions, back-offs and delays, the designated AP does not need to provide a coordination function.

The designated AP may continue to monitor the medium utilization by listening to the PLCP headers of station transmissions. Based on observing the medium, as well as the backlog or transmission opportunity duration requests, the designated AP may determine when EDCA operation is not satisfying the required QoS of admitted flows. For example it may observe the trends in the reported backlogs or requested durations, and compare them against the expected values based on the admitted flows.

When the Designated AP determines that the required QoS is not being met under distributed access, it can transition operation on the medium to operation with polling and scheduling. The latter provides more deterministic latency and higher throughput efficiency. Examples of such operation are detailed further below.

Thus, adaptive transition from EDCA (distributed access scheme) to scheduled (centralized) operation as a function of the observation of the medium utilization, collisions, congestion, as well as, observation of the transmission opportunity requests from transmitting stations and comparison of the requests against admitted QoS flows may be deployed.

As mentioned previously, in any embodiment detailed throughout this specification, where an access point is described, one of skill in the art will recognize that the embodiment may be adapted to operate with a true access point or a designated access point. A designated access point may also be deployed and/or selected as detailed herein, and may operate according to any protocol, including protocols not described in this specification, or any combination of protocols.

Peer-to-Peer Transmission and Direct Link Protocol (DLP)

Figure 17:
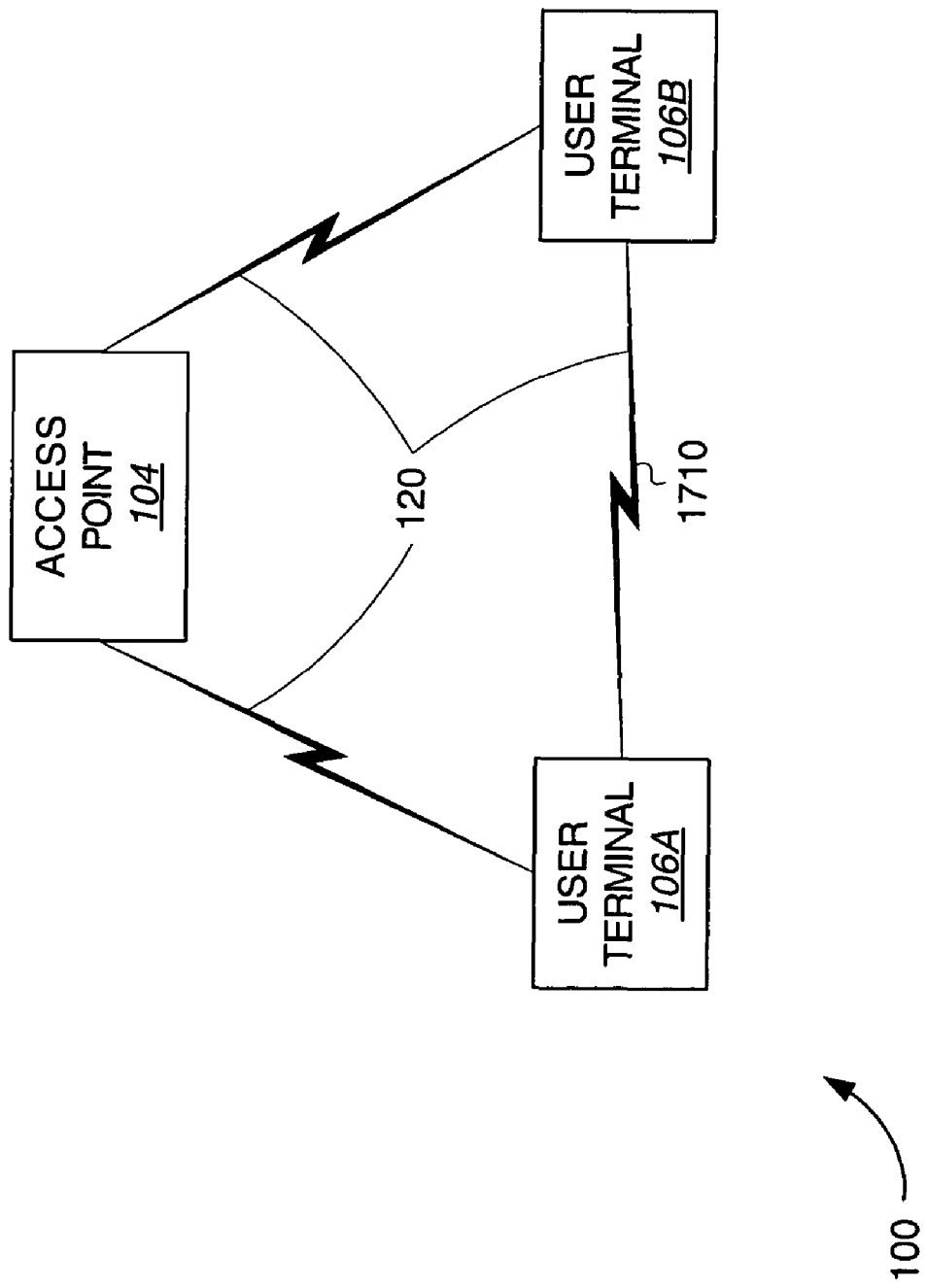
FIG. 17 depicts an example peer-to-peer communication.

As described above, peer-to-peer (or simply referred to as "peer-peer") transmission allows one STA to transmit data directly to another STA, without sending the data first to an AP. Various aspects detailed herein may be adopted for use with peer-to-peer transmission. In one embodiment, the Direct Link Protocol (DLP) may be adapted as detailed further below. FIG. 17 depicts an example peer-to-peer communication within a system 100. In this example, system 100, which may be similar to system 100 depicted in FIG. 1, is adapted to allow direct transmission from one UT to another (in this example, transmission between UT 106A and UT 106B is illustrated). UTs 106 may perform any communication directly with AP 104 on WLAN 120, as detailed herein.

Figure 25:
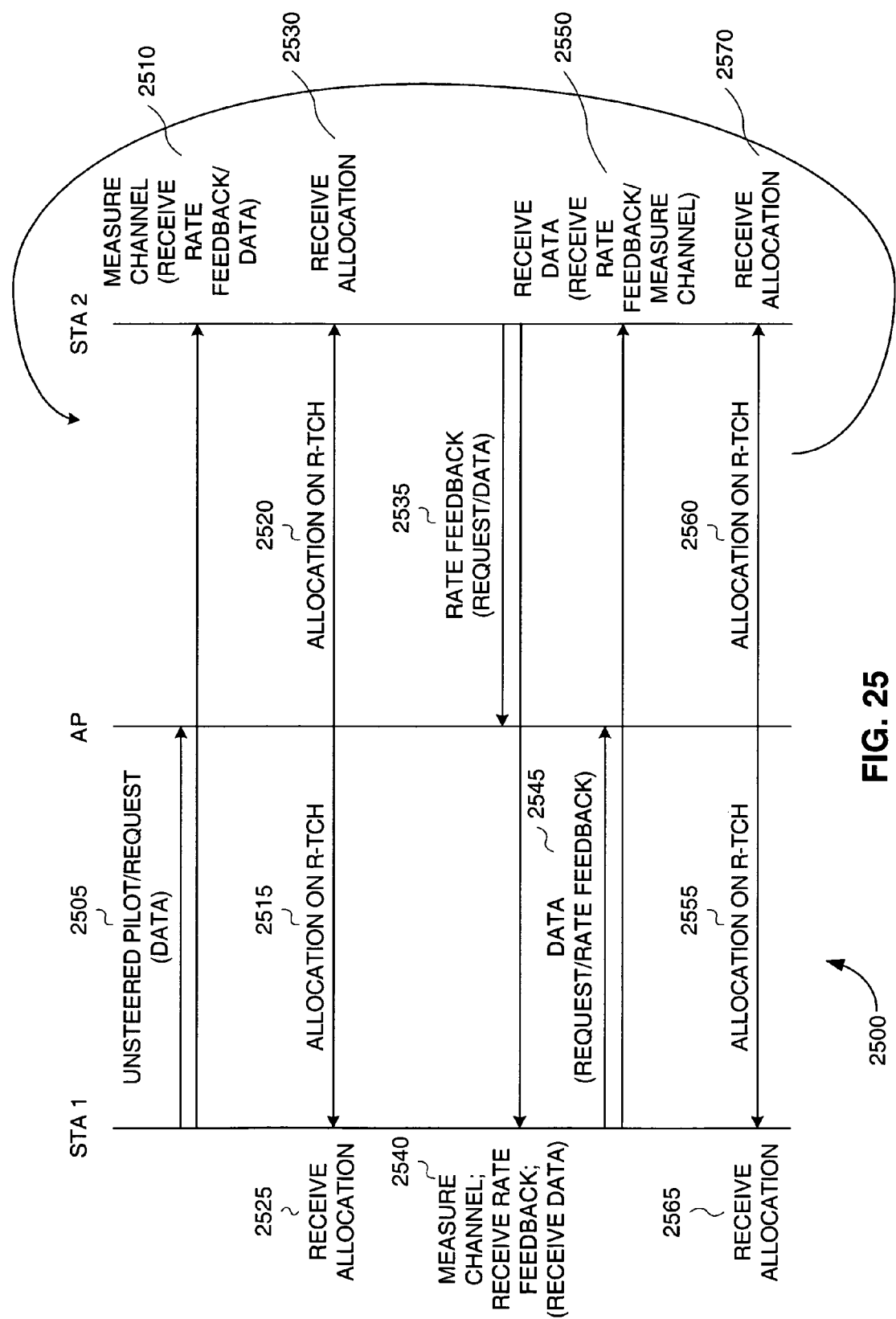
FIG. 25 illustrates managed peer-peer connection between two stations and an access point.

In various example embodiments, two types of peer-peer connections may be supported: (a) Managed peer-peer, in which the AP schedules transmissions for each STA involved, and (b) Ad-hoc, in which the AP is not involved in the management or scheduling of STA transmissions. An embodiment may include either or both types of connections. In an example embodiment, a transmitted signal may comprise a portion including common information that is receivable by one or more stations, possibly including an access point, as well as information specifically formatted for reception by a peer-peer receiving station. The common information may be used for scheduling (as shown in FIG. 25, for example) or for contention backoff by various neighbor stations (shown in FIG. 26, for example).

Various example embodiments, detailed below, illustrate closed loop rate control for peer-peer connections. Such rate control may be deployed to take advantage of available high data rates.

For clarity of discussion, various features (i.e. acknowledgement) are not necessarily detailed in example embodiments. Those of skill in the art will recognize that features disclosed herein may be combined to form any number of sets and subsets in various embodiments.

Figure 18:
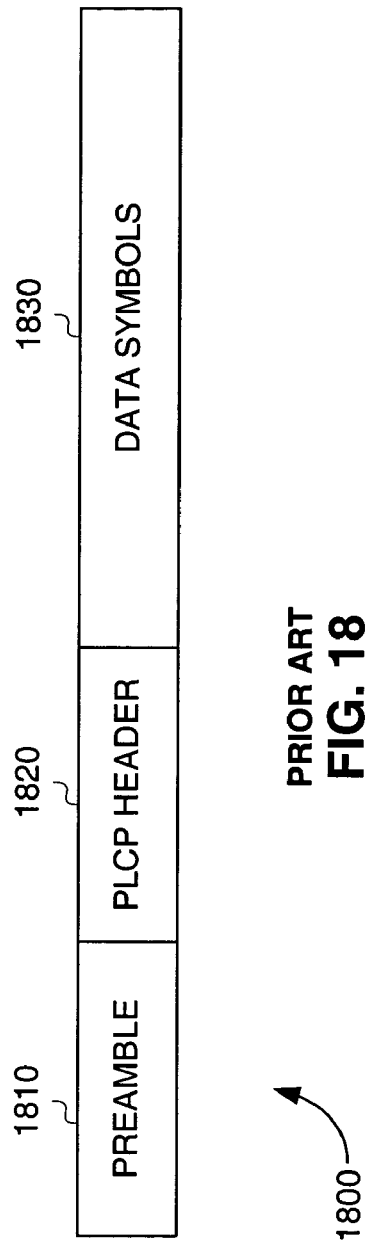
FIG. 18 depicts a prior art physical layer burst.

FIG. 18 depicts a prior art physical layer burst 1800. A preamble 1810 may be transmitted, followed by a Physical Layer Convergence Protocol Header (PLCP) header 1820. Legacy 802.11 systems define a PLCP header to include rate type and modulation format for data transmitted as data symbols 1830.

Figure 19:
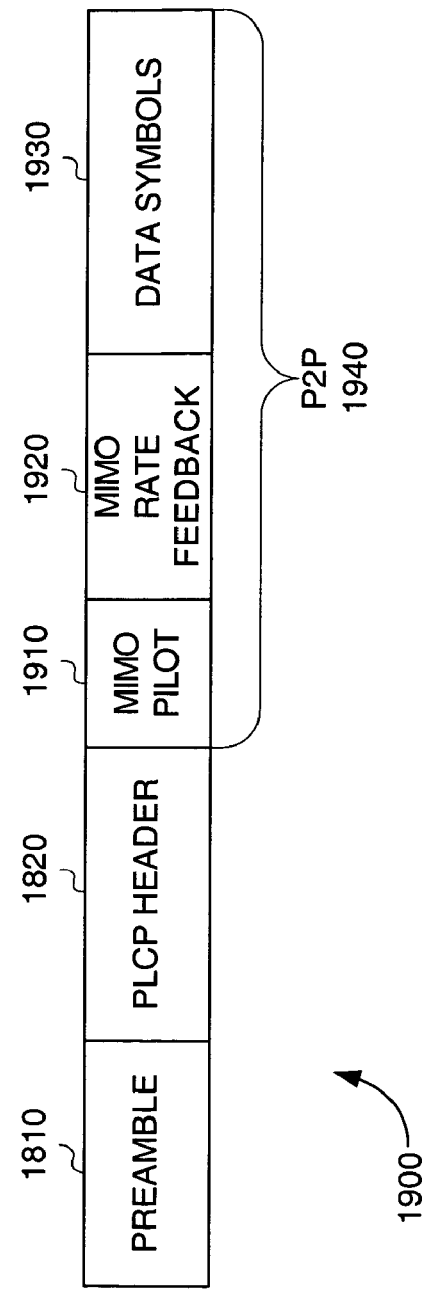
FIG. 19 depicts an example physical layer burst, which may be deployed for peer-peer transmission.

FIG. 19 depicts an example physical layer burst 1900, which may be deployed for peer-peer transmission. As in FIG. 18, preamble 1810 and PLCP header 1820 may be included, followed by a peer-peer transmission, labeled P2P 1940. P2P 1940 may comprise a MIMO pilot 1910 for use by the receiving UT. MIMO rate feedback 1920 may be included for use by the receiving UT in future transmission back to the sending UT. Rate feedback may be generated in response to a previous transmission from the receiving station to the transmitting station. Then data symbols 1930 may be transmitted according to the selected rate and modulation format for the peer-peer connection. Note that a physical layer burst, such as PHY burst 1900, may be used with AP managed peer-peer connection, as well as with ad hoc peer-peer transmission. Example rate feedback embodiments are described below. Alternate embodiments of physical layer transmission bursts including these aspects are also included below.

In an example embodiment, an AP sets the TDD MAC frame interval. Broadcast and control channels may be deployed to specify allocated durations in the TDD MAC frame interval. For STAs that have requested allocations for peer-peer transmissions (and known to the AP), the AP may provide scheduled allocations and announce these in the control channel every TDD MAC frame interval. An example system is described above with respect to FIG. 15.

Figure 20:
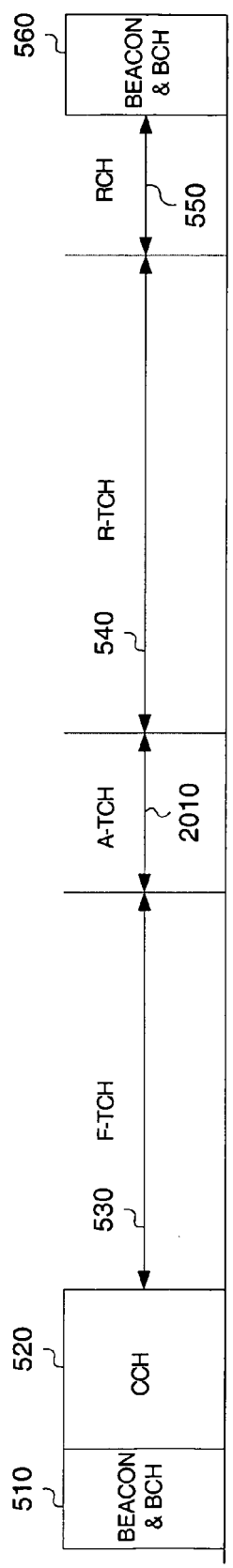
FIG. 20 depicts an example embodiment of a MAC frame including an optional ad hoc segment.

FIG. 20 depicts an example embodiment of a TDD MAC frame interval 2000 including an optional ad hoc segment, identified as A-TCH 2010. The like numbered sections of TDD MAC frame interval 2000 may be included an operate substantially as described above with respect to FIG. 15. The presence of the A-TCH 2010 in the TDD MAC frame interval 2000 may be indicated in the BCH 510 and/or CCH 520. During the A-TCH 2010, STAs may conduct peer-to-peer communication using any contention procedure. For example, 802.11 techniques such as SIFS, DIFS, backoff, etc., as detailed above may be deployed. QoS techniques, such as those introduced in 802.11(e) (i.e. AIFS) may optionally be deployed. Various other contention based schemes may be deployed as well.

In an example embodiment, CSMA/CA procedures for contention, such as those defined in 802.11, may be modified as follows. Immediate ACK is not required. A STA may transmit a MAC Protocol Data Unit (MAC-PDU) consisting of multiple PDUs (i.e. LLC-PDUs) when it seizes the channel. A maximum duration occupied by a STA in the A-TCH may be indicated in the BCH. When acknowledged transmission is desired, a window size and maximum acknowledgment delay may be negotiated according to the required application delay.

In this example, the F-TCH 530 is the portion of the TDD MAC frame interval for transmissions from the AP to STAs. Peer-to-peer communications between STAs using contention techniques may be conducted in the A-TCH 2010. Scheduled peer-to-peer communications between STAs may be conducted in the R-TCH 540. Any of these three segments may be set to null.

Figure 21:
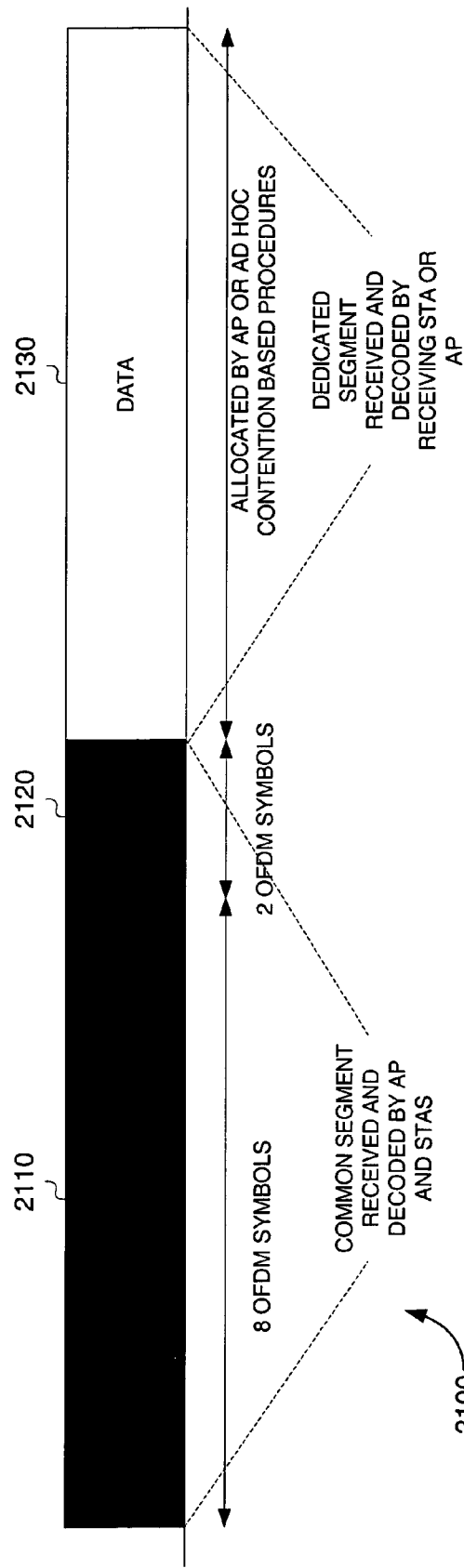
FIG. 21 depicts an example physical layer burst.

FIG. 21 depicts an example physical layer burst 2100, also referred to as a "PHY burst". PHY burst 2100 may be deployed with scheduled peer-peer connections, such as during R-TCH 540, or during ad hoc connections such as A-TCH 2010, as detailed above with respect to FIG. 20. PHY burst 2100 comprises un-steered MIMO pilot 2110, Peer Common Control Channel (PCCH) 2120, and one or more data symbols 2130. The unsteered MIMO pilot 2110 may be received at one or more stations, and may be used as a reference by a receiving station to estimate the respective channel between the transmitting station and the receiving station. This example PCCH comprises the following fields: (a) a destination MAC-ID, (b) an allocation request for a desired transmission duration for the next TDD MAC frame interval, (c) a transmission rate indicator to indicate the transmission format for the current data packet, (d) a control channel (i.e. CCH) subchannel for receiving any allocation from the AP, and (e) a CRC. The PCCH 2120, along with un-steered MIMO pilot 2110, is a common segment that may be received by various listening stations, including the access point. A request for allocation may be inserted in the PCCH to allow for a managed peer-peer connection in a future TDD MAC frame interval. Such a PHY burst may be included in an ad-hoc connection, and may still request an allocation for scheduled peer to peer in a future TDD MAC frame interval. In the example embodiment, the unsteered MIMO pilot is eight OFDM symbols (in alternate embodiments, detailed below, fewer symbols may be sufficient for channel estimation) and the PCCH is two OFDM symbols. Following the common segment, comprising unsteered MIMO pilot 2110 and PCCH 2120, one or more data symbols 2130 are transmitted using spatial multiplexing and/or higher modulation formats as determined by each STA in the peer-peer connection. This portion of the transmission is coded according to rate control information embedded in the data portion of the transmission. Thus, a portion of the PHY burst 2100 is receivable by multiple surrounding stations, while the actual data transmission is tailored for efficient transmission to one or more specific peer-peer connected stations or the AP. Data at 2130 may be transmitted as allocated by an access point, or may be transmitted in accordance with an ad-hoc connection (i.e. CSMA/CA contention based procedures).

An example embodiment of a PHY burst comprises a preamble consisting of 8 OFDM symbols of un-steered MIMO reference. A Peer Common Control Channel (PCCH) MAC-PDU header is included in the subsequent 2 OFDM symbols, using STTD mode, encoded with R=1/2 BPSK. The MAC-ID is 12 bits. An 8-bit allocation request is included for reception by the AP for a desired duration in the next TDD MAC frame interval (thus the maximum request is 256 short OFDM symbols). The TX Rate is 16 bits to indicate the rate being used in the current packet. The FCCH subchannel preference is two bits, corresponding to a preference between up to four subchannels, on which the AP should make any applicable allocation. The CRC is 10 bits. Any number of other fields and/or field sizes may be included in an alternate PHY burst embodiment.

In this example, the remainder of the MAC-PDU transmission uses spatial multiplexing and higher modulations as determined by each STA in the peer-peer connection. This portion of the transmission is coded according to the rate control information embedded in the data portion of the transmission.

Figure 22:
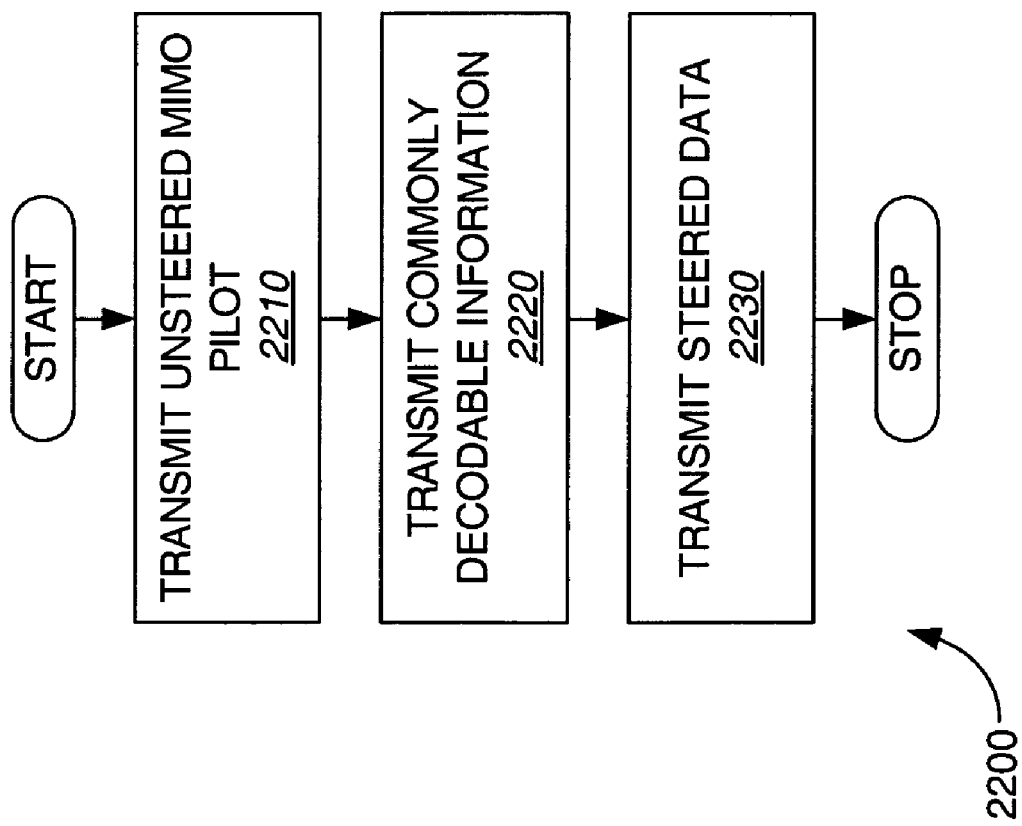
FIG. 22 depicts an example method for peer-peer data transmission.

FIG. 22 depicts example method 2200 for peer-peer data transmission. The process begins in block 2210 where a station transmits an unsteered MIMO pilot. In block 2220, the station transmits commonly decodable information. For example, unsteered MIMO pilot 2110 and PCCH 2120 serve as an example of a mechanism for requesting allocation in a managed connection, for which the AP, or other scheduling station, would need to be able to decode the portion of the signal comprising the request. Those of skill in the art will recognize myriad alternate request mechanisms for scheduling peer-peer connections on a shared channel. In block 2230, data is transmitted from one station to another in accordance with negotiated transmission formats. In this example, steered data is transmitted using rates and parameters as determined in accordance with measurements of unsteered MIMO pilot 2110. Those of skill in the art will recognize various alternate means for transmitting data tailored for a specific peer-peer channel.

Figure 23:
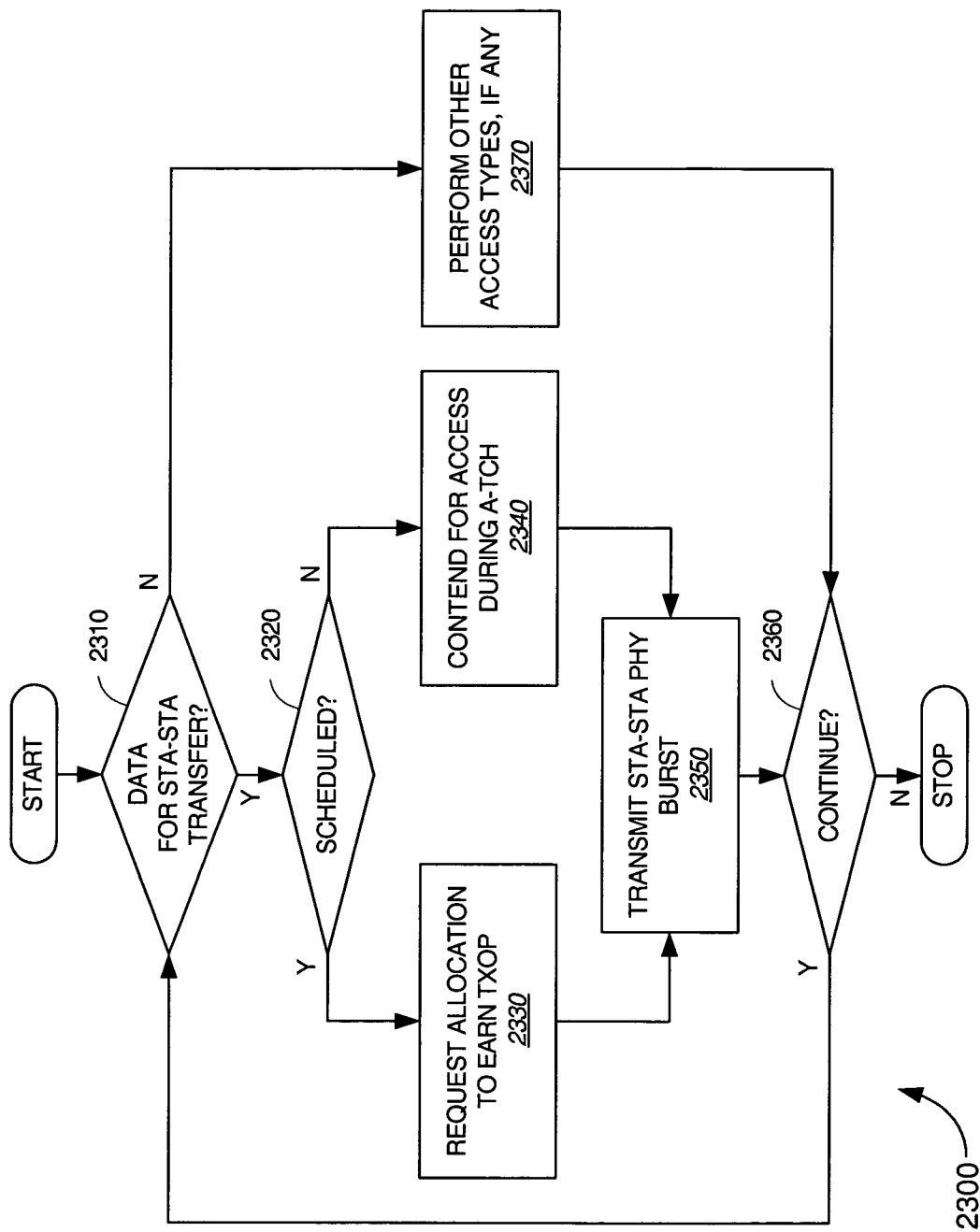
FIG. 23 depicts an example method for peer-peer communication.

FIG. 23 depicts example method 2300 for peer-peer communication. This example method 2300 illustrates several aspects, subsets of which may be deployed in any given embodiment. The process begins in decision block 2310. In decision block 2310, if there is data for STA-STA transfer, proceed to decision block 2320. If not, proceed to block 2370 and perform any other type of communication, including other access types, if any. Proceed to decision block 2360 where the process may repeat by returning to decision block 2310, or the process may stop.

In decision block 2320, if there is STA-STA data for transmission, determine whether the peer-peer connection is to be scheduled or ad hoc. If the transmission is to be scheduled proceed to block 2320 and request an allocation to earn a TXOP. Note that an allocation request may be made during a random access portion of a TDD MAC frame interval, as described above, or may be included in an ad hoc transmission. Once an allocation is made, in block 2350 a STA-STA physical burst may be transmitted. In an example embodiment, method 2200 may serve as one type of STA-STA PHY burst.

In decision block 2320, if scheduled peer-peer connection is not desired, proceed to block 2340 to contend for access. For example, the A-TCH 2010 segment of TDD MAC frame interval 2000 may be used. When an access has been earned successfully through contention proceed to block 2350 and transmit a STA-STA PHY burst, as described above.

From block 2350, proceed to decision block 2360 where the process may repeat, as described above, or may stop.

Figure 24:
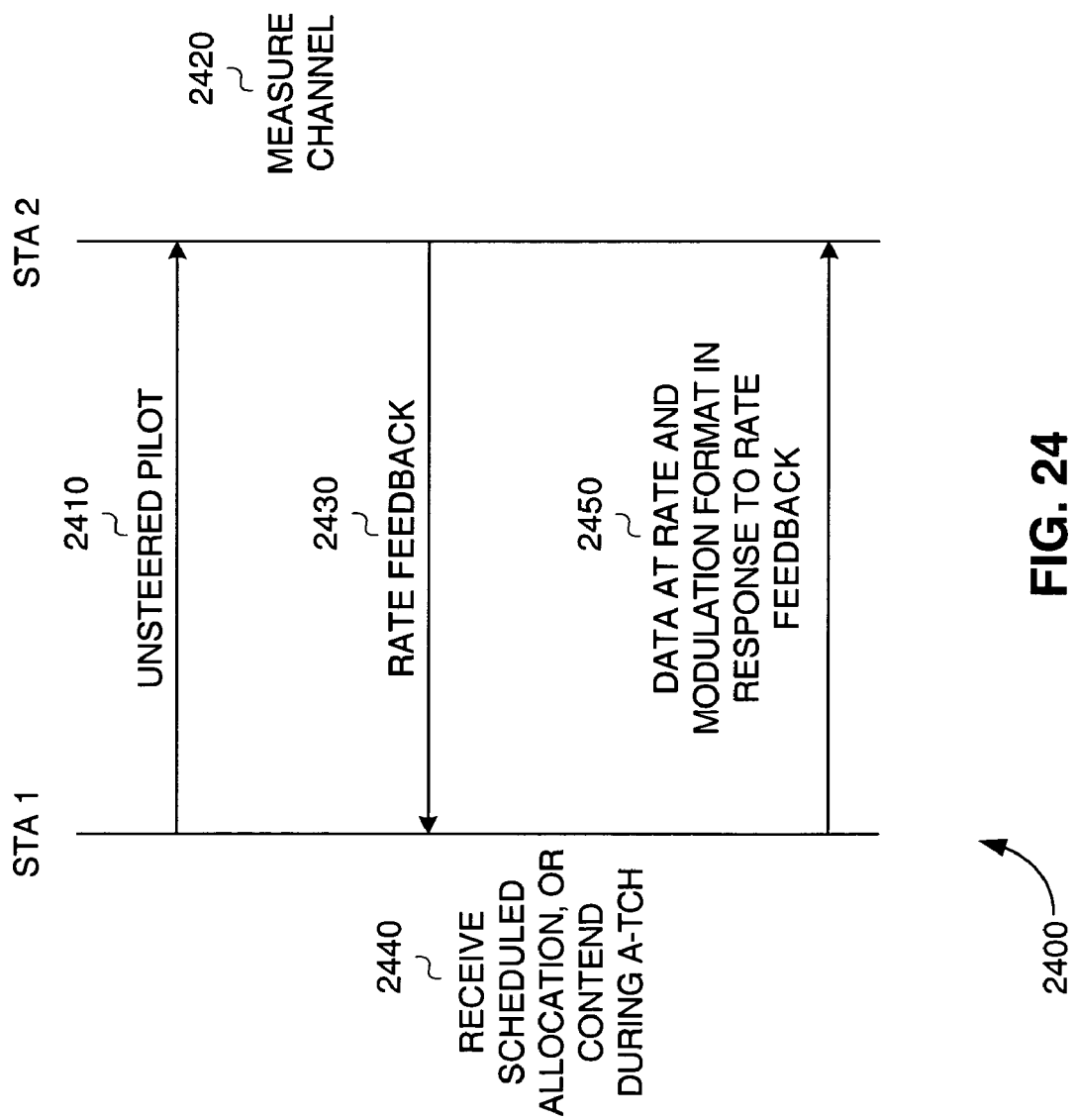
FIG. 24 depicts an example method for providing rate feedback for use in peer-peer connection.

FIG. 24 depicts example method 2400 for providing rate feedback for use in peer-peer connection. This FIG illustrates various transmissions and other steps that may be performed by two stations, STA 1 and STA 2. STA 1 transmits an unsteered pilot 2410 to STA 2. STA 2 measures the channel 2420 while receiving unsteered pilot 2410. In an example embodiment STA 2 determines a supportable rate for transmission on the channel as measured. This rate determination is transmitted as rate feedback 2430 to STA 1. In various alternate embodiments, alternate parameters may be delivered to allow for a rate feedback decision to be made at STA 1. At 2440, STA 1 receives a scheduled allocation or contends for a transmit opportunity, for example during A-TCH. Once a transmit opportunity has been earned, at 2450, STA 1 transmits to STA 2 data at a rate and modulation format determined in response to rate feedback 2430.

The method illustrated in FIG. 24 may be generalized and applied to various embodiments, as will be readily apparent to those with skill in the art. Some examples incorporating peer-peer rate feedback, as well as other aspects are detailed further below.

FIG. 25 depicts method 2500 illustrating managed peer-peer connection between two stations, STA 1 and STA 2, and an access point (AP). At 2505, STA 1 transmits an unsteered pilot as well as a request for an allocation. Data may also be transmitted according to an earlier allocation and previous rate feedback, as will be illustrated below. Further, any such data may be transmitted according to rate feedback from a previous managed peer-peer connection or from ad hoc communication originated by either STA 1 or STA 2. The unsteered pilot and request for transmission is received by both STA 2 and the access point (and may be receivable by various other stations in the area).

The access point receives the request for transmission and, in accordance with one of any number of scheduling algorithms, makes a determination of when and whether to make an allocation for the peer-peer communication. STA 2 measures the channel while the unsteered pilot in 2505 is transmitted and may make a determination about the supportable rate for peer-peer communication with STA 1. Optionally, STA 2 may also receive rate feedback and/or data from STA 1 in accordance with a previous transmission.

In this example, the access point has determined an allocation will be made for the requested transmission. At 2515 an allocation is transmitted from the access point to STA 1. In this example, allocations on the R-TCH 540, are transmitted during the control channel, such as CCH 520, illustrated above. Similarly at 2520 an allocation on the R-TCH is made for STA 2. At 2525, STA 1 receives the allocation from the access point. At 2530 STA 2 receives the allocation from the access point.

STA 2 transmits rate feedback at 2535, in accordance with allocation 2520. Optionally, a request for scheduled transmission may be included, as described above, as well as any data to be transmitted in accordance with a previous request. The rate feedback transmitted is selected in accordance with the channel measurement 2510, as described above. The PHY burst of 2535 may include an unsteered pilot as well. At 2540 STA 1 measures the channel from STA 2, receives the rate feedback, and may receive optional data as well.

At 2545, in accordance with allocation 2515, STA 1 transmits data in accordance with the rate feedback information received. In addition, a request may be made for a future allocation as well as rate feedback in accordance with the channel measurement at 2540. The data is transmitted according to the specific channel measurement for the peer-peer communication. At 2550 STA 2 receives the data as well as any optionally transmitted rate feedback. STA 2 may also measure the channel to provide rate feedback for future transmissions.

Note that both transmissions 2535 and 2545 are receivable by the access point, at least the unsteered portion, as described above. Thus for any included request, the access point may make additional allocations for future transmissions as indicated by allocations 2555 and 2560 to STA 1 and STA 2, respectively. At 2565 and 2570, STA 1 and STA 2 receive their respective allocations. The process may then iterate indefinitely with the access point managing access on the shared medium and STA 1 and STA 2 transmitting peer-peer communication directly to each other at rates and modulation formats selected as supportable on the peer-peer channel. Note that, in an alternate embodiment, ad hoc peer-peer communication may also be performed along with the managed peer-peer communication illustrated in FIG. 25.

Figure 26:
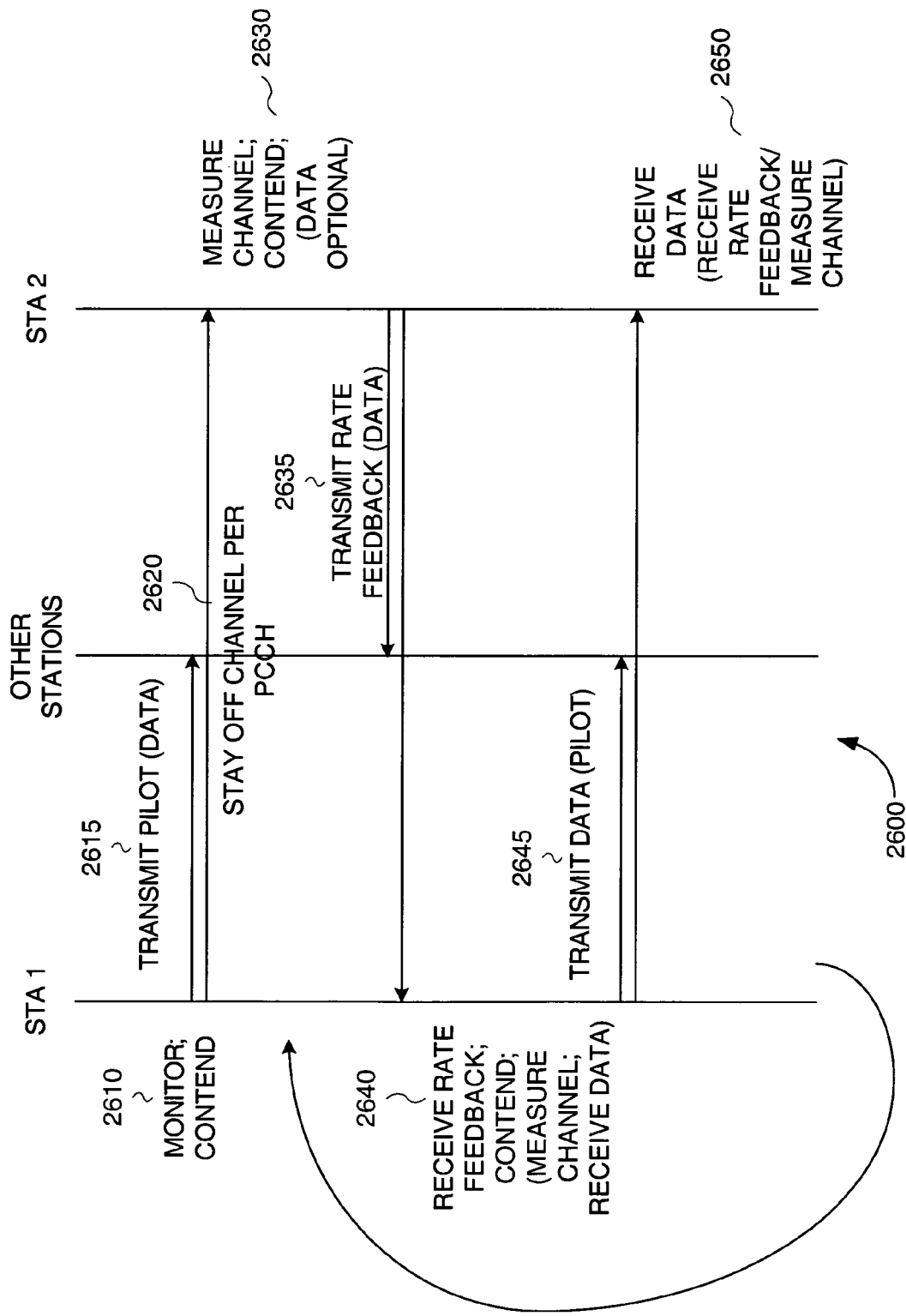
FIG. 26 illustrates a contention based (or ad hoc) peer-peer connection.

FIG. 26 illustrates a contention based (or ad hoc) peer-peer connection. STA 1 and STA 2 will communicate with each other. Other STAs may also be in receiving range and may access the shared channel. At 2610 STA 1, having data to transmit to STA 2, monitors the shared channel and contends for access. Once a transmit opportunity has been earned, peer-peer PHY burst 2615 is transmitted to STA 2 which may also be received by other STAs. At 2620, other STAs, monitoring the shared channel, may receive the transmission from STA 1 and know to avoid accessing the channel. For example, a PCCH, described above, may be included in the transmission 2615. At 2630, STA 2 measures the channel in accordance with an unsteered pilot, and contends for return access on the shared channel. STA 2 may also transmit data, as necessary. Note that contention time may vary. For example, an ACK may be returned following SIFS in a legacy 802.11 system. Since SIFS is highest priority, STA 2 may responds without losing the channel. Various embodiments may allow for less delay, and may provide for return data with high priority.

At 2635, STA 2 transmits rate feedback along with optional data to STA 1. At 2640, STA 1 receives the rate feedback, contends once more for access to the shared medium, and transmits at 2645 to STA 2 in accordance with the received rate feedback. At 2640, STA 1 may also measure the channel to provide rate feedback to STA 2 for future transmission, and may receive any optional data transmitted by STA 2. At 2650, STA 2 receives the data transmission 2645 in accordance with the rate and modulation format determined by the measured channel conditions. STA 2 may also receive rate feedback for use in returning a transmission to STA 1. STA 2 may also measure the channel to provide future rate feedback. The process may thus repeat by returning to 2635 for STA 2 to return rate feedback as well as data.

Thus, two stations may perform ad hoc communication in both directions by contending for access. The peer-peer connection itself is made efficient by use of rate feedback and tailoring the transmission to the receiving station. When a commonly receivable portion of the PHY burst, such as the PCCH, is deployed, then, as illustrated in 2620, other STAs may access the information and may avoid interfering on the channel at times known to be occupied, as indicated in the PCCH. As with FIG. 25, either managed or ad hoc peer-peer communication may initiate data transfer prior to the steps illustrated in FIG. 26, and may be used to continue peer-peer communication subsequently. Thus, any combination of scheduled and ad hoc peer-peer communication may be deployed.

Figure 27:
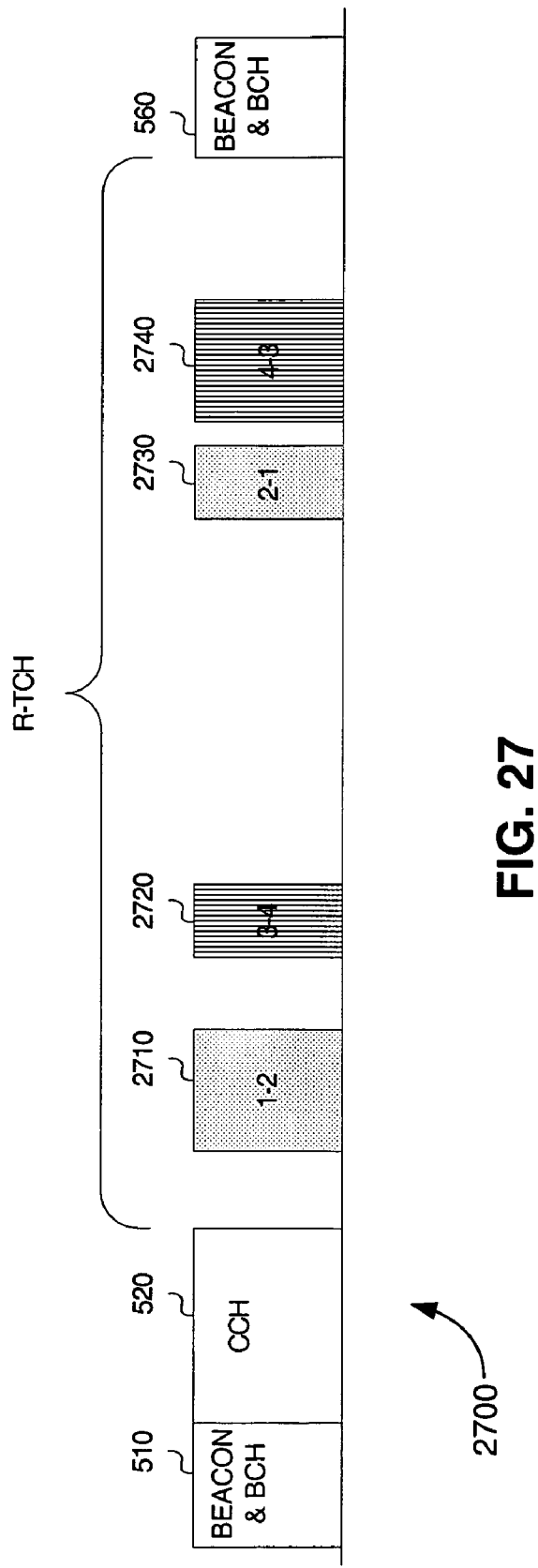
FIG. 27 depicts an example MAC frame illustrating managed peer-peer communication between stations.

FIG. 27 depicts example TDD MAC frame interval 2700, illustrating managed peer-peer communication between stations. In this example, both the F-TCH and the A-TCH durations have been set to zero. Beacon/BCH 510 and CCH 520 are transmitted as before. Beacon/BCH 560 indicates the start of the next frame. CCH 520 indicates allocations for peer-peer communications. In accordance with those allocations, STA 1 transmits to STA 2 in allocated burst 2710. Note that, in the same TDD MAC frame interval, STA 2 is allocated segment 2730 for responding to STA 1. Any of the various components, detailed above, such as rate feedback, requests, steered and/or unsteered pilots, and steered and/or unsteered data may be included in any given peer-peer PHY layer burst. STA 3 transmits to STA 4 in allocation 2720. STA 4 transmits to STA 3 in allocation 2740, in similar fashion. Various other reverse link transmissions, including non peer-peer connections, may be included in the R-TCH. Additional example embodiments illustrating these and other aspects are detailed further below.

Note that, in FIG. 27, guard intervals may be scheduled between segments, as necessary. A key issue regarding peer-peer communications is that generally the path delay between the two STAs is unknown. One method of handling this is to make each STA keep its transmit times fixed so that they arrive at the AP in synch with the AP's clock. In this case, the AP may provide for guard time on either side of each peer-to-peer allocation to compensate for unknown path delays between the two communicating STAs. In many cases, a cyclic prefix will be adequate and no adjustments will need to be made at the STA receivers. The STAs must then determine their respective time offsets to know when to receive the other STA's transmission. The STA receivers may need to maintain two receive clocks: one for the AP frame timing and another for the peer-peer connection.

As illustrated in various embodiments above, acknowledgments and channel feedback may be derived by a receiver during its allocation and fed back to a transmitter. Even if the overall traffic flow is one-way, the receiver sends reference and requests to obtain allocations. The AP scheduler ensures that adequate resources for feedback are provided.

Interoperability with Legacy Stations and Access Points

As detailed herein, various embodiments described provide improvements over legacy systems. Nonetheless, given the wide deployment of legacy systems already in existence, it may be desirable for a system to retain backward compatibility with either an existing legacy system and/or legacy user terminals. As used herein, the term "new class" will be used to differentiate from legacy systems. A new class system may incorporate one or more of the aspects or features detailed herein. An example new class system is the MIMO OFDM system described below with respect to FIGS. 35-52. Furthermore, the aspects detailed below for interoperating a new class system with a legacy system are also applicable to other systems, yet to be developed, whether or not any particular improvement detailed herein is included in such a system.

In one example embodiment, backward compatibility with alternate systems may be provided by using separate Frequency Assignments (FA) to allow the operation of a new class system on a separate FA from legacy users. Thus, a new class system may search for an available FA on which to operate. A Dynamic Frequency Selection (DFS) algorithm may be implemented in the new class WLAN to accommodate this. It may be desirable to deploy an AP to be multicarrier.

Legacy STAs attempting to access a WLAN may employ two methods of scanning: passive and active. With passive scanning, a STA develops a list of viable Basic Service Sets (BSSs) in its vicinity by scanning the operating bands. With active scanning, a STA transmits a query to solicit a response from other STAs in the BSS.

Legacy standards are silent as to how a STA decides which BSS to join, but, once a decision is made, association may be attempted. If unsuccessful, the STA will move through its BSS list until successful. A legacy STA may not attempt to associate with a new class WLAN when the beacon information transmitted would not be understood by that STA. However, a new class AP (as well as UTs) may ignore requests from legacy STAs as one method for maintaining a single WLAN class on a single FA.

An alternate technique is for new class AP or new class STAs to reject any legacy STA's request using valid legacy (i.e., 802.11) messaging. If a legacy system supports such messaging, the legacy STA may be provided with a redirection message.

An obvious tradeoff associated with operating on separate FAs is the additional spectrum required to support both classes of STAs. One benefit is ease of management of the different WLANs preserving features such as QoS and the like. As detailed throughout this specification, however, legacy CSMA MAC protocols (such as those detailed in the legacy 802.11 standards), are generally inefficient for high data rates supported for new class systems, such as the MIMO system embodiment detailed herein. Thus, it is desirable to deploy backward compatible modes of operation allowing a new class MAC to co-exist with a legacy MAC on the same FA. Described below are several example embodiments in which legacy and new class systems may share the same FA.

Figure 28:
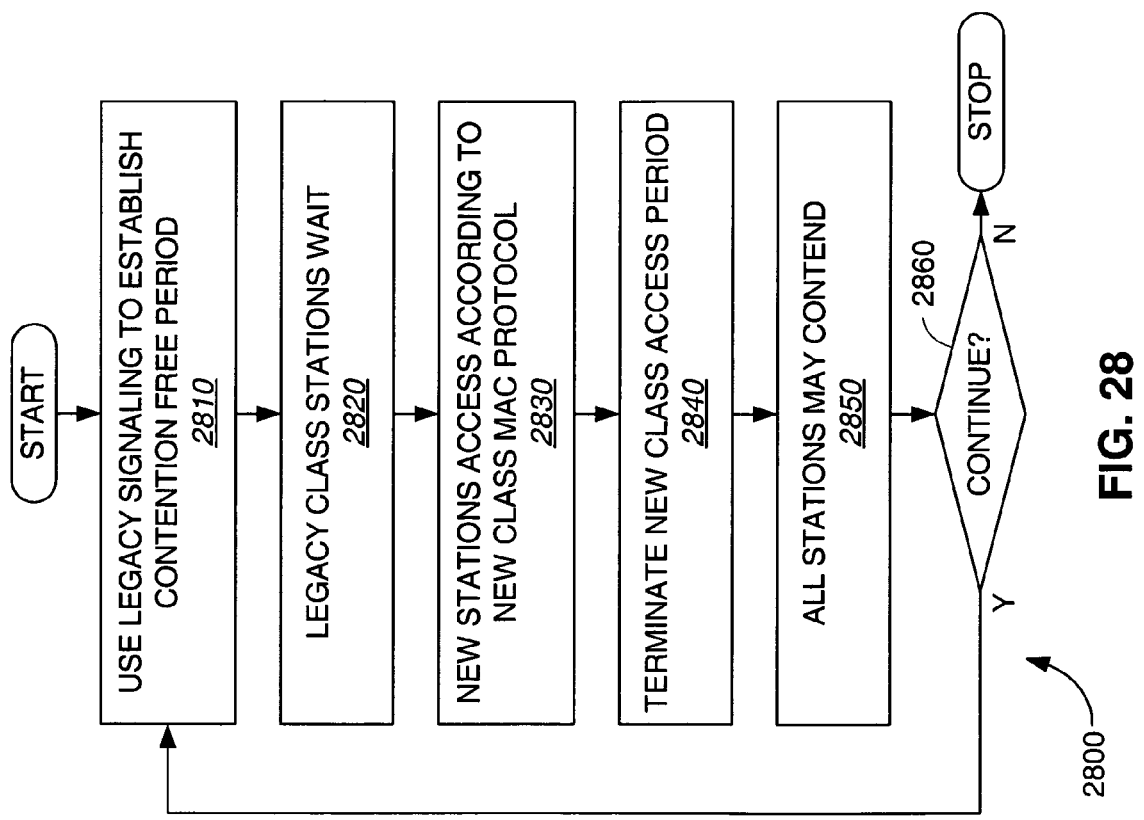
FIG. 28 illustrates supporting both legacy and new class stations on the same frequency assignment.

FIG. 28 depicts method 2800 for supporting both legacy and new class stations on the same frequency assignment. In this example, for clarity, it is assumed that the BSS is operating in isolation (i.e., there is no coordination between multiple overlapping BSSs). The process starts at block 2810 where legacy signaling is used to establish a contention free period.

Following are several illustrative examples, for use with legacy 802.11 systems, in which the new class WLAN AP may use the hooks built into the legacy 802.11 standard to reserve time for exclusive use by new class stations. Any number of additional signaling techniques, in addition to these, may be used for establishing a contention free period, for various types of legacy systems.

One technique is to establish contention free periods (CFP) in PCF/HCF mode. The AP may establish a Beacon interval and announce a contention free period within the Beacon interval where it can serve both new class and legacy STAs in polled mode. This causes all legacy STAs to set their Network Allocation Vectors (NAVs), which are counters used to keep track of the CFP, to the duration of the announced CFP. As a result, legacy STAs that receive the beacon are prevented from using the channel during the CFP, unless polled by the AP.

Another technique is to establish a CFP, and setting NAV, via an RTS/CTS and duration/ID field. In this case, the new class AP may send out a special RTS which has a Reserved Address (RA) indicating to all new class STAs that the AP is reserving the channel. Legacy STAs interpret the RA field as being directed to a specific STA and do not respond. The new class STAs respond with a special CTS to clear out the BSS for the time period specified in the duration/ID field in the CTS/RTS message pair. At this point, the new class stations are free to use the channel for the reserved duration without conflict.

In block 2820, legacy class STAs, having received the signal to establish the contention free period, wait until polled or the contention free period ends. Thus, the access point has successfully allocated the shared medium for use with the new class MAC protocol. In block 2830, new STAs may access according to this protocol. Any set or subset of the aspects detailed herein may be deployed in such a new class MAC protocol. For example, scheduled forward and reverse link transmissions as well as managed peer-peer transmissions, ad hoc or contention based communication (including peer-peer), or any combination of the above may be deployed. In block 2840, the new class access period is terminated, using any of a variety of signal types, which may vary according to the legacy system deployed. In the example embodiment, a contention free period end signal is transmitted. In an alternate embodiment, legacy STAs may also be polled during a contention free period. Such accesses may be subsequent to new class accesses, or may be interspersed within them.

In block 2850, all STAs may contend for access, if a contention period is defined for the legacy system. This allows legacy systems, not able to communicate during the contention free period, to make requests and/or attempt to transmit. In decision block 2860, the process may continue by returning to block 2810, or may stop.

Figure 29:
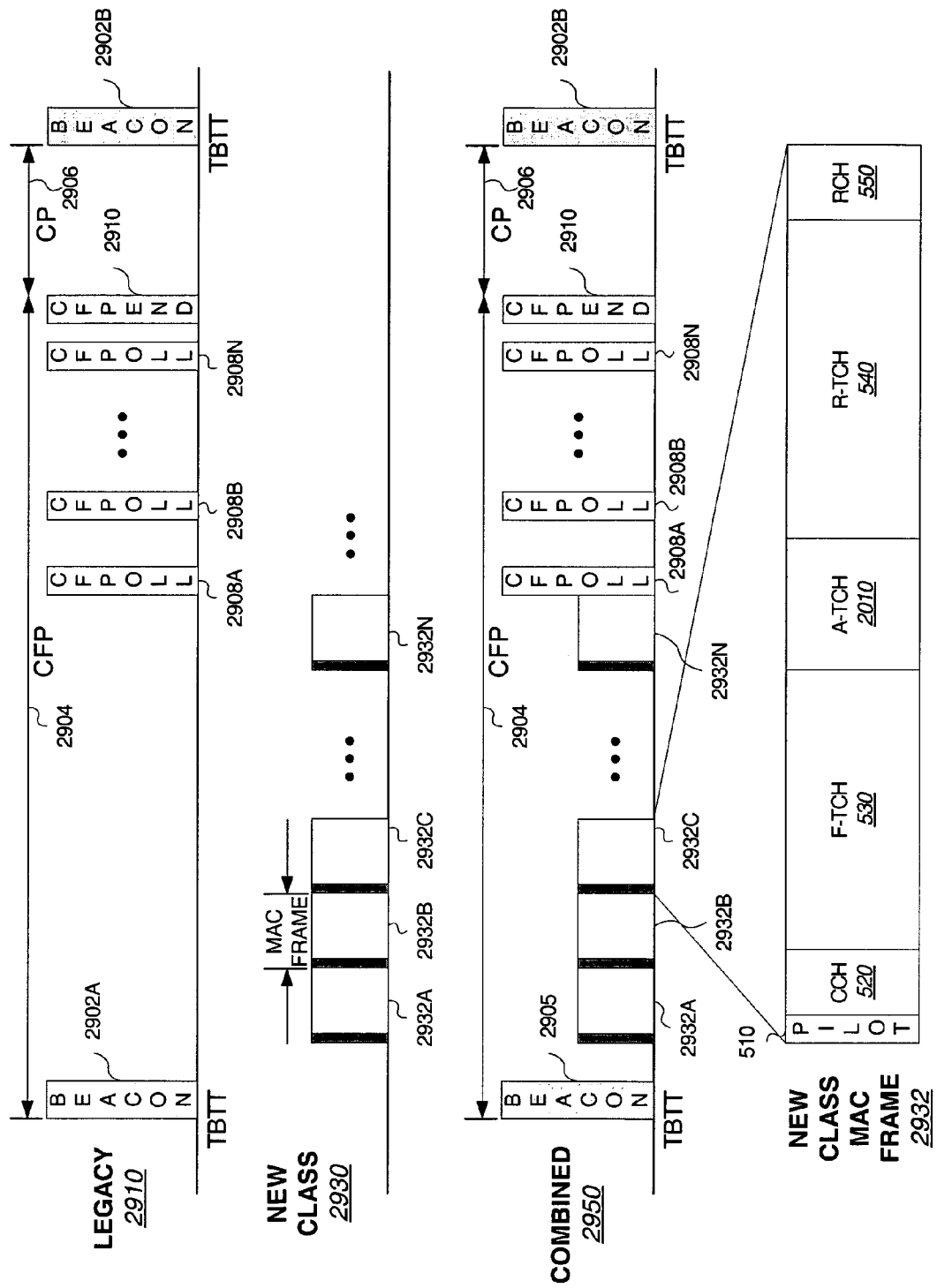
FIG. 29 illustrates the combination of legacy and new class media access control.

FIG. 29 illustrates the combination of legacy and new class media access control. A legacy MAC protocol 2910 is shown above a new class protocol 2930, which, when combined, form a MAC protocol such as combined MAC protocol 2950. In this example, 802.11 legacy signaling is used for illustration purposes. Those of skill in the art will realize the techniques disclosed herein may be applied to any of a variety of legacy systems, and any new class MAC protocol, including any combination of the features disclosed herein.

Legacy MAC protocol 2910 comprises beacons 2902, which identify the Beacon interval. The legacy Beacon interval comprises contention free period 2904 followed by contention period 2906. Various contention free polls 2908A-N may be generated during the contention free period 2904. The contention free period 2904 is terminated by contention free period end 2910. Each beacon 2902 is transmitted at Target Beacon Transmission Time (TBTT) in 802.11 example embodiments. New class MAC protocol 2930 comprises MAC frames 2932A-N.

The combined Beacon interval 2950 illustrates the interoperability of legacy and new class MAC protocols during the contention free period 2904. New class TDD MAC frame intervals 2932 are included followed by legacy polls CF poll 2908A-N. The contention free period terminates with CFPEND 2910, followed by a contention period 2906. New class TDD MAC frame intervals 2932 may be any type optionally including various aspects detailed herein. In an example embodiment, new class TDD MAC frame interval 2932 comprises various segments such as those illustrated with respect to FIG. 20 above. Thus, a new class TDD MAC frame interval, in this example, comprises pilot 510, a control channel 520, a forward transmit channel 530, ad hoc peer-peer section (A-TCH) 2010, a reverse link transmit channel 540, and a random access channel 550.

Note that, during the CFP 2904, legacy STAs should not interfere with any new class WLAN transmission. The AP may poll any legacy STA during the CFP, permitting mixed mode operation in the segment. In addition, the AP may reserve the entire CFP 2904 for new class usage and push all legacy traffic to the contention period (CP) 2906 near the end of the Beacon interval.

The example 802.11 legacy standard requires the CP 2906 be long enough to support an exchange between two legacy terminals. Thus, the beacon may be delayed, resulting in time jitter in the system. If desired, to mitigate jitter, the CFP interval may be shortened to maintain a fixed beacon interval. Timers used to establish the CFP and CP may be set such that the CFP is long (i.e., around 1.024 sec) relative to the CP (i.e., less than 10 msec). However, if, during the CFP, the AP polls legacy terminals, the duration of their transmission may be unknown and may cause additional time jitter. As a result, care must be taken to maintain QoS for new class STAs when accommodating legacy STAs on the same FA. The legacy 802.11 standard synchronizes to Time Units (TU) of 1.024 msec. The new class MAC may be designed to be synchronous with a legacy system, employing a MAC frame duration of 2 TUs or 2.048 msec, in this example.

In some embodiments, it may be desirable to insure that the new class MAC frame be made synchronous. That is, the MAC frame clock for the system may be continuous and that MAC frame boundaries, when transmitted, start on multiples of the 2.048 msec frame interval. In this way, sleep mode for STAs may be easily maintained.

New class transmissions do not need to be compatible with legacy transmissions. The headers, preambles, etc., may all be unique to the new class system, examples of which are detailed throughout this specification. Legacy STAs may attempt to demodulate these, but will fail to decode properly. Legacy STAs in sleep mode will generally not be affected.

Figure 30:
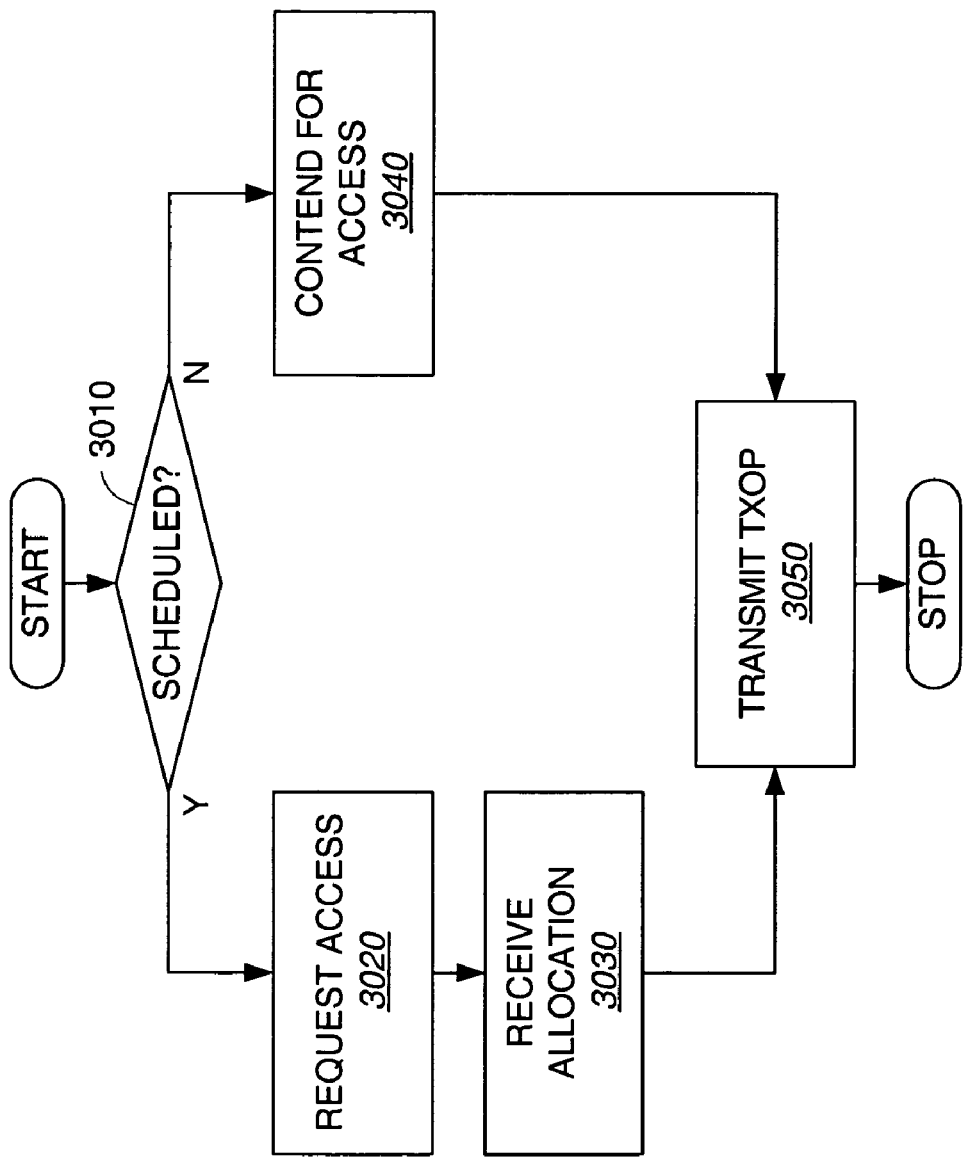
FIG. 30 depicts an example method for earning a transmit opportunity.

FIG. 30 depicts method 3000 for earning a transmit opportunity. Method 3000 may be deployed as block 2830 in an example embodiment of method 2800 illustrated above. The process begins with decision block 3010, in which an access may be scheduled or unscheduled. Those of skill in the art will recognize that, while this example illustrates two types of access, in any given embodiment either one or both of these access types may be supported. In decision block 3010, if unscheduled access is desired, proceed to block 3040 to contend for access. Any number of the contention based access techniques may be deployed. Once a transmission opportunity (TXOP) has been earned, transmit according to the transmit opportunity in block 3050. Then the process may stop.

In block 3010, if scheduled access is desired, proceed to block 3020 to request access. This access request may be made on a random access channel, during ad hoc contention, or any of the other techniques disclosed herein. In block 3030, when the access request is granted, an allocation will be received. Proceed to block 3050 to transmit the TXOP according to the received allocation.

In some instances, it may be desirable to accommodate interoperation between a new class AP, and its associated BSS, with an overlapping legacy BSS, in the same frequency allocation. The legacy BSS may be operating in DCF or PCF/HCF mode, and so synchronization between the new class BSS and legacy BSS may not always be achievable.

If the legacy BSS is operating in PCF or HCF mode, the new class AP may attempt to synchronize to the TBTT. If this is possible, the new class AP may seize the channel during the contention period, using any of various mechanisms, examples of which are described above, to operate within the overlapped BSS area. If the legacy BSS is operating under DCF, the new class AP may also attempt to seize the channel and announce a CFP to clear the channel.

There may be situations where some or all of the STAs in the legacy BSS do not receive the new class AP transmissions. In this case, those legacy STAs may interfere with operation of the new class WLAN. To avoid this interference, the new class stations may default to CSMA-based operation and rely on peer-peer transmissions (this is detailed further below with respect to FIGS. 33-34).

Figure 31:
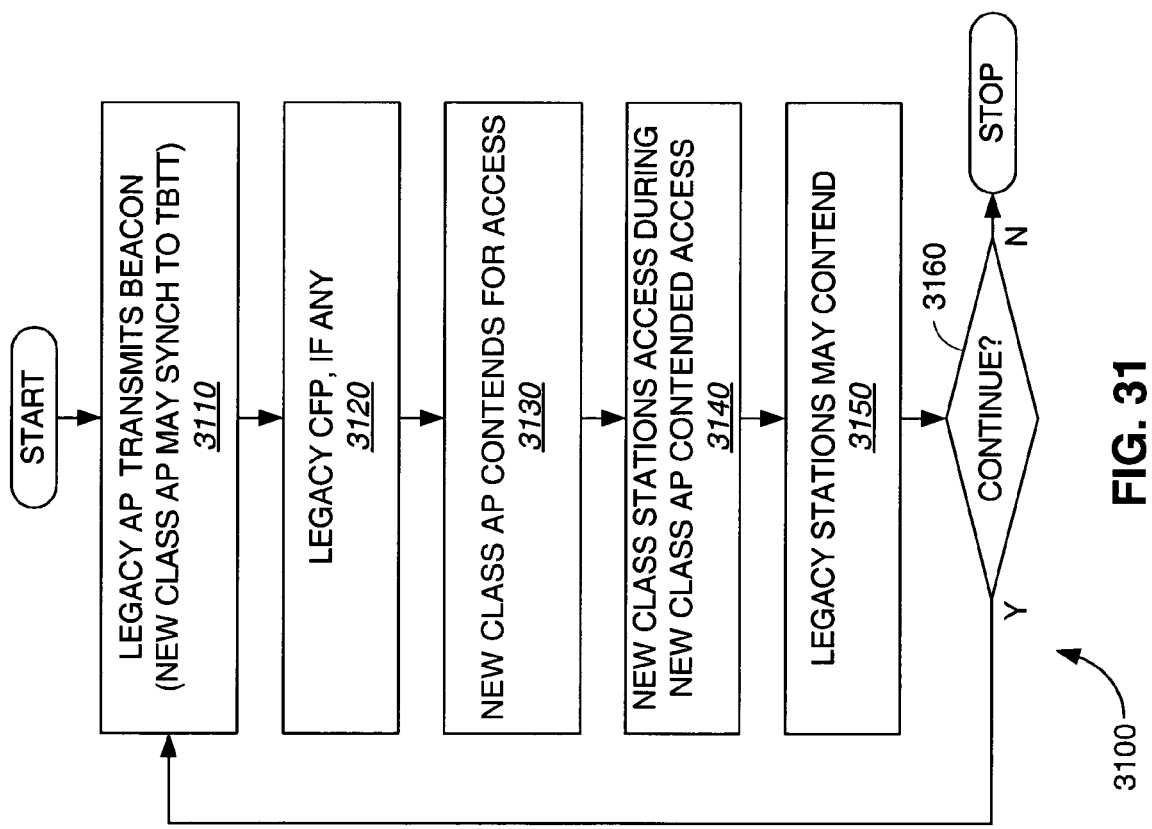
FIG. 31 depicts an example method for sharing a single FA with multiple BSSs.

FIG. 31 depicts example method 3100 for sharing a single FA with multiple BSSs. In block 3110, a legacy access point transmits a beacon. A new class access point, sharing the same frequency assignment, may synch to the TBTT associated with the beacon (optional). In block 3120, if a legacy contention free period has been prescribed according to the beacon, it is carried out. Once the contention free period, if any, is complete, then all STAs may contend for access during a prescribed contention period. In block 3130, the new class access point contends for access during the contention period. In block 3140, new class STAs may access the shared medium during the period for which the new class access point has contended for access. The types of access during this new class access may include any of the aspects detailed herein. A variety of techniques may be used, such as those detailed above, to indicate to legacy STAs the amount of time for which the access point is reserving the channel. Once this period has completed, then legacy STAs may contend in block 3150. In decision block 3160 the process may continue by returning to block 3110 or may stop.

Figure 32:
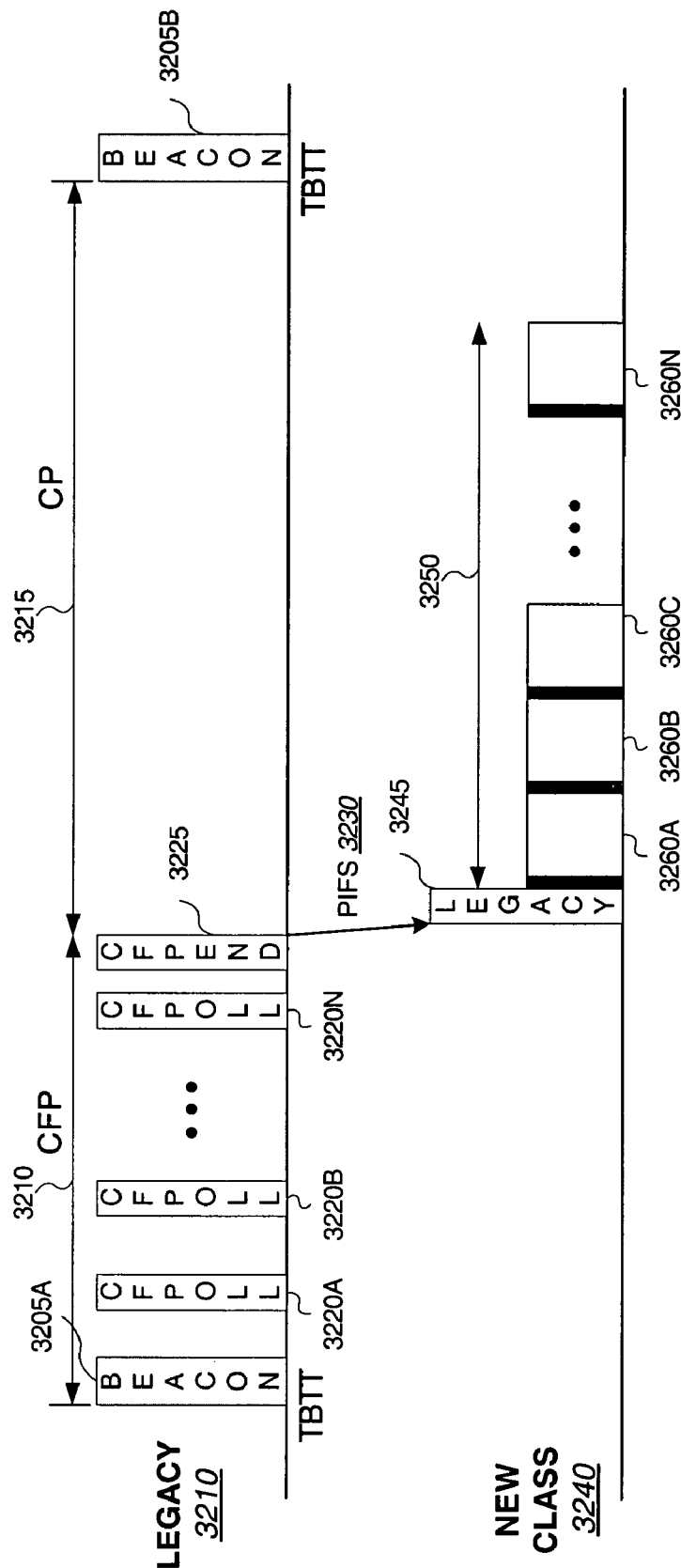
FIG. 32 illustrates overlapping BSSs using a single FA.

FIG. 32 illustrates overlapping BSSs using a single FA. Legacy system 3210 transmits beacons 3205 (3205A and 3205B are shown illustrating the TBTT and the overall Beacon interval of the legacy system). Beacon 3205A identifies contention free period 3210 and contention period 3215. During contention free period 3210, legacy contention free polls 3220A-N may be carried out followed by the indicator of the end of the contention free period 3225.

Stations in new class WLAN 3240 monitor the channel, receive beacon 3205, and refrain from accessing media until an opportunity to contend for access arrives. In this example, the earliest opportunity is during the contention free period. After PIFS 3230, the new class access point transmits a legacy signal 3245 to indicate to legacy stations the amount of time that the channel will be occupied. A variety of symbols may be used to perform this function, examples of which have been detailed above. Various other signals may be deployed depending on the legacy system with which interoperability is desired. Legacy STAs within reception range of legacy signal 3245 may avoid accessing a channel until the end of new class access period 3250. Period 3250 comprises one or more TDD MAC frame intervals 3260 (3260A-N, in this example). TDD MAC frame intervals 3260 may be any type, examples of which comprise one or more of the aspects detailed herein.

In an example embodiment, the new class AP seizes the channel at timed intervals (i.e., every 40 msec the new class AP seizes the channel for 20 msec). The new class AP may maintain a timer to insure it is only holding the channel for a desired duration, thereby guaranteeing fair sharing of the channel. In seizing the channel, the new class AP may use various signaling techniques. For example, CTS/RTS or a legacy beacon announcing a new CFP may be transmitted.

During the new class interval 3250, an example first TDD MAC frame interval may be defined as follows: First, send a beacon plus F-CCH indicating the UTs on the list to be polled in the current MAC frame. After the F-CCH, broadcast a stretch of MIMO pilot to allow the STAs to acquire and form an accurate measure of the MIMO channel. In an example embodiment, excellent performance may be achieved with 2 short OFDM symbols per antenna. This implies that the F-TCH in the initial MAC frame may be composed of roughly 8 MIMO pilot symbols. The R-TCH portion of the first MAC frame may be structured such that STAs on the poll list transmit steered MIMO pilot and a rate indicator (for the downlink) with acknowledgement back to the AP. At this point, in this example, all terminals on the poll list are ready to operate in a normal scheduled manner in the next TDD MAC frame interval. The TDD MAC frame intervals following the first TDD MAC frame interval may then be used to exchange data, coordinated by the AP, using any of the techniques disclosed herein.

As mentioned above, new class stations may default to CSMA-based operation and rely on peer-peer transmissions in certain situations (for example, situations when some or all of the STAs in the legacy BSS do not receive the new class AP transmissions). In such cases, the On/Off cycling described above might not be advantageous, or even possible. In these cases, new class stations may default to peer-peer operation.

Figure 33:
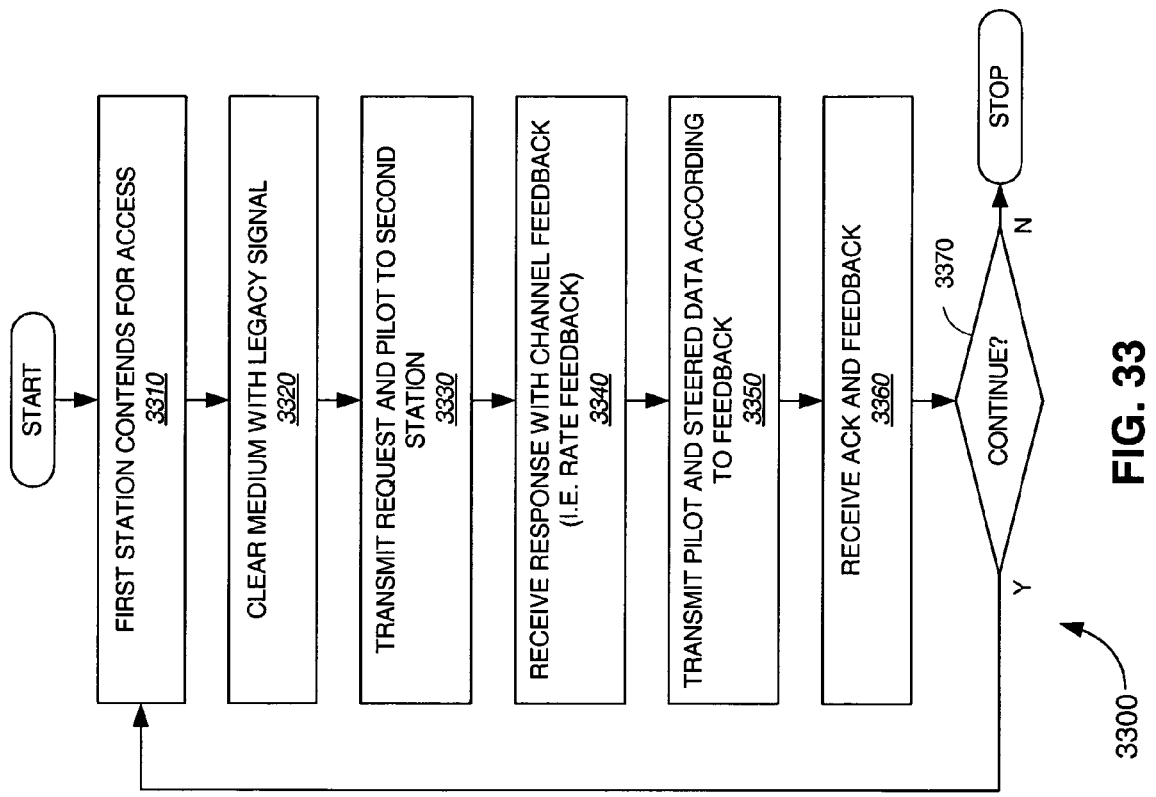
FIG. 33 depicts an example method for performing high-speed peer-peer communication while interoperating with a legacy BSS.

FIG. 33 depicts example method 3300 for performing high-speed peer-peer communication, using various techniques disclosed herein, while interoperating with a legacy BSS. The process begins in block 3310, where a first STA having data to send to a second STA contends for access. In block 3320, having contended for access successfully, the station clears the medium using a legacy signal, such as those described above. In block 3330, the first STA transmits a request (along with a pilot) to a second STA. The second STA is able to measure the channel according to the pilot transmitted. The second STA transmits channel feedback to the first STA. Thus, in block 3340 the first station receives a response with channel feedback (rate feedback, for example). In block 3350 the first STA transmits the pilot and steered data to the second station according to the feedback. In block 3360 the second STA may transmit to the first STA acknowledgement, and may transmit continued rate feedback for use in further transmission. The legacy signal used to clear the medium allows blocks 3330 to 3360 to be carried out using any of the high-speed techniques and improvements to legacy systems such as those disclosed herein. Once a STA has cleared the medium, any peer-peer MAC protocol may be deployed within the scope of the present invention period. The process may continue as depicted in decision block 3370 by returning to block 3310, or the process may stop.

In an example embodiment, with peer-peer mode, seizing the channel works according to the legacy rules for CSMA. In this example, PCF and HCF are not employed, and there may not necessarily be a centralized network architecture. When a new class STA wishes to communicate with another new class STA (or AP), the STA seizes the channel. The first transmission consists of sufficient MIMO pilot plus some message requesting a connection to be established. CTS and RTS may be employed to clear out the area and reserve time. The requesting STAs message must contain the STAs BSS ID, the STAs MAC ID, and the target STAs MAC ID (if known). The response should contain the BSS ID of the responding STA. This allows the STAs to determine whether they need to perform receiver correction of transmit steering vectors, if steering is used. Note that transmit steering does not have to be used in this case, although it may be advantageous to do so if the STAs have all calibrated with a designated AP coordinating the BSS.

As described with respect to FIG. 33, a response may contain MIMO pilot (steered, if employed) plus some indication of rate. Once this exchange has occurred, steering is possible on each link. However, if the STAs belong to different BSSs, the first steered transmission between the STA that initiated the connection may contain steered MIMO pilot to allow the responding STA's receiver to correct for the phase differential between the different BSSs.

In this example embodiment, once the initial exchanges have occurred, steering is possible. The exchanges should adhere to the SIFS interval between downlink and uplink transmissions. Because of potential processing delays in computing eigenvectors for steering, this may require that the STAs use Minimum Mean Squared Error (MMSE) processing instead of eigenvector processing. Once the steering vectors are computed, STAs may start to use the eigenvectors on the transmit side and the receive side may continue to employ MMSE processing, adapting toward the optimal spatial matched filter solution. Tracking and rate control may be facilitated by periodic feedback between the two STAs. The SIFS interval may be adhered to in order for the STAs to maintain control over the channel.

Figure 34:
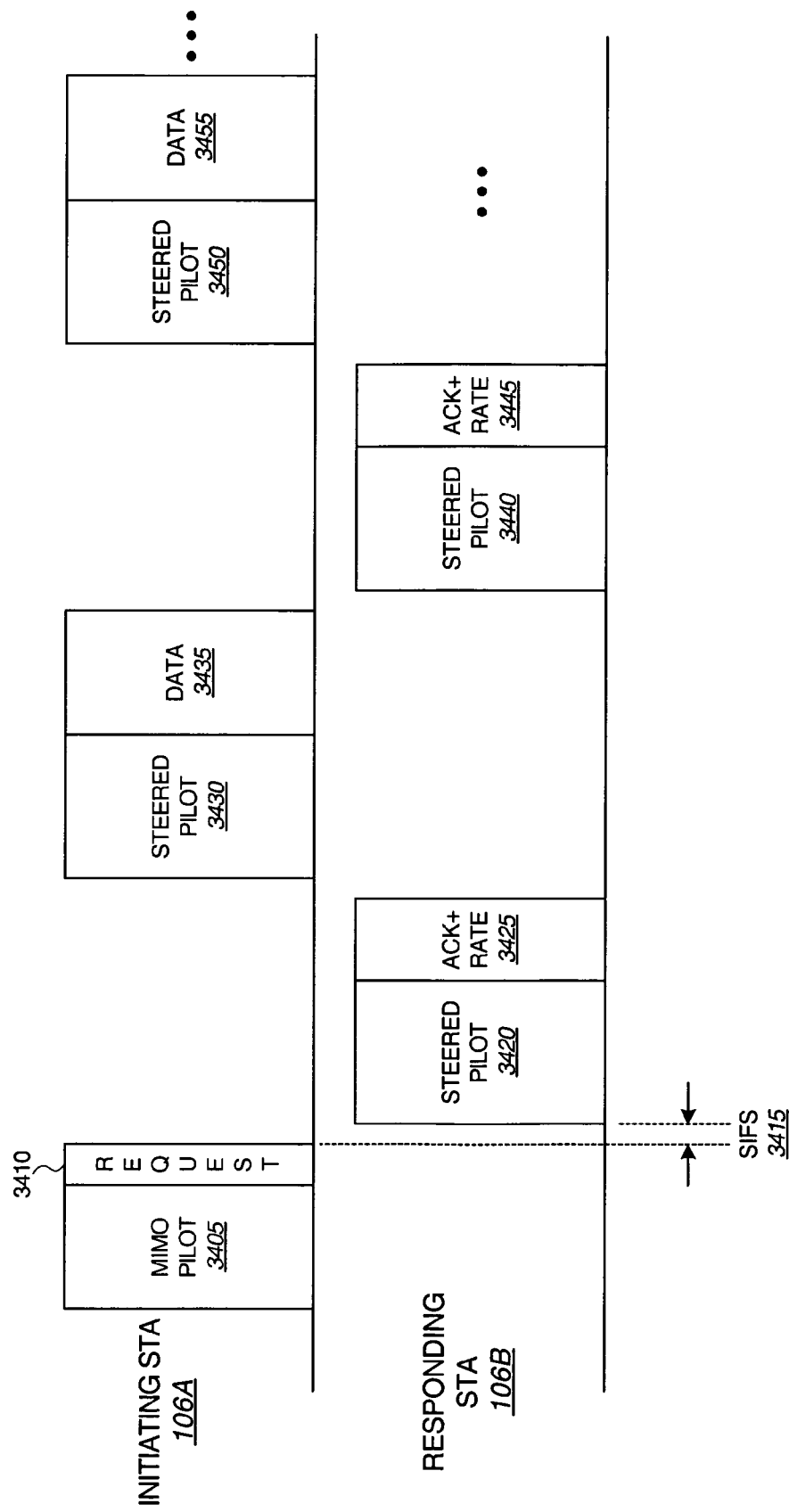
FIG. 34 illustrates peer-peer communication using MIMO techniques by contending for access on a legacy BSS.

FIG. 34 illustrates peer-peer communication using MIMO techniques by contending for access (i.e. unmanaged) on a legacy BSS. In this example, initiating station 106A contends for access on the channel. When it has successfully seized the channel, MIMO pilot 3405 is transmitted, followed by request 3410. The message may contain the BSS ID, the initiating STA's MAC ID and a target STA's MAC ID, if known. Other signaling may be used to further clear the channel, such as CTS and RTS. The responding STA 106B transmits steered pilot 3420 followed by acknowledgement and rate feedback 3425. Steered pilot 3420 is transmitted SIFS 3415 following request 3410. In the example embodiment, in which the legacy access point is an 802.11 access point, recall that SIFS is the highest priority and, thus, the responding station 106B will retain control of the channel. The various transmissions detailed in FIG. 34 may be transmitted SIFS apart from each other to maintain control of the channel until the peer-peer communication is complete.

In an example embodiment, a maximum duration for channel occupation may be determined. Steered pilot 3430, subsequent to rate feedback 3425, and data 3435 are transmitted from the initiating STA 106A to the responding STA 106B in accordance with that rate feedback. Following data 3435, the responding STA 106B transmits steered pilot 3440 and acknowledgement and rate control 3445. In response, initiating station 106A transmits steered pilot 3450 followed by data 3455.

The process may continue indefinitely or up to the maximum time allowed for channel access, depending on the deployment period. Not shown in FIG. 34, the responding STA may also transmit data and the initiating station may transmit rate control as well. These data segments may be combined with those shown at FIG. 34 to maximize efficiency (i.e., SIFS need not be interjected between these transmissions).

When two or more BSSs overlap, it may be desirable to deploy mechanisms that allow the channel to be shared in a coordinated manner. Several example mechanisms are outlined below, along with example operating procedures associated with each. These mechanisms may be deployed in combination.

A first example mechanism is Dynamic Frequency Selection (DFS). Before establishing a BSS, WLANs may be required to search the wireless medium to determine the best Frequency Allocation (FA) to establish operations for the BSS. In the process of searching the candidate FA's, an AP may also create a neighbor list to facilitate redirection and inter-AP handoff. In addition, the WLAN may synchronize MAC frame timing with neighbor BSSs (described further below). DFS may be used to distribute BSSs to minimize the need for inter-BSS synchronization.

A second example mechanism is inter-BSS Synchronization. During a DFS procedure, an AP may acquire the timing of the neighbor BSSs. In general, it may be desirable to synchronize all BSSs (on a single FA in one embodiment, or across multiple FAs in an alternate embodiment) to facilitate inter-BSS handoff. However, with this mechanism, at least those BSSs operating on the same FA in close proximity to each other synchronize their MAC frames. In addition, if co-channel BSSs are overlapping (i.e. the APs can hear each other), the newly arriving AP may alert the established AP of its presence and institute a resource sharing protocol, as follows.

A third example mechanism is a resource sharing protocol. Overlapping BSSs on the same FA may equitably share the channel. This may be done by alternating MAC frames between BSSs in some defined fashion. This allows traffic in each BSS to use the channel without risking interference from neighbor BSSs. The sharing may be done between all overlapping BSSs. For example, with 2 overlapping BSSs, one AP uses even numbered MAC frames and the other AP uses odd numbered MAC frames. With 3 overlapping BSSs, the sharing may be performed modulo-3, etc. Alternate embodiments may deploy any type of sharing scheme. Control fields in the BCH overhead message may indicate if resource sharing is enabled and the type of sharing cycles. In this example, timing for all STAs in the BSS adjust to the appropriate sharing cycle. In this example, latency will be increased with overlapping BSSs.

A fourth example mechanism is STA assisted re-synchronization. It is possible that two BSSs do not hear each other, but a new STA in the overlapped area can hear both. The STA can determine the timing of both BSSs and report this to both. In addition, the STA can determine the time offset and indicate which AP should slip its frame timing and by how much. This information has to be propagated to all BSSs connected to the AP and they all have to re-establish frame timing to achieve synchronization. Frame resynchronization can be announced in the BCH. The algorithm can be generalized to handle more unaware overlapping BSSs.

Example procedures are detailed below, which may be deployed in one or more of the mechanisms just described.

Synchronization may be performed by AP's on power-up, or at other designated times. System timing may be determined by searching all FA's for nearby systems. To facilitate synchronization, a set of orthogonal codes may be used to aid in discriminating different APs. For example, APs have known beacons repeated every MAC frame. These beacons may be covered with Walsh sequences (e.g. of length 16). Thus a device, such as an AP or STA, may perform Pilot Strength Measurements (PSMs) of the local APs to determine the overlapping BSSs. Detailed further below, active STAs, associated with an AP, may transmit echoes to assist in synchronization. The echoes may use timing and covering corresponding to the AP cover. Thus, when BSSs overlap, but the respective APs for those BSSs may not be able to detect signals from each other, a STA echo may be receivable by a neighbor AP, thus providing information about its AP, and a signal with which the neighbor AP may synchronize. Note that orthogonal cover codes may be reused on different FAs.

Selection of a Walsh cover may be done deterministically based on the set of undetected Walsh covers (i.e., select a Walsh cover that is not detected on a neighboring AP). If all covers are present, the code corresponding to the weakest Received Signal Level (RSL) may be re-used by the new AP. Otherwise, in one embodiment, the code may be selected that maximizes the operating point for the AP (see structured power backoff for adaptive reuse, detailed below).

In this example, frame counters transmitted by each AP are staggered relative to each other. The stagger employed corresponds to the Walsh cover index. Thus, AP0 uses Walsh code 0. APj uses Walsh cover j, and has its frame counter equal to 0 whenever the AP0 frame counter=j.

On power-up, or at any time synchronization is to be performed, an AP listens for neighbor AP beacons and/or STA echoes. Upon no detection of neighbor systems, the AP establishes its own time reference. This can be arbitrary, or related to GPS, or any other local time reference. Upon detection of a single system, the local timing is established accordingly. If the AP detects two or more systems operating with different time lines, the AP may synchronize with system having the strongest signal. If the systems are operating on the same frequency assignment (FA), the AP may attempt to associate with the weaker AP to inform it of the other nearby AP operating on an independent clock. The new AP attempts to inform the weaker AP of the timing skew required to synchronize both AP zones. The weaker zone AP may then skew its timing. This may be repeated for multiple neighbor APs. The new AP can establish its timing with the synchronized timing of the two or more systems. In a situation where all neighbor APs are unable, for whatever reason, to synchronize to a single timing, the new AP may synchronize to any of the neighboring APs.

Dynamic frequency selection may be performed by AP's on power-up. As stated above, it is typically desirable to minimize BSS overlap with DFS selection, to minimize the number of BSSs requiring synchronization, and any delay or throughput reduction that may be associated with synchronization (i.e., a BSS with access to the entire medium on an FA may be more efficient than a BSS which must share the medium with one or more neighboring BSSs). After synchronization, the new AP may select the FA that has the minimum RSL associated with it (i.e. when measuring neighbor APs, or during the echo period). Periodically, the AP may query the STAs for AP pilot measurements. Similarly, the AP may schedule silent periods to enable assessment of the interference levels at the AP caused by STAs from other zones (i.e. neighboring BSSs). If the RSL levels are excessive, the AP may attempt to find another FA during unscheduled periods, and/or institute a power backoff policy, as described below.

As described above, APs may be organized according to a pilot cover code. Each AP may use a Walsh sequence cover of length 16, in this example. Any number of codes of various lengths may be deployed. The pilot cover is used to modulate the sign of the beacon over a super-frame period. In this example, the super-frame period is equivalent to 32 ms (i.e. 16 consecutive MAC frame beacons). STAs may then coherently integrate over the superframe interval to determine the pilot power associated with a given AP. As above, an AP may select its Walsh code from the pool of undetected Walsh codes available. If all codes are detected (on the same FA), then the AP may rank these in order of strongest to weakest. The AP may re-use the Walsh code that corresponds to the weakest detected Walsh code.

To facilitate identification of neighbor APs, STAs may be used to transmit an echo to identify their respective AP. Thus, as described above, an AP that doesn't detect a neighbor AP may detect a corresponding STA echo, thus identifying the AP and its timing. Each AP may transmit configuration information in its beacon, and each STA may operate as a repeater to retransmit the AP configuration information, as well as timing, to any receiving neighbor AP.

Active STAs may be required to transmit, upon command from the AP, a predefined pattern that allows nearby APs operating on the same FA to detect the presence of the neighbor system. A simple way to facilitate this is to define an observation interval in the MAC frame (e.g. between the FCH and RCH segments) that is not used by the AP for any traffic. The duration of the observation interval may be defined to be long enough to handle the maximum differential propagation delay between STAs associated with the AP and STAs associated with a neighbor AP (e.g. 160 chips or 2 OFDM symbols). For example, STAs associated with the AP using Walsh cover code j may transmit the echo whenever its Mac frame counter=0. The echo is coded with information necessary to allow neighbor APs to detect the presence and efficiently co-exist with STAs in the adjacent AP zone.

Structured power backoff for adaptive reuse may be deployed. When a system becomes congested to the point where each FA must be reused in the vicinity of another AP, it may be desirable to impose a structured power backoff scheme to allow terminals in both zones to operate at maximum efficiency. When congestion is detected, power control can be used to improve the system's efficiency. That is, instead of transmitting at full power all of the time, the APs may use a structured power back-off scheme that is synchronized with their MAC frame counter.

As an example, suppose that two APs are operating on the same FA. Once the APs detect this condition, they may institute a known power backoff policy. For example, both APs use a backoff scheme that permits full power, Ptot, on MAC frame 0, Ptot(15/16) on MAC frame 1, . . . Ptot/16 on MAC frame 15. Since the APs are synchronized, and their frame counters staggered, neither AP zone is using full power simultaneously. The objective is to select the backoff pattern that allows STAs in each AP zone to operate at the highest possible throughput.

The backoff pattern used by a given AP may be a function of the degree of interference detected. In this example, up to 16 known backoff patterns may be used by a given AP. The backoff pattern used may be conveyed by the APs in the BCH and in the echoes transmitted by STAs associated with an AP.

An example backoff scheme is detailed in U.S. Pat. No. 6,493,331, entitled "Method and apparatus for controlling transmissions of a communications systems," by Walton et. al, assigned to the assignee of the present invention.

Figure 53:
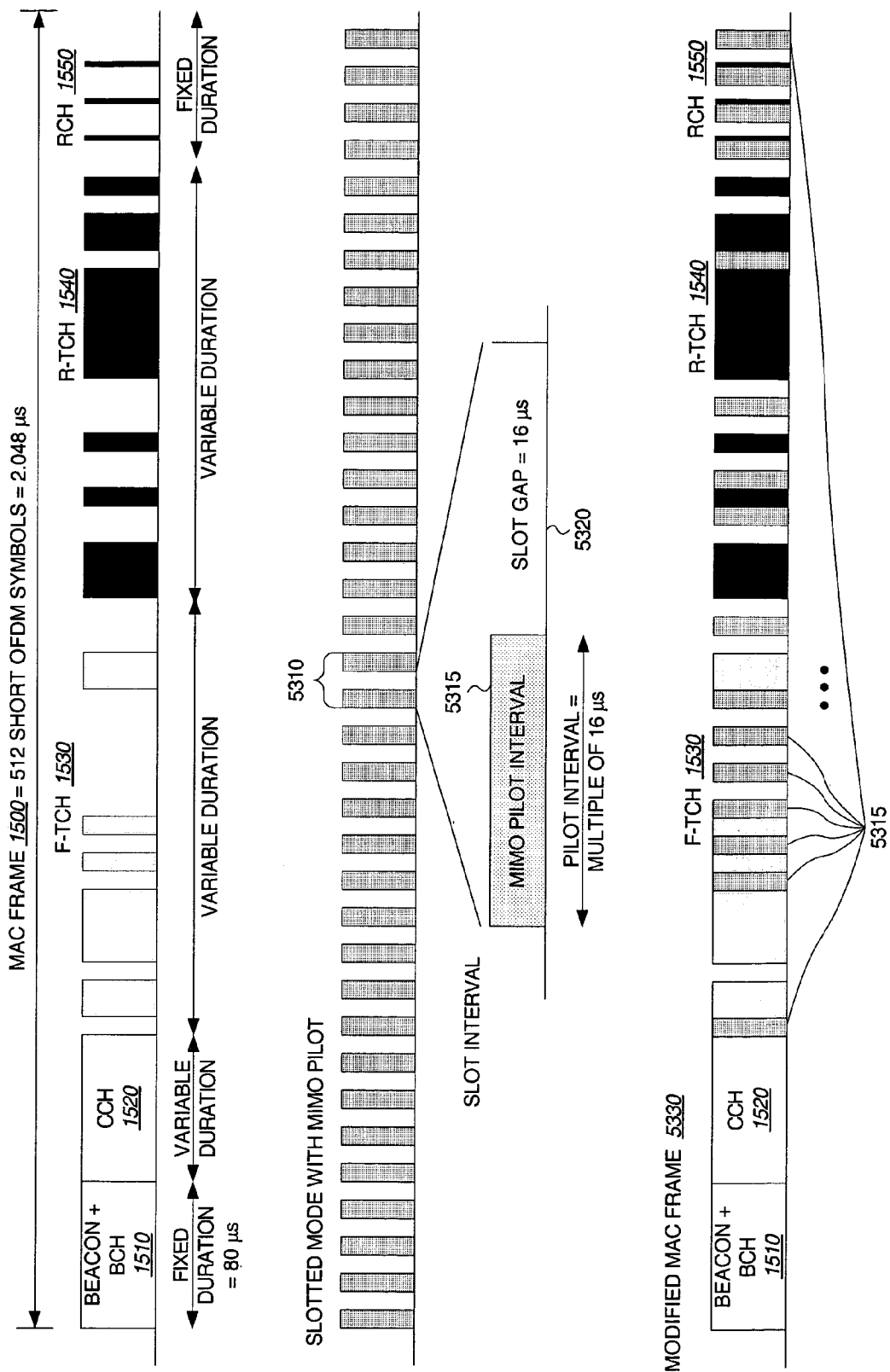
FIG. 53 illustrates an alternative embodiment of a method of interoperability with legacy systems.

Another example embodiment of a technique for interoperability with legacy systems is depicted in FIG. 53. An example MAC frame 1500 is shown, as detailed above with respect to FIG. 15. A slotted mode is introduced in which slot intervals 5310 are defined. A slot interval 5310 comprises a MIMO pilot interval 5315 and slot gap 5320. Pilots 5315 are inserted, as shown, to reserve the channel from interference by other stations (including APs) that operate according to rules, such as EDCA. Modified MAC frame 5330 comprises substantially the MAC frame 1500 with pilots 5315 inserted to retain control of the medium. FIG. 53 is illustrative only, as will be evident to one of skill in the art. A slotted mode may be incorporated with any type of MAC frame, various examples of which are detailed herein.

In this example, for purposes of illustration, assume a legacy 802.11 system that uses MAC frames that are multiples of 1.204 ms. The MAC frame may be set to be 2.048 ms to be synchronous. At the Target Beacon Transmit Time (TBTT), an announce CFP duration to get STAs to set their NAV's. During the CFP, STAs in the BSS should not transmit unless polled. Optionally, as described previously, an AP may send out an RTS and have STAs echo an identical CTS to clear out the BSS further. This CTS may be a synchronized transmission from all the STAs. In this example, jitter may be eliminated by insuring MAC frames always start on 2.048 ms boundaries. This maintains time synch between adjacent/overlapping BSSs even with foreshortened TBTTs. Various other techniques, such as those described above, may be combined with the technique described below. Once the medium is reserved for modified MAC frame 5330, using any available technique, slotted mode may be deployed to maintain possession of the medium, to prevent a legacy STA from interfering with the scheduled transmissions, thus potentially reducing throughput gains of a new class system (i.e. one using a scheme such as shown in FIG. 15 or FIG. 53, or various others detailed herein).

In this example, the new class AP is subject to CSMA rules to seize the channel. Prior to this however, it should attempt to determine the presence of another BSS, either by listening for the beacon, or other STAs. Synchronization is not required, however, to permit fair resource sharing.

Once the neighbor(s) BSS(s) has been detected, the new class AP can seize the channel by transmitting its beacon. To lock out other users, the new class AP transmits pilot with a frequency that prevents other STAs to use the channel (i.e. no idle periods any longer than PIFS =25 usec).

The new class AP may set a timer that allows it to occupy the channel for a fixed duration determined to be fair. This may be roughly synchronized with the legacy AP's beacon period or asynchronous (i.e. 100 msec every 200 msec).

The new class AP may seize the channel at any point during its permitted interval, which can be delayed by legacy BSS users. The new class AP may relinquish the channel before its time has expired if there is no traffic to serve. When the new class AP seizes the channel, it have its use limited for an equitable period of time. Furthermore, the timing established by the new class AP may be consistent with the MAC frame timing established. That is, new class beacons occur on 2.048 msec boundaries of the new class AP clock. This way, new class STAs may maintain synchronization by looking at these specific intervals to determine if the HT AP has seized the channel.

The new class AP may announce its frame parameters in a beacon. Part of the frame parameters may include the pilot interval spacing indicating the frequency of pilot transmission throughout the MAC frame. Note that the new class AP may schedule STAs such that their transmission overlaps the periodic burst pilot. In this case, the STA whose assignment overlaps knows this and ignores the pilot during that period. Other STAs do not know this and therefore use a threshold detector to validate whether the pilot was transmitted during the prescribed interval.

It is possible that a STA may transmit a pilot at the instant the AP is supposed to transmit, or that the AP is transmitting steered pilot to a STA during this interval. To prevent other STAs from using this pilot, thus corrupting their channel estimates, the AP pilot may use Walsh covers that are orthogonal to common pilot Walsh covers. A structure for assigning Walsh covers may be deployed. For example, when STAs and APs use different Walsh covers, the Walsh space may include 2N covers, with N covers reserved for APs, and the remainder for STAs associated with a given AP using a cover that is coupled in a known manner with the respective AP's Walsh cover.

When the new class AP transmits an assignment to a STA, it is expecting the STA to transmit to it during the prescribed interval. It is possible the STA fails to receive the assignment, in which case the channel could go unused for an interval longer than PIFS. To prevent this from occurring, the AP may sense the channel for t<SIFS and determine if it is occupied. If not, the AP may immediately seize the channel by transmitting pilot, phased accordingly.

New class channel assignments may be slotted to intervals of SIFS (16 usec). This way channel occupancy can be guaranteed to keep off legacy users during the period of new class exclusive usage.

The RCH must be designed to accommodate interoperability since the duration of the RCH could exceed 16 usec. If the RCH cannot be easily accommodated in a given embodiment, the RCH may be allocated to work in the legacy modes when the new class MAC does not have control of the channel (i.e. coexist in legacy mode). The F-RCH may be accommodated by permitting STAs to transmit access requests anytime following a pilot transmission (i.e. wait 4 usec and transmit for 8 usec), as illustrated in FIG. 53.

Example Embodiment: Enhanced 802.11 MIMO WLAN

Detailed below is an example embodiment illustrating various aspects introduced above, as well as additional aspects. In this example, an enhanced 802.11 WLAN using MIMO is illustrated. Various MAC enhancements are detailed, as well as corresponding data and messaging structures for use at the MAC layer and physical layer. Those of skill in the art will recognize that only an illustrative subset of features of a WLAN are disclosed, and will readily adapt the teaching herein to 802.11 legacy system interoperability, as well as interoperability with various other systems.

The example embodiment, detailed below, features interoperability with legacy 802.11a, 802.11g STAs as well as with the 802.11e draft and anticipated final standard. The example embodiment comprises a MIMO OFDM AP, so named to distinguish from legacy APs. Due to backward compatibility, as detailed below, legacy STAs are able to associate with a MIMO OFDM AP. However, the MIMO OFDM AP may explicitly reject an association request from a legacy STA, if desired. DFS procedures may direct the rejected STA to another AP that supports legacy operation (which may be a legacy AP or another MIMO OFDM AP).

MIMO OFDM STAs are able to associate with an 802.11a or 802.11g BSS or Independent BSS (IBSS) where no AP is present. Thus, for such operation, such a STA will implement all the mandatory features of 802.11a, 802.11g as well as the anticipated final draft of 802.11e.

When legacy and MIMO OFDM STAs share the same RF channel, either in a BSS or an IBSS, various features are supported: The proposed MIMO OFDM PHY spectral mask is compatible with the existing 802.11a, 802.11g spectral mask so that no additional adjacent channel interference is introduced to legacy STAs. The extended SIGNAL field in the PLCP Header (detailed below) is backward compatible with the SIGNAL field of legacy 802.11. Unused RATE values in the legacy SIGNAL field are set to define new PPDU types (detailed below). The Adaptive Coordination Function (ACF) (detailed below) permits arbitrary sharing of the medium between legacy and MIMO OFDM STAs. Periods of 802.11e EDCA, 802.11e CAP and the SCAP (introduced below) may be arbitrarily interspersed in any Beacon interval, as determined by the AP scheduler.

As described above, a high performance MAC is required to effectively leverage the high data rates enabled by the MIMO WLAN physical layer. Various attributes of this example MAC embodiment are detailed below. Following are several example attributes:

Adaptation of the PHY rates and transmission modes effectively exploit the capacity of the MIMO channel.

Low latency service of the PHY provides low end-to-end delays to address the requirements of high throughput (e.g. multimedia) applications. Low latency operation may be achieved with contention-based MAC techniques at low loads, or using centralized or distributed scheduling in heavily loaded systems. Low latency provides many benefits. For example, low latency permits fast rate adaptation to maximize the physical layer data rate. Low latency permits inexpensive MAC implementation with small buffers, without stalling. ARQ. Low latency also minimizes end-to-end delay for multimedia and high throughput applications.

Another attribute is high MAC efficiency and low contention overhead. In contention based MACs, at high data rates, the time occupied by useful transmissions shrinks while an increasing fraction of the time is wasted in overhead, collisions and idle periods. Wasted time on the medium may be reduced through scheduling, as well as through aggregation of multiple higher layer packets (e.g. IP datagrams) into a single MAC frame. Aggregated frames may also be formed to minimize preamble and training overhead.

The high data rates enabled by the PHY permit simplified QoS handling.

The example MAC enhancements, detailed below, are designed to address the above performance criteria in a manner that is backward compatible with 802.11g and 802.11a. In addition, support for and improvement to features that are included in the draft standard 802.11e, described above, including features such as TXOP and Direct Link Protocol (DLP), as well as the optional Block ACK mechanism.

In describing the example embodiments below, new terminology is used for some concepts introduced above. A mapping for the new terminology is detailed in Table 1.

TABLE 1

Terminology Mapping

| Earlier Terminology<br>Terms used in prior paragraphs | Mapping to New Terminology<br>Terms used in<br>subsequent paragraphs |
|---|---|
| MUX PDU or MPDU | MAC Frame |
| Partial MPDU | MAC Frame Fragment |
| MAC PDU | PPDU |

TABLE 1-continued

Terminology Mapping

| Earlier Terminology<br>Terms used in prior paragraphs | Mapping to New Terminology<br>Terms used in<br>subsequent paragraphs |
|---|---|
| Broadcast channel message (BCH) and Control channel message (CCH) | SCHED message |
| Control channel message subchannels | CTRLJ segments of the SCHED message |
| TDD MAC frame interval | Scheduled Access Period (SCAP) |
| F-TCH (Forward Traffic Channel) | Scheduled AP-STA transmissions |
| R-TCH (Reverse Traffic Channel) | Scheduled STA-AP or STA-STA transmissions |
| A-TCH (Ad-hoc peer-to-peer Traffic Channel) | Protected EDCA or MIMO OFDM EDCA |
| PCCH (Peer-to-Peer Control Channel) | PLCP Header SIGNAL field |
| RCH | FRACH |

Flexible Frame Aggregation

Figure 35:
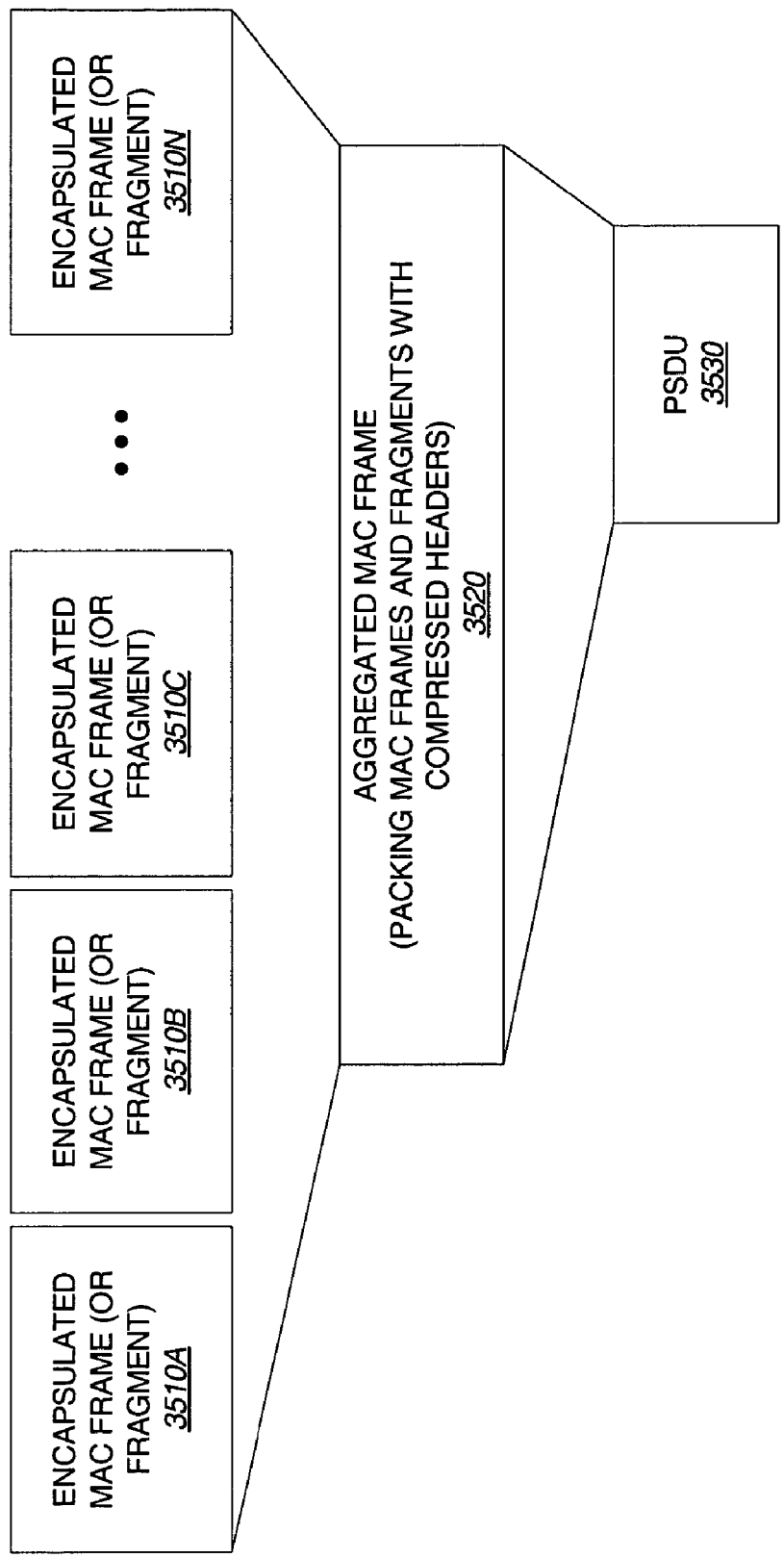
FIG. 35 depicts encapsulation of one or more MAC frames (or fragments) within an aggregated frame.

In this example embodiment, flexible frame aggregation is facilitated. FIG. 35 depicts encapsulation of one or more MAC frames (or fragments) within an aggregated frame. Frame aggregation permits the encapsulation of one or more MAC frames (or fragments) 3510 within an aggregated frame 3520, which may incorporate header compression, detailed below. Aggregated MAC frame 3520 forms PSDU 3530, which may be transmitted as a single PPDU. The aggregated frame 3520 may contain encapsulated frames (or fragments) 3510 of type data, management or control. When privacy is enabled, the frame payload may be encrypted. The MAC frame header of an encrypted frame is transmitted "in the clear."

This MAC-level frame aggregation, as just described, permits transmission of frames with zero IFS or BIFS (Burst Interframe Spacing, detailed further below) to the same receiving STA. In certain applications, it is desirable to permit the AP to transmit frames with zero IFS, or aggregated frames, to multiple receiving STAs. This is permitted through the use of the SCHED frame, discussed below. The SCHED frame defines the start time of multiple TXOPs. Preambles and IFS may be eliminated when the AP makes back-to-back transmissions to multiple receiving STAs. This is referred to as PPDU aggregation to distinguish from MAC-level frame aggregation.

An example aggregated MAC frame transmission (i.e. a PPDU) starts with a preamble followed by the MIMO OFDM PLCP HEADER (including a SIGNAL field, which may comprise two fields, SIGNAL1 and SIGNAL2), followed by MIMO OFDM training symbols (if any). Example PPDU formats are detailed further below with respect to FIGS. 49-52. The aggregated MAC frame flexibly aggregates one or more encapsulated frames or fragments that are to be transmitted to the same receiving STA. (The SCHED message, detailed below, permits aggregation of TXOPs from the AP to multiple receiving STAs.) There is no restriction on the number of frames and fragments that may be aggregated. There may be a limit to the maximum size of an aggregated frame that is established through negotiation. Typically, the first and last frames in the aggregated frame may be fragments that are created for efficient packing. When several encapsulated data frames are included within an aggregated frame, the MAC headers of the data and QoS data frames may be compressed, as detailed below.

The transmitting MAC may attempt to minimize PHY and PLCP overheads and idle periods through the use of flexible frame aggregation. This may be accomplished by aggregating frames to eliminate inter-frame spacing and PLCP headers, as well as flexible frame fragmentation, to fully occupy the available space in a TXOP. In one example technique, the MAC first computes the number of octets to be provided to the PHY based on the current data rate and the duration of the assigned or contention-based TXOP. Complete and fragmented MAC frames may then be packed to occupy the entire TXOP.

If a complete frame cannot be accommodated in the remaining space in a TXOP, the MAC may fragment the next frame to occupy as much as possible of the remaining octets in the TXOP. Frames may be fragmented arbitrarily for efficient packing. In an example embodiment, this arbitrary fragmentation is subject to the restriction of a maximum of 16 fragments per frame. In alternate embodiments, this limitation may not be required. Remaining fragment(s) of the MAC frame may be transmitted in a subsequent TXOP. In the subsequent TXOP, the MAC may give higher priority to fragments of an incompletely transmitted frame, if desired.

An Aggregation Header (2 octets, in this example), described further below, is inserted in the MAC Header of each encapsulated frame (or fragment) that is inserted in the aggregated frame. A Length field in the Aggregation Header indicates the length (in octets) of the encapsulated MAC frame, and is used by the receiver to extract frames (and fragments) from the aggregated frame. The PPDU Size field in the proposed SIGNAL field provides the size of the MIMO OFDM PPDU transmission (number of OFDM symbols) while the length of each encapsulated MAC frame (in octets) is indicated by the Aggregation Header.

Header Compression of Encapsulated Frames

Figure 36:
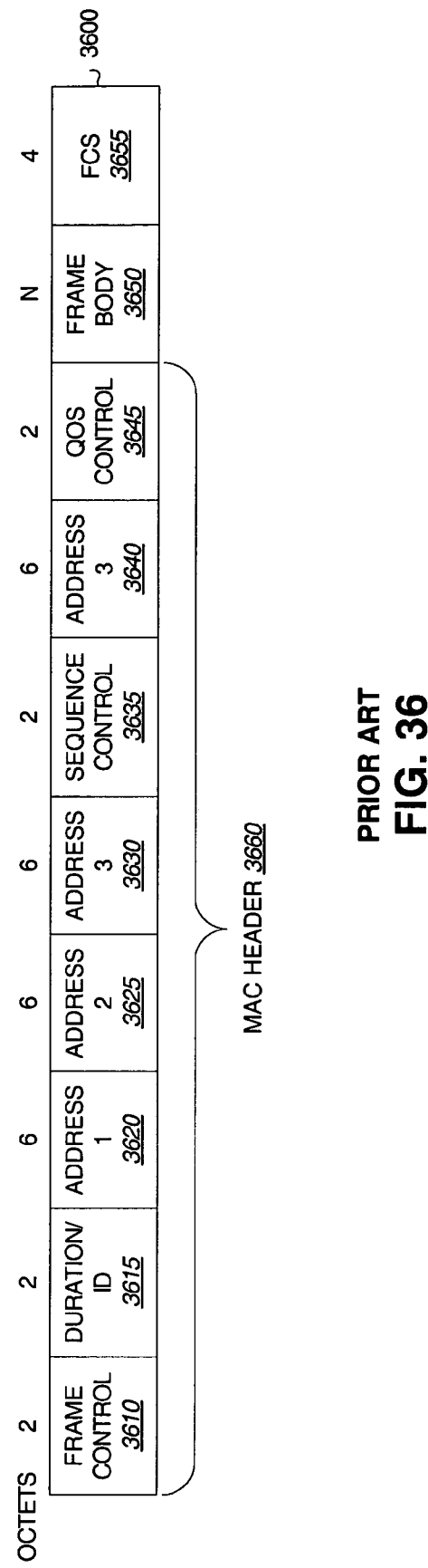
FIG. 36 depicts a legacy MAC frame.

FIG. 36 depicts a legacy MAC frame 3600, comprising MAC Header 3660, followed by a frame body 3650 (which may include a variable number of octets, N) and a Frame Check Symbol (FCS) 3655 (4 octets, in this example). This prior art MAC frame format is detailed in 802.11e. MAC Header 3660 comprises a frame control field 3610 (2 octets), a duration/ID field 3615 (2 octets), a sequence control field 3635 (2 octets), and a QoS control field 3645 (2 octets). In addition, four address fields, Address 1 3620, Address 2 3625, Address 3, 3630, and Address 4 3640 (6 octets each), are included. These addresses may also be referred to as TA, RA, SA, and DA, respectively. The TA is the transmitting station address. The RA is the receiving station address. The SA is the source station address. The DA is the destination station address.

When several encapsulated data frames are included within an aggregated frame, the MAC headers of the data and QoS data frames may be compressed. Example compressed MAC headers for QoS data frames are shown in FIGS. 37-39. Note that the FCS is computed on the compressed MAC header and the (encrypted or unencrypted) payload.

As shown in FIG. 37-39, when frames are transmitted using a MIMO Data PPDU (Type 0000), an aggregation header field is introduced into the MAC Header 3660 of the MAC frame 3600 to create an encapsulated MAC frame, i.e. 3705, 3805, or 3905, respectively. The MAC Header, including the Aggregation Header field, is called the Extended MAC Header (i.e. 3700, 3800, or 3900). One or more encapsulated management, control and/or data frames (including QoS data) may be aggregated into an aggregated MAC frame. When data privacy is in use, the payload of the data or QoS data frames may be encrypted.

The Aggregation Header 3710 is inserted for each frame (or fragment) inserted in the aggregated frame (3705, 3805, or 3905, respectively). Header compression is indicated by the Aggregation Header type field, detailed below. Frame headers of data and QoS data frames may be compressed to eliminate redundant fields. Aggregated frame 3705, depicted in FIG. 37, illustrates an uncompressed frame, which includes all four addresses and the Duration/ID field.

After an uncompressed aggregated frame is transmitted, additional aggregated frames need not identify the transmitting and receiving station addresses, as they are identical. Thus, Address 1 3620 and Address 2 3625 may be omitted. The Duration/ID field 3615 does not need to be included for subsequent frames in the aggregated frame. Duration may be used to set the NAV. The Duration/ID field is overloaded based on context. In Poll messages, it contains the Access ID (AID). In other messages, the same field specifies the duration to set the NAV. The corresponding frame 3805 is illustrated in FIG. 38.

Further compression is available when the source address and destination station addresses contain duplicate information. In this case, Address 3 3630 and Address 4 3640 may also be removed, resulting in the frame 3905 illustrated in FIG. 39.

When fields are removed, to decompress, the receiver may insert the corresponding field from the previous header (after decompression) in the aggregated frame. In this example, the first frame in an aggregated frame always uses the uncompressed header. Decryption of the payload may require some fields from the MAC Header that may have been removed for header compression. After decompression of the frame header, these fields may be made available to the decryption engine. The Length field is used by the receiver to extract frames (and fragments) from the aggregated frame. The Length field indicates the length of the frame with the compressed header (in octets).

After extraction, the Aggregation header field is removed. The decompressed frame is then passed to the decryption engine. Fields in the (decompressed) MAC headers may be required for message integrity verification during decryption.

Figure 40:
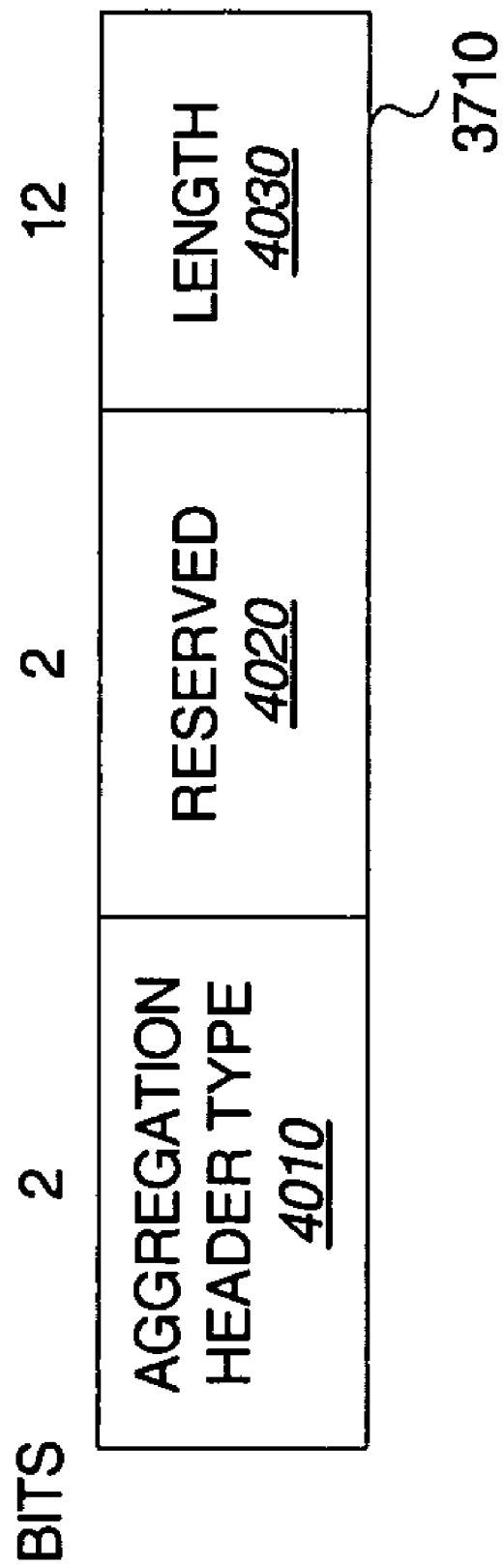
FIG. 40 illustrates an example Aggregation Header.

FIG. 40 illustrates an example Aggregation Header 3710. The Aggregation Header field is added to each frame (or fragment) header for one or more frames (encrypted or unencrypted) that are transmitted in a MIMO Data PPDU. The Aggregation Header comprises a 2 bit Aggregation Header Type field 4010 (to indicate whether or not header compression is employed, and which type) and a 12 bit Length field 4030. Type 00 frames do not employ header compression. Type 01 frames have the Duration/ID, Address 1 and Address 2 fields removed. Type 10 frames have the same removed fields as type 01 frames, with the Address 3 and Address 4 fields also removed. The Length field 4030 in the Aggregation Header indicates the length of the frame in octets with the compressed header. 2 bits 4020 are reserved. The Aggregation Header types are summarized in Table 2.

TABLE 2

Aggregation Header Type

| Bit 0 | Bit 1 | Meaning |
|---|---|---|
| 0 | 0 | Uncompressed |
| 0 | 1 | Duration/ID, Address 1 and Address 2 fields are removed |
| 1 | 0 | Duration/ID, Address 1, Address 2, Address 3 and Address 4 fields are removed |
| 1 | 1 | Reserved |

In this example embodiment, all management and control frames that are encapsulated in an aggregated frame use the uncompressed frame header with Aggregation Header type 00. The following management frames may be encapsulated along with data frames in an aggregated frame: association request, association response, reassociation request, reassociation response, probe request, probe response, disassociation, authentication, and deauthentication. The following control frames may be encapsulated along with data frames in an aggregated frame: BlockAck and BlockAckRequest. In alternate embodiments, any type of frames may be encapsulated.

Adaptive Coordination Function

Figure 41:
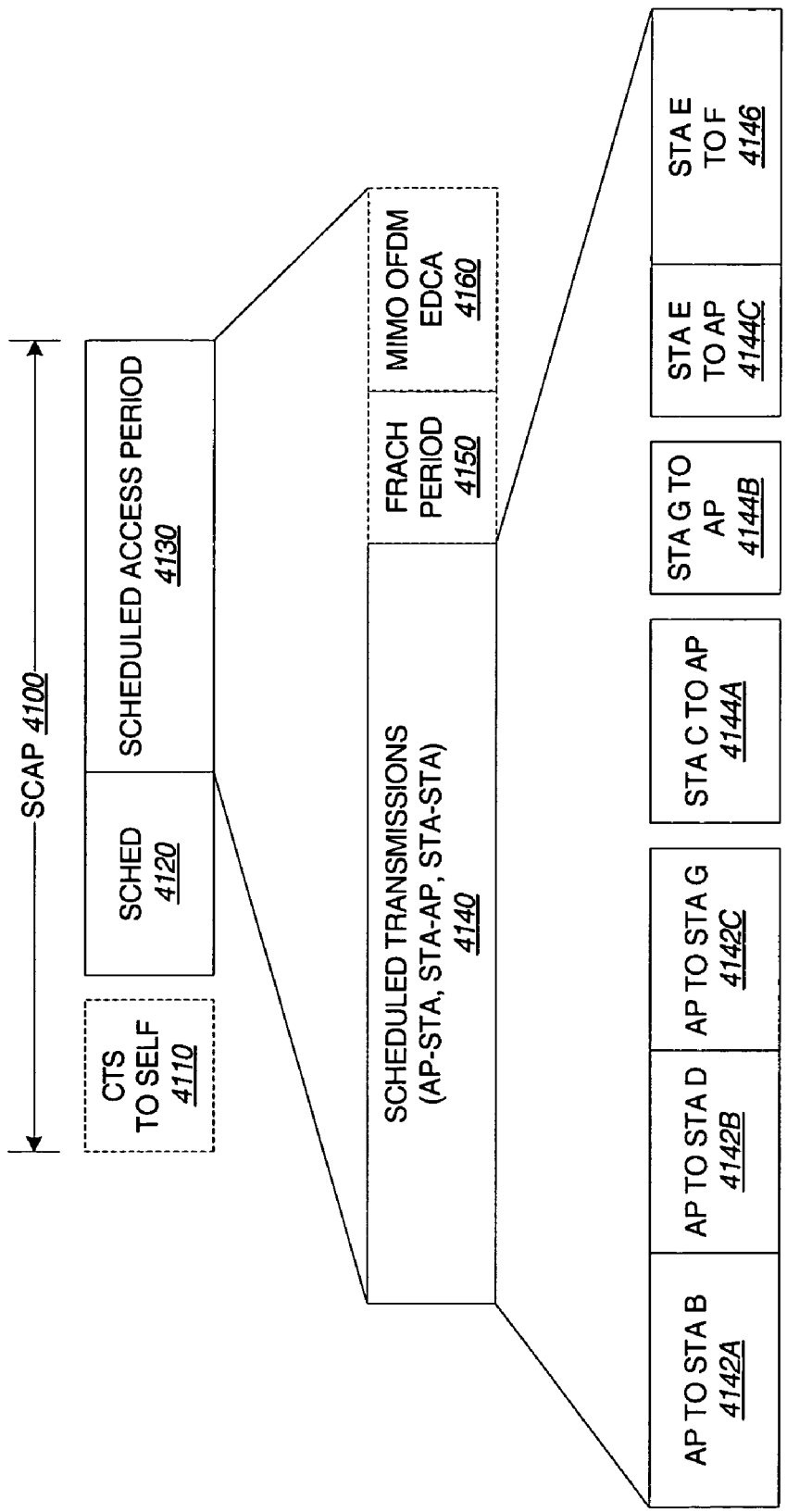
FIG. 41 illustrates an example embodiment of a Scheduled Access Period Frame (SCAP) for use in the ACF.

The Adaptive Coordination Function (ACF) is an extension of the HCCA and EDCA that permits flexible, highly efficient, low latency scheduled operation suitable for operation with the high data rates enabled by the MIMO PHY. FIG. 41 illustrates an example embodiment of a Scheduled Access Period Frame (SCAP) for use in the ACF. Using a SCHED message 4120, an AP may simultaneously schedule one or more AP-STA, STA-AP or STA-STA TXOPs over the period known as the Scheduled Access Period 4130. These scheduled transmissions are identified as scheduled transmissions 4140. The SCHED message 4120 is an alternative to the legacy HCCA Poll, detailed above. In the example embodiment, the maximum permitted value of the SCAP is 4 ms.

Example scheduled transmissions 4140 are shown in FIG. 41 for illustration, including AP to STA transmissions 4142, STA to AP transmissions 4144, and STA to STA transmissions 4146. In this example, the AP transmits to STA B 4142A, then to STA D 4142B, and then to STA G 4142C. Note that gaps need not be introduced between these TXOPs, as the source (the AP) is the same for each transmission. Gaps are shown between TXOPs when the source changes (example gap spacings are detailed further below). In this illustration, after AP to STA transmissions 4142, STA C transmits to the AP 4144A, then, after a gap, STA G transmits to the AP 4144B, and then, after a gap, STA E transmits to the AP 4144C. A peer to peer TXOP 4146 is then scheduled. In this case, STA E remains as the source (transmitting to STA F), so no gap needs to be introduced if the STA E transmit power is unchanged, otherwise a BIFS gap may be used. Additional STA to STA transmissions may be scheduled, but are not shown in this example. Any combination of TXOPs may be scheduled, in any order. The order of TXOP types shown is an example convention only. While it may be desirable to schedule TXOPs to minimize the required number of gaps, it is not mandatory.

The Scheduled Access Period 4130 may also contain a FRACH Period 4150 dedicated to Fast Random Access Channel (FRACH) transmissions (wherein a STA may make a request for an allocation) and/or a MIMO OFDM EDCA 4160 period where MIMO STAs may use EDCA procedures. These contention-based access periods are protected by the NAV set for the SCAP. During the MIMO OFDM EDCA 4160 period, MIMO STAs use EDCA procedures to access the medium without having to contend with legacy STAs. Transmissions during either protected contention period use the MIMO PLCP header (detailed further below). The AP provides no TXOP scheduling during the protected contention period, in this embodiment.

When only MIMO STAs are present, the NAV for the SCAP may be set through a Duration field in the SCHED frame (the SCHED frame is detailed further below). Optionally, if protection from legacy STAs is desired, the AP may precede the SCHED frame 4120 with a CTS-to-Self 4110 to establish the NAV for the SCAP at all STAs in the BSS.

In this embodiment, MIMO STAs obey the SCAP boundary. The last STA to transmit in a SCAP must terminate its TXOP at least PIFS duration before the end of the SCAP.

MIMO STAs also obey the scheduled TXOP boundaries and complete their transmission prior to the end of the assigned TXOP. This allows the subsequent scheduled STA to start its TXOP without sensing the channel to be idle.

The SCHED message 4120 defines the schedule. Assignments of TXOPs (AP-STA, STA-AP and/or STA-STA) are included in the CTRIJ elements (4515-4530 in FIG. 45, detailed below) in the SCHED frame. The SCHED message may also define the portion of the SCAP 4100 dedicated to FRACH 4150, if any, and a protected portion for EDCA operation 4160, if any. If no scheduled TXOP assignments are included in the SCHED frame, then the entire SCAP is set aside for EDCA transmissions (including any FRACH) protected from legacy STAs by the NAV set for the SCAP.

The maximum length of scheduled or contention-based TXOP permitted during the SCAP may be indicated in an ACF capabilities element. In this embodiment, the length of the SCAP does not change during a Beacon interval. The length may be indicated in the ACF capabilities element. An example ACF element comprises a SCAP Length (10 bits), a Maximum SCAP TXOP Length (10 bits), a Guard IFS (GIFS) Duration (4 bits), and a FRACH RESPONSE (4 bits). The SCAP Length indicates the length of the SCAP for the current Beacon interval. The field is encoded in units of 4 µs. The Maximum SCAP TXOP Length indicates the maximum permissible TXOP length during a SCAP. The field is encoded in units of 4 µs. GIFS Duration is the guard interval between consecutive scheduled STA TXOPs. The field is encoded in units of 800 ns. FRACH RESPONSE is indicated in units of SCAPs. The AP must respond to a request received using an FRACH PPDU by providing the STA with a scheduled TXOP within FRACH RESPONSE SCAPs.

Figure 42:
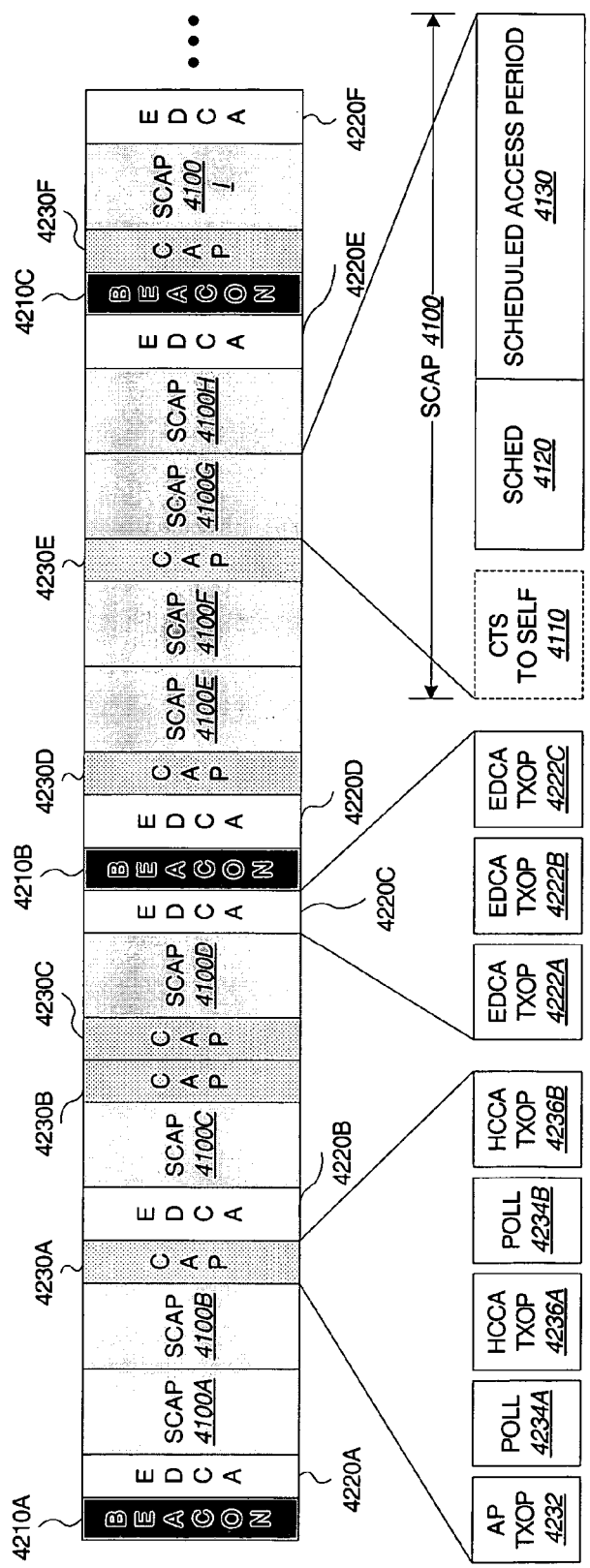
FIG. 42 illustrates how the SCAP may be used in conjunction with HCCA and EDCA.

FIG. 42 shows an example of how the SCAP may be used in conjunction with HCCA and EDCA. In any Beacon interval (illustrated with beacons 4210A-C), the AP has complete flexibility to adaptively intersperse duration of EDCA contention-based access with the 802.11e CAP and the MIMO OFDM SCAP.

Thus, using the ACF, the AP may operate as in HCCA, but with the additional capability of allocating periods for SCAP. For example, the AP may use CFP and CP as in the PCF, allocate a CAP for polled operation as in HCCA, or may allocate a SCAP for scheduled operation. As shown in FIG. 42, in a Beacon interval, the AP may use any combination of periods for contention based access (EDCA) 4220A-F, CAP 4230A-F, and SCAP 4100A-I. (For simplicity, the example in FIG. 42 does not show any CFP.) The AP adapts the proportion of the medium occupied by different types of access mechanisms based on its scheduling algorithms and its observations of medium occupancy. Any scheduling technique may be deployed. The AP determines whether admitted QoS flows are being satisfied and may use other observations including measured occupancy of the medium for adaptation.

HCCA and associated CAPs are described above. An illustrative example CAP 4230 is shown in FIG. 42. An AP TXOP 4232 is followed by a Poll 4234A. HCCA TXOP 4236A follows Poll 4234A. Another Poll 4234B is transmitted, followed by another respective HCCA TXOP 4236B.

EDCA is described above. An illustrative example EDCA 4220 is shown in FIG. 42. Various EDCA TXOPs 4222A-C are shown. A CFP is omitted in this example.

A SCAP 4100, as shown in FIG. 42, may be of the format detailed in FIG. 41, including an optional CTS to Self 4110, SCHED 4120, and Scheduled Access Period 4130.

The AP indicates scheduled operation using the 802.11 Delivery Traffic Indication Message (DTIM) message as follows. The DTIM contains a bitmap of Access IDs (AIDs) for which the AP or another STA in the BSS has backlogged data. Using the DTIM, all MIMO-capable STAs are signaled to stay awake following the Beacon. In a BSS where both legacy and MIMO STAs are present, legacy STAs are scheduled first, immediately following the Beacon. Right after the legacy transmissions, the SCHED message is transmitted that indicates the composition of the Scheduled Access Period. MIMO-capable STAs not scheduled in a particular Scheduled Access Period may sleep for the remainder of the SCAP and wake up to listen for subsequent SCHED messages.

Figure 43:
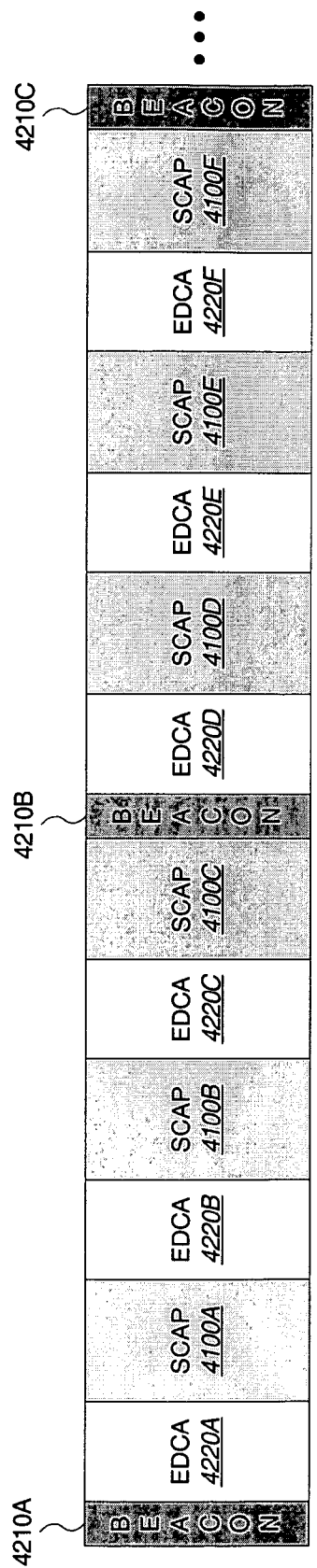
FIG. 43 illustrates Beacon intervals comprising a number of SCAPs interspersed with contention-based access periods.

Various other modes of operation are enabled with ACF. FIG. 43 shows an example operation where each Beacon interval comprises a number of SCAPs 4100 interspersed with contention-based access periods 4220. This mode permits "fair" sharing of the medium where MIMO QoS flows are scheduled during the SCAP while MIMO non-QoS flows use the contention periods along with legacy STAs, if present. Interspersed periods permit low latency service for MIMO and legacy STAs.

As described above, the SCHED message in the SCAP may be preceded by a CTS-to-Self for protection from legacy STAs. If no legacy STAs are present, CTS-to-Self (or other legacy clearing signal) is not required. The Beacon 4210 may set a long CFP to protect all SCAPs from any arriving legacy STAs. A CP at the end of the Beacon interval allows newly arriving legacy STAs to access the medium.

Figure 44:
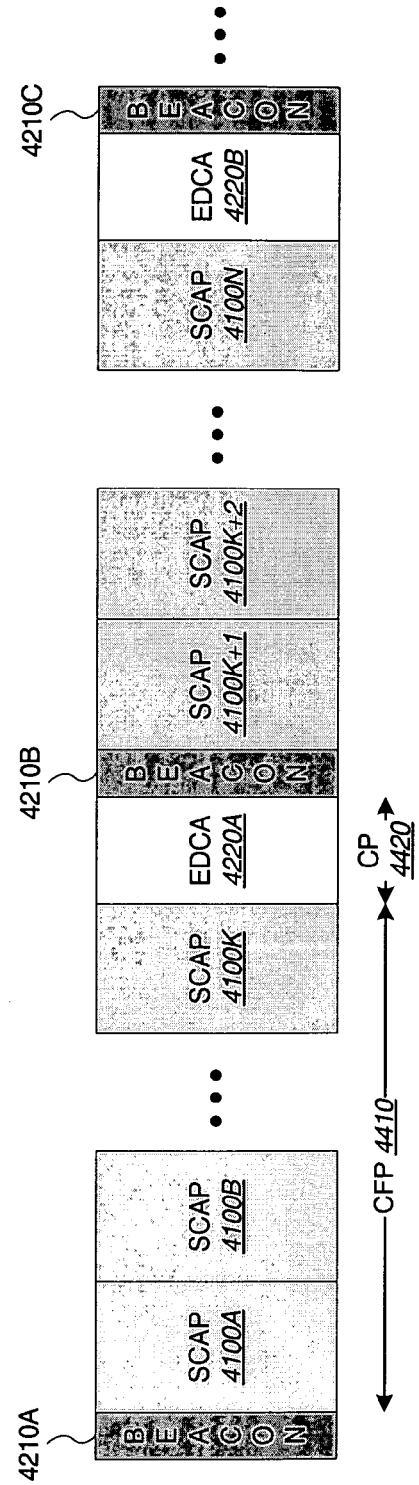
FIG. 44 illustrates low-latency operation with a large number of MIMO STAs.

Optimized low-latency operation with a large number of MIMO STAs may be enabled using the example operation shown in FIG. 44. In this example, the assumption is that legacy STAs, if present, require only limited resources. The AP transmits a Beacon, establishing a long CFP 4410 and a short CP 4420. A Beacon 4210 is followed by any broadcast/multicast messages for legacy STAs. Then SCAPs 4100 are scheduled back-to-back. This mode of operation also provides optimized power management, as the STAs need to awake periodically to listen to SCHED messages and may sleep for the SCAP interval if not scheduled in the current SCAP.

Protected contention-based access for MIMO STAs is provided through the FRACH or MIMO EDCA periods included in the Scheduled Access Period 4130 of the SCAP 4100. Legacy STAs may obtain contention-based access to the medium during the CP 4420.

Consecutive scheduled transmissions from the AP may be scheduled immediately following transmission of the SCHED frame. The SCHED frame may be transmitted with a preamble. Subsequent scheduled AP transmissions may be transmitted without a preamble (an indicator of whether or not a preamble is included may be transmitted). An example PLCP preamble is detailed further below. Scheduled STA transmissions will begin with a preamble in the example embodiment.

Error Recovery

The AP may use various procedures for recovery from SCHED receive errors. For example, if a STA is unable to decode a SCHED message, it will not be able to utilize its TXOP. If a scheduled TXOP does not begin at the assigned start time, the AP may initiate recovery by transmitting at a PIFS after the start of the unused scheduled TXOP. The AP may use the period of the unused scheduled TXOP as a CAP. During the CAP, the AP may transmit to one or more STAs or Poll a STA. The Poll may be to the STA that missed the scheduled TXOP or another STA. The CAP is terminated prior to the next scheduled TXOP.

The same procedures may also be used when a scheduled TXOP terminates early. The AP may initiate recovery by transmitting at a PIFS after the end of the last transmission in the scheduled TXOP. The AP may use the unused period of a scheduled TXOP as a CAP, as just described.

Protected Contention

As described above, a SCAP may also contain a portion dedicated to FRACH transmissions and/or a portion where MIMO STAs may use EDCA procedures. These contention-based access periods may be protected by the NAV set for the SCAP.

Protected contention complements low latency scheduled operation by permitting STAs to indicate TXOP requests to assist the AP in scheduling. In the protected EDCA period, MIMO OFDM STAs may transmit frames using EDCA based access (protected from contention with legacy STAs). Using legacy techniques, STAs may indicate TXOP duration request or buffer status in the 802.11e QoS Control field in the MAC Header. However, the FRACH is a more efficient means of providing the same function. During the FRACH period, STAs may use slotted Aloha like contention to access the channel in fixed size FRACH slots. The FRACH PPDU may include the TXOP duration request.

In the example embodiment, MIMO frame transmissions use the MIMO PLCP Header, detailed below. Since legacy 802.11b, 802.11a, and 802.11g STAs are able to decode only the SIGNAL1 field of the MIMO PLCP header (detailed with respect to FIG. 50, below), in the presence of non-MIMO STAs, MIMO frames must be transmitted with protection. When both legacy and MIMO STAs are present, STAs using EDCA access procedures may use a legacy RTS/CTS sequence for protection. Legacy RTS/CTS refers to the transmission of RTS/CTS frames using legacy preamble, PLCP header and MAC frame formats.

MIMO transmissions may also utilize the protection mechanisms provided by the 802.11e HCCA. Thus, transmissions from the AP to STAs, polled transmissions from STAs to the AP, or from a STA to another STA (using the Direct Link Protocol) may be provided protection using the Controlled Access Period (CAP).

The AP may also use legacy CTS-to-Self for protection of the MIMO Scheduled Access Period (SCAP) from legacy STAs.

When an AP determines that all STAs present in the BSS are capable of decoding the MIMO PLCP header, it indicates this in a MIMO capabilities element in the Beacon. This is referred to as a MIMO BSS.

In a MIMO BSS, under both EDCA and HCCA, frame transmissions use the MIMO PLCP header and MIMO OFDM Training symbols according to MIMO OFDM Training symbols aging rules. Transmissions in the MIMO BSS use the MIMO PLCP.

Reduced Inter-Frame Spacing

Various techniques for generally reducing Inter-Frame Spacing are detailed above. Illustrated here are several examples of reducing inter-frame spacing in this example embodiment. For scheduled transmissions, the start time of the TXOP is indicated in the SCHED message. The transmitting STA may begin its scheduled TXOP at the precise start time indicated in the SCHED message without determining that the medium is idle. As described above, consecutive scheduled AP transmissions during a SCAP are transmitted with no minimum IFS.

In the example embodiment, consecutive scheduled STA transmissions (from different STAs) are transmitted with an IFS of at least Guard IFS (GIFS). The default value of GIFS is 800 ns. A larger value may be chosen up to the value of Burst IFS (BIFS) defined next. The value of GIFS may be indicated in the ACF capabilities element, described above. Alternate embodiments may employ any values for GIFS and BIFS.

Consecutive MIMO OFDM PPDU transmissions from the same STA (TXOP bursting) are separated by a BIFS. When operating in the 2.4 GHz band, the BIFS is equal to the 10 μs and the MIMO OFDM PPDU does not include the 6 μs OFDM signal extension. When operating in the 5 GHz band, the BIFS is 10 μs. In an alternate embodiment, BIFS may be set to a smaller or larger value, including 0. To allow the receiving STA Automatic Gain Control (AGC) to switch between transmissions, a gap larger than 0 may be used when the transmitting STA transmit power is changed.

Frames that require an immediate response from the receiving STA are not transmitted using a MIMO OFDM PPDU. Instead, they are transmitted using the underlying legacy PPDU, i.e. Clause 19 in the 2.4 GHz band or Clause 17 in the 5 GHz band. Some examples of how legacy and MIMO OFDM PPDUs are multiplexed on the medium are shown below.

First, consider a legacy RTS/CTS followed by MIMO OFDM PPDU bursting. The transmission sequence is as follows: Legacy RTS-SIFS-Legacy CTS-SIFS-MIMO OFDM PPDU-BIFS-MIMO OFDM PPDU. In 2.4 GHz, the legacy RTS or CTS PPDU uses OFDM signal extension and the SIFS is 10 μs. In 5 GHz, there is no OFDM extension but the SIFS is 16 μs.

Second, consider an EDCA TXOP using MIMO OFDM PPDU. The transmission sequence is as follows: MIMO OFDM PPDU-BIFS-Legacy BlockAckRequest-SIFS-ACK. The EDCA TXOP is obtained using EDCA procedures for the appropriate Access Class (AC). As detailed above, EDCA defines access classes that may use different parameters per AC, such as AIFS[AC], CWmin[AC], and CWmax[AC]. The Legacy BlockAckRequest is transmitted with either signal extension or 16 μs SIFS. If the BlockAckRequest is transmitted in the aggregate frame within the MIMO OFDM PPDU, there is no ACK.

Third, consider consecutive scheduled TXOPs. The transmission sequence is as follows: STA A MIMO OFDM PPDU-GIFS-STA B MIMO OFDM PPDU. There may be an idle period after the transmission of the STA A MIMO OFDM PPDU if the PPDU transmission is shorter than the assigned maximum permitted TXOP time.

As described above, decoding and demodulation of coded OFDM transmissions imposes additional processing requirements at the receiving STA. To accommodate this, 802.11a and 802.11g allow additional time for the receiving STA before the ACK must be transmitted. In 802.11a, the SIFS time is set to 16 μs. In 802.11g the SIFS time is set to 10 μs but an additional 6 μs OFDM signal extension is introduced.

Since decoding and demodulation of MIMO OFDM transmissions may impose even more processing burden, following the same logic, an embodiment may be designed to increase the SIFS or OFDM signal extension, leading to further reduction in efficiency. In the example embodiment, by extending the Block ACK and Delayed Block Ack mechanisms of 802.11e, the requirement of immediate ACK for all MIMO OFDM transmissions is eliminated. Instead of increasing the SIFS or the signal extension, the signal extension is eliminated, and for many situations the required inter-frame spacing between consecutive transmissions is reduced or eliminated, leading to greater efficiency.

SCHED Message

Figure 45:
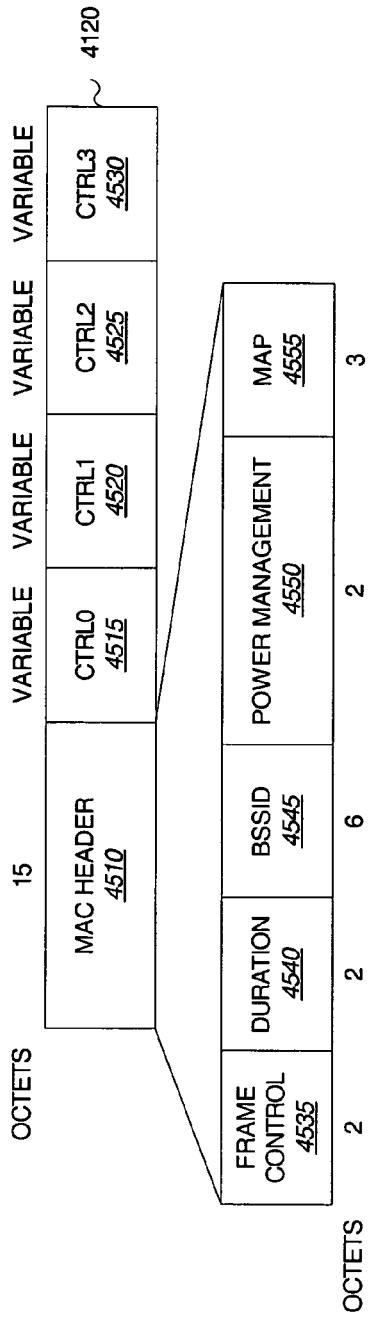
FIG. 45 illustrates an example SCHED message.

FIG. 45 illustrates the SCHED message, introduced above with respect to FIG. 41, and detailed further below. The SCHED message 4120 is a multiple poll message that assigns one or more AP-STA, STA-AP and STA-STA TXOPs for the duration of a Scheduled Access Period (SCAP). Use of the SCHED message permits reduced polling and contention overhead, as well as eliminates unnecessary IFS.

The SCHED message 4120 defines the schedule for the SCAP. SCHED message 4120 comprises a MAC Header 4510 (15 octets in the example embodiment). In the example embodiment, each of the CTRL0, CTRL1, CTRL2 and CTRL3 segments (referred to generically herein as CTRLJ, where J may be 0 to 3 to illustrate segments 4515-4530, respectively) are of variable length and may be transmitted at 6, 12, 18 and 24 Mbps, respectively, when present.

The example MAC header 4510 comprises Frame Control 4535 (2 octets), Duration 4540 (2 octets), BSSID 4545 (6 octets), Power Management 4550 (2 octets), and MAP 4555 (3 octets). Bits 13-0 of the Duration field 4540 specify the length of the SCAP in microseconds. The Duration field 4540 is used by STAs capable of MIMO OFDM transmissions to set the NAV for the duration of the SCAP. When legacy STAs are present in the BSS, the AP may use other means to protect the SCAP, e.g. a legacy CTS-to-Self. In the example embodiment, the maximum value of the SCAP is 4 ms. The BSSID field 4545 identifies the AP.

Figure 46:
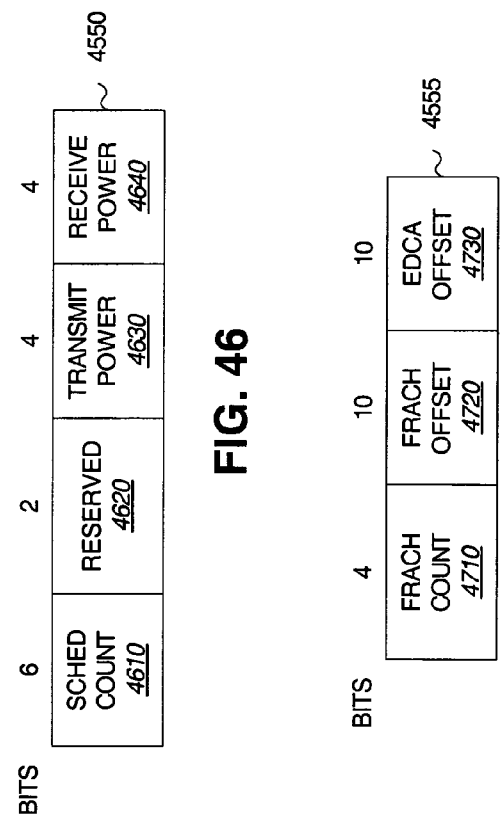
FIG. 46 depicts an example Power Management field.

The Power Management field 4550 is shown in FIG. 46. Power Management 4550 comprises SCHED Count 4610, a reserved field 4620 (2 bits), Transmit Power 4630, and Receive Power 4640. The AP transmit power and AP receive power are as indicated in the Power Management field and STA receive power level is measured at the STA.

SCHED Count is a field that is incremented at each SCHED transmission (6 bits in this example). The SCHED Count is reset at each Beacon transmission. SCHED Count may be used for various purposes. As an example, a power-saving feature using SCHED Count is described below.

The Transmit Power field 4630 represents the transmit power level being used by the AP. In the example embodiment, the 4-bit field is encoded as follows: The value represents the number of 4 dB steps that the transmit power level is below the Maximum Transmit Power Level (in dBm) for that channel as indicated in an information element of the Beacon.

The Receive Power field 4640 represents the receive power level expected at the AP. In the example embodiment, the 4-bit field is encoded as follows: The value represents the number of 4 dB steps that the receive power level is above the minimum Receiver Sensitivity Level (−82 dBm). Based on the received power level at a STA, a STA may compute its transmit power level as follows: STA Transmit Power (dBm)= AP Transmit Power (dBm)+AP Receive Power (dBm)−STA Receive Power (dBm).

In the example embodiment, during scheduled STA-STA transmissions, the control segment is transmitted at a power level that may be decoded at both the AP as well as the receiving STA. A power control report from the AP or the Power Management field 4550 in the SCHED frame permits the STA to determine the transmit power level required so that the control segment may be decoded at the AP. This general aspect is detailed above with respect to FIG. 22. For a scheduled STA-STA transmission, when the power required to decode at the AP is different than the power required to decode at the receiving STA, the PPDU is transmitted at the higher of the two power levels.

Figure 47:
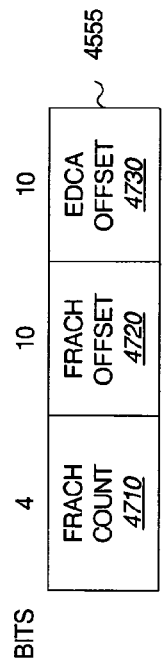
FIG. 47 depicts an example MAP field.

The MAP field 4555, shown in FIG. 47, specifies the presence and duration of protected contention based access periods during the SCAP. MAP field 4555 comprises FRACH Count 4710, FRACH Offset 4720, and EDCA Offset 4730. The example FRACH Count 4710 (4 bits) is the number of FRACH slots scheduled starting at the FRACH Offset 4720 (10 bits). Each FRACH slot is 28 μs. An FRACH Count value of '0' indicates that there is no FRACH period in the current Scheduled Access Period.

The EDCA Offset 4730 is the start of the protected EDCA period. The example EDCA Offset 4730 is 10 bits. Both the FRACH Offset 4720 and the EDCA Offset 4730 are in units of 4 μs starting from the beginning of the SCHED frame transmission.

The SCHED message 4120 is transmitted as a special SCHED PPDU 5100 (Type 0010), detailed further below with respect to FIG. 51. The presence within SCHED message 4120 and length of the CTRL0 4515, CTRL1 4520, CTRL2 4525, and CTRL3 4530 segments are indicated in the SIGNAL field (5120 and 5140) of the PLCP Header of the SCHED PPDU 5100.

Figure 48:
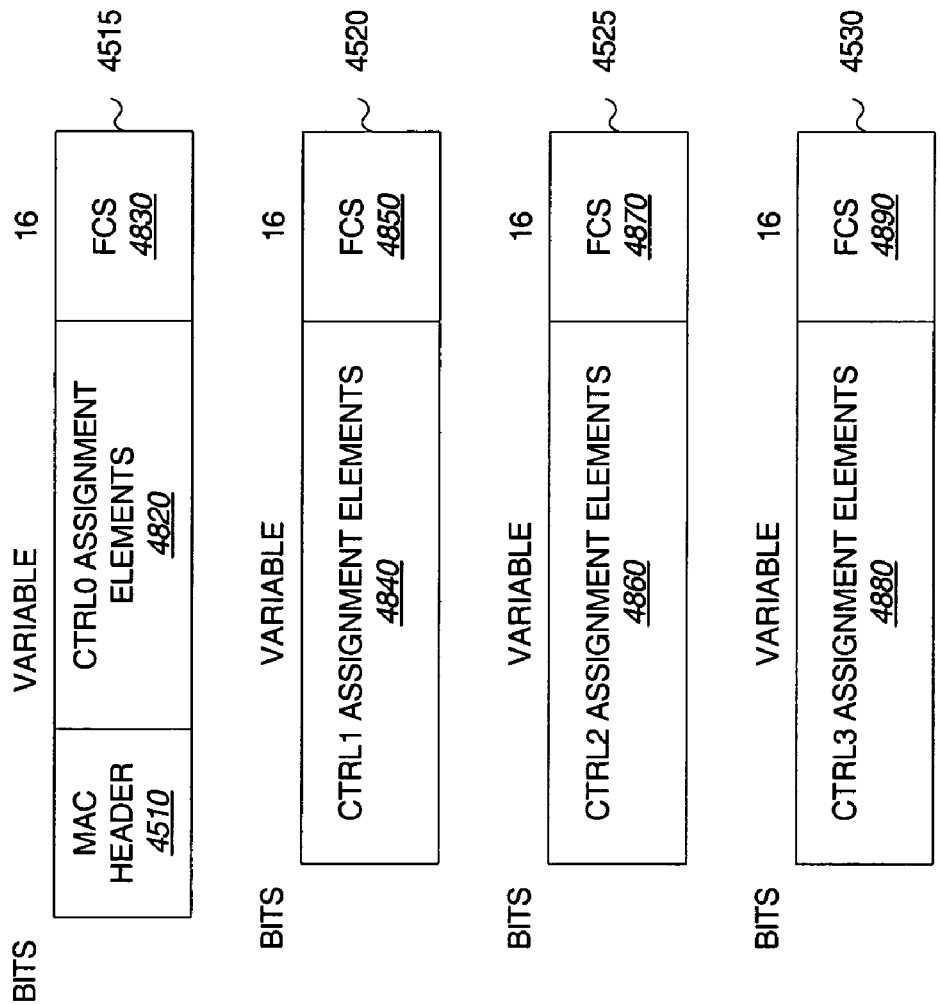
FIG. 48 illustrates example SCHED control frames for TXOP assignment.

FIG. 48 illustrates SCHED control frames for TXOP assignment. Each of the CTRL0 4515, CTRL1 4520, CTRL2 4525, and CTRL3 4530 segments are of variable length and each comprises zero or more assignment elements (4820, 4840, 4860, and 4880, respectively). A 16-bit FCS (4830, 4850, 4870, and 4890, respectively) and 6 tail bits (not shown) are added per CTRLJ segment. For the CTRL0 segment 4515 the FCS is computed over the MAC Header 4510 and any CTRL0 assignment elements 4820 (thus MAC Header is shown prepended to CTRL0 4515 in FIG. 48). In the example embodiment, the FCS 4830 for CTRL0 4515 is included even if no assignment elements are included in the CTRL0 segment.

As detailed herein, the AP transmits assignments for AP-STA, STA-AP and STA-STA transmissions in the SCHED frame. Assignment elements to different STAs are transmitted in a CTRLJ segment as indicated by the STA in the SCHED Rate field of the PLCP header of its transmissions. Note that CTRL0 through CTRL3 correspond to decreasing robustness. Each STA begins decoding the PLCP Header of the SCHED PPDU. The SIGNAL field indicates the presence and length of CTRL0, CTRL1, CTRL2 and CTRL3 segments in the SCHED PPDU. The STA receiver begins with decoding the MAC Header and CTRL0 segment, decoding each assignment element until the FCS, and it continues to subsequently decode CTRL1, CTRL2 and CTRL3, stopping at the CTRlJ segment whose FCS it is unable to verify.

Five types of assignment elements are defined as shown in Table 3. A number of assignment elements may be packed into each CTRLJ segment. Each assignment element specifies the transmitting STA Access ID (AID), the receiving STA AID, the start time of the scheduled TXOP and the maximum permitted length of the scheduled TXOP.

TABLE 3

Assignment Element Types

| Type (3 bits) | Assignment Element Type | Fields (Lengths in bits) | | Total Length in bits |
|---|---|---|---|---|
| 000 | Simplex AP-STA | Preamble Present | (1) | 40 |
| | | AID | (16) | |
| | | Start Offset | (10) | |
| | | TXOP Duration | (10) | |
| 001 | Simplex STA-AP | AID | (16) | 39 |
| | | Start Offset | (10) | |
| | | TXOP Duration | (10) | |
| 010 | Duplex AP-STA | Preamble Present | (1) | 60 |
| | | AID | (16) | |
| | | AP Start Offset | (10) | |
| | | AP TXOP Duration | (10) | |
| | | STA Start Offset | (10) | |
| | | STA TXOP Duration | (10) | |

TABLE 3-continued

Assignment Element Types

| Type (3 bits) | Assignment Element Type | Fields (Lengths in bits) | | Total Length in bits |
|---|---|---|---|---|
| 011 | Simplex STA-STA | Transmit AID | (16) | 55 |
| | | Receive AID | (16) | |
| | | Start Offset | (10) | |
| | | Max PPDU Size | (10) | |
| 100 | Duplex STA-STA | AID 1 | (16) | 75 |
| | | AID 2 | (16) | |
| | | STA 1 Start Offset | (10) | |
| | | STA 1 Max PPDU Size | (10) | |
| | | STA 2 Start Offset | (10) | |
| | | STA 2 Max PPDU Size | (10) | |

The preamble may be eliminated in consecutive transmissions from the AP. The Preamble Present bit is set to 0 if the AP will not transmit a preamble for a scheduled AP transmission. An example benefit of preamble elimination is when the AP has low bandwidth, low latency flows to several STAs, such as in a BSS with many Voice over IP (VoIP) flows. Therefore, the SCHED frame permits the aggregation of transmissions from the AP to several receiving STAs (i.e. PPDU aggregation, described above). Frame Aggregation, as defined above, permits the aggregation of frames to one receiving STA.

The Start Offset field is in multiples of 4 μs referenced from the start time of the SCHED message preamble. The AID is the Access ID of the assigned STA(s).

For all assignment element types except scheduled STA-STA transmissions, the TXOP Duration field is the maximum permitted length of the scheduled TXOP in multiples of 4 μs. The actual PPDU Size of the transmitted PPDU is indicated in the SIGNAL1 field of the PPDU (detailed further below).

For scheduled STA-STA transmissions (Assignment Element Types 011 and 100), the Max PPDU Size field is also the maximum permitted length of the scheduled TXOP in multiples of 4 μs, however additional rules may apply. In the example embodiment, for scheduled STA-STA transmissions, the TXOP contains only one PPDU. The receiving STA uses the Max PPDU Size indicated in the assignment element to determine the number of OFDM symbols in the PPDU (since the PPDU Size field is replaced by a Request field in the SIGNAL1, detailed below with respect to FIG. 51). If the STA-STA flow uses OFDM symbols with the standard Guard Interval (GI), the receiving STA sets the PPDU Size for the scheduled TXOP to the Max PPDU Size indicated in the assignment element. If the STA-STA flow uses OFDM symbols with shortened GI, the receiving STA determines the PPDU Size by scaling up the Max PPDU Size field by a factor of 10/9 and rounding down. The transmitting STA may transmit a PPDU shorter than the assigned Max PPDU Size. The PPDU Size does not provide the length of the aggregated MAC frame to the receiver. The length of the encapsulated frames is included in the Aggregation header of each MAC frame.

Inclusion of the transmitting and receiving STA in the assignment elements permits power saving at STAs that are not scheduled to transmit or receive during the SCAP. Recall the SCHED Count field introduced above. Each assignment scheduled by the SCHED message specifies the transmitting STA AID, the receiving STA AID, the start time of the scheduled TXOP, and the maximum permitted length of the scheduled TXOP. The SCHED Count is incremented at each SCHED transmission and is reset at each Beacon transmission. STAs may indicate a power-save operation to the AP, and thus are provided specific SCHED Count values during which they may be assigned scheduled transmit or receive TXOPs by the AP. STAs may then wake up periodically only to listen for SCHED messages with an appropriate SCHED Count.

PPDU Formats

Figure 49:
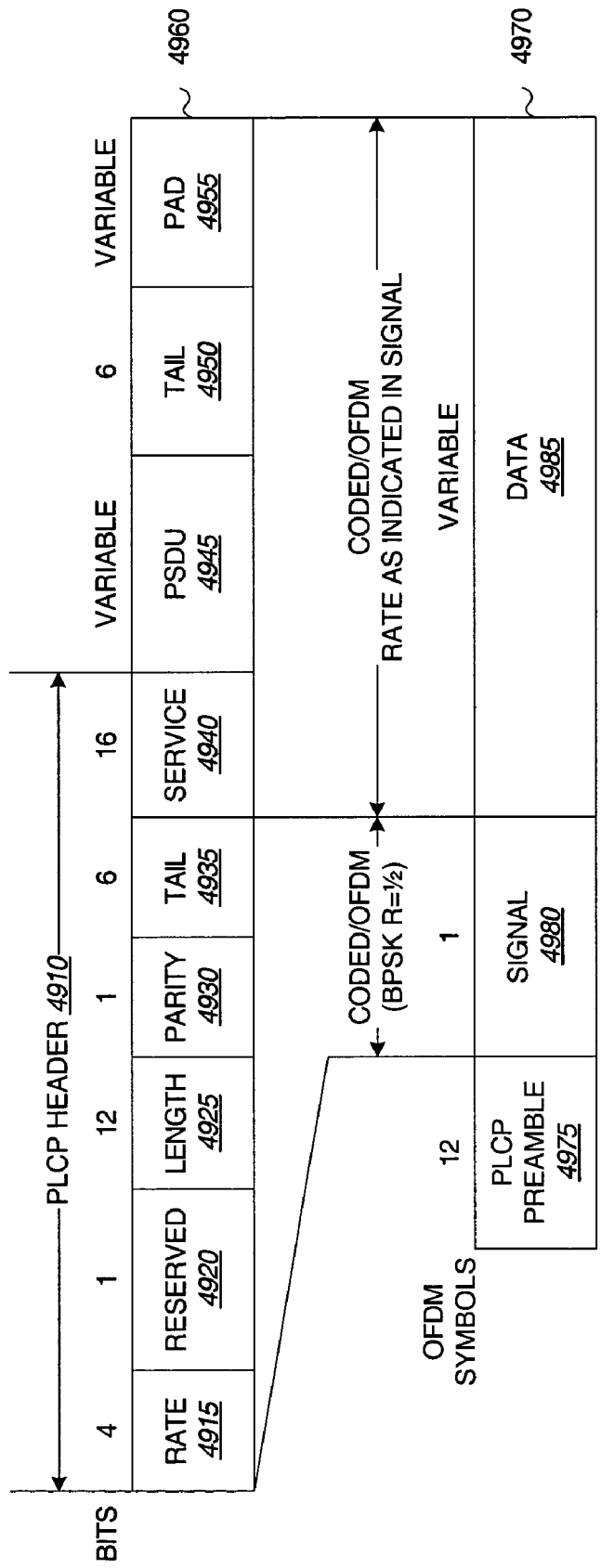
FIG. 49 depicts a legacy 802.11 PPDU.

FIG. 49 depicts a legacy 802.11 PPDU 4970, comprising a PLCP preamble 4975 (12 OFSM symbols), a PLCP header 4910, a variable length PSDU 4945, a 6-bit tail 4950, and variable length pad 4955. A portion 4960 of PPDU 4970 comprises a SIGNAL field (1 OFDM symbol) transmitted using BPSK at rate=1/2, and a variable length data field 4985, transmitted with the modulation format and rate indicated in SIGNAL 4980. PLCP header 4910 comprises SIGNAL 4980 and 16-bit Service field 4940 (which is included in DATA 4985, and transmitted according to its format). SIGNAL field 4980 comprises Rate 4915 (4 bits), reserved field 4920 (1 bit), Length 4925 (12 bits), Parity bit 4930, and Tail 4935 (6 bits).

The extended SIGNAL fields (detailed below) in the example PLCP Header (detailed below) is backward compatible with the SIGNAL field 4980 of legacy 802.11. Unused values of the RATE field 4915 in legacy SIGNAL field 4980 are set to define new PPDU types (detailed below).

Several new PPDU types are introduced. For backward compatibility with legacy STAs, the RATE field in the SIGNAL field of the PLCP Header is modified to a RATE/Type field. Unused values of RATE are designated as PPDU Type. The PPDU Type also indicates the presence and length of a SIGNAL field extension designated SIGNAL2. New values of the RATE/Type field are defined in Table 4. These values of the RATE/Type field are undefined for legacy STAs. Therefore, legacy STAs will abandon decoding of the PPDU after successfully decoding the SIGNAL1 field and finding an undefined value in the RATE field.

Alternately, the Reserved bit in the legacy SIGNAL field may be set to '1' to indicate a MIMO OFDM transmission to a new class STA. Receiving STAs may ignore the Reserved bit and continue to attempt to decode the SIGNAL field and the remaining transmission.

The receiver is able to determine the length of the SIGNAL2 field based on the PPDU Type. The FRACH PPDU appears only in a designated portion of the SCAP and needs to be decoded only by the AP.

TABLE 4

MIMO PPDU Types

| RATE/Type (4 bits) | MIMO PPDU | SIGNAL2 Field Length (OFDM Symbols) |
|---|---|---|
| 0000 | MIMO BSS IBSS or MIMO AP transmission (except SCHED PPDU). | 1 |
| 0010 | MIMO BSS SCHED PPDU | 1 |
| 0100 | MIMO BSS FRACH PPDU | 2 |

Figure 50:
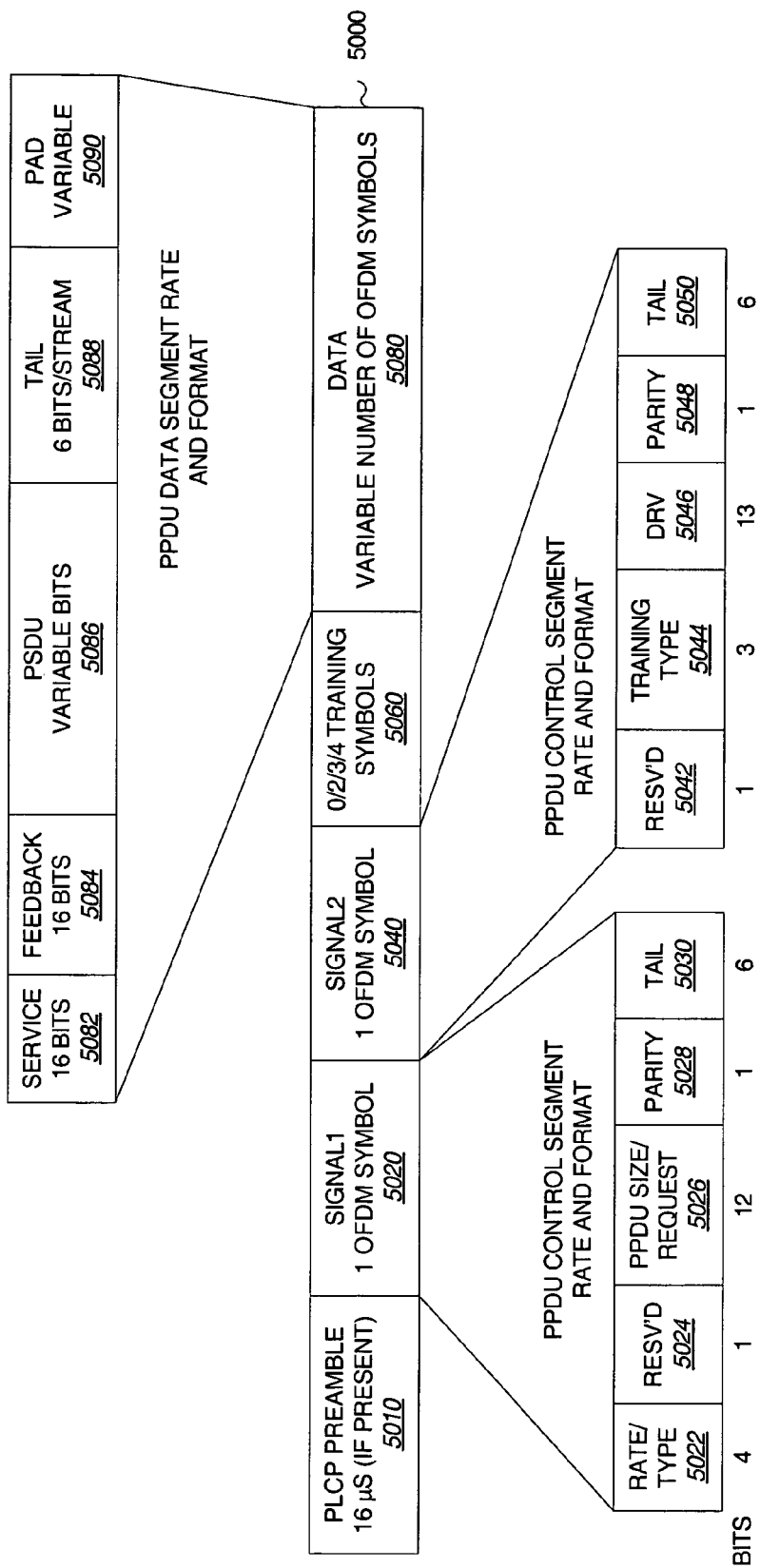
FIG. 50 depicts an example MIMO PPDU format for data transmissions.

FIG. 50 depicts MIMO PPDU format 5000 for data transmissions. PPDU 5000 is referred to as PPDU Type 0000. PPDU 5000 comprises a PLCP preamble 5010, SIGNAL 1 5020 (1 OFDM symbol), SIGNAL 2 5040 (1 OFDM symbol), Training Symbols 5060 (0, 2, 3, or 4 symbols), and a variable length Data field 5080. PLCP preamble 5010, when present, is 16 μs in the example embodiment. SIGNAL 1 5020 and SIGNAL 2 5040 are transmitted using the PPDU control segment rate and modulation format. Data 5080 comprises Service 5082 (16 bits), Feedback 5084 (16 bits), a variable length PSDU 5086, Tail 5088 (6 bits per stream) where a separate convolutional channel code is applied to each stream, and variable length Pad 5090. Data 5080 is transmitted using the PPDU data segment rate and modulation format.

The MIMO PLCP header for PPDU Type 0000 comprises the SIGNAL (including SIGNAL1 5020 and SIGNAL2 5040), SERVICE 5082 and FEEDBACK 5084 fields. The SERVICE field is unchanged from legacy 802.11, and is transmitted using the data segment rate and format.

The FEEDBACK field 5084 is transmitted using the data segment rate and format. The FEEDBACK field comprises the ES field (1 bit), the Data Rate Vector Feedback (DRVF) field (13 bits), and a Power Control field (2 bits).

The ES field indicates the preferred steering method. In the example embodiment, Eigenvector Steering (ES) is selected when the ES bit is set, and Spatial Spreading (SS) is selected otherwise.

The Data Rate Vector Feedback (DRVF) field provides feedback to the peer station regarding the sustainable rate on each of up to four spatial modes.

Explicit rate feedback allows stations to quickly and accurately maximize their transmission rates, dramatically improving efficiency of the system. Low latency feedback is desirable. However, feedback opportunities need not be synchronous. Transmission opportunities may be obtained in any manner, such as contention-based (i.e. EDCA), polled (i.e. HCF), or scheduled (i.e. ACF). Therefore, variable amounts of time may pass between transmission opportunities and rate feedback. Based on the age of the rate feedback, the transmitter may apply a back-off to determine the transmission rate.

The PPDU data segment rate adaptation for transmissions from STA A to STA B relies on feedback provided by STA B to STA A (described earlier, see FIG. 24, for example). For either ES or SS mode of operation, each time STA B receives MIMO OFDM Training Symbols from the STA A, it estimates the data rates that can be achieved on each spatial stream. In any subsequent transmission from STA B to STA A, STA B includes this estimate in the DRVF field of FEEDBACK 5084. The DRVF field is transmitted at the data segment 5080 rate.

When transmitting to STA B, STA A determines what transmission rates to use based on the DRVF it received from STA B, with an optional back-off as necessary to account for delays. The SIGNAL field (detailed below) contains the 13-bit DRV field 5046 that allows the receiving STA B to decode the frame transmitted from STA A. The DRV 5046 is transmitted at the control segment rate.

The DRVF field is encoded comprising a STR field (4 bits), an R2 field (3 bits), an R3 field (3 bits), and an R4 field (3 bits). The STR field indicates the Rate for Stream 1. This field is coded as STR Value shown in Table 5. R2 indicates the difference between the STR Value for Stream 1 and the STR Value for Stream 2. An R2 value of "111" indicates that Stream 2 is off. R3 indicates the difference between the STR Value for Stream 2 and the STR Value for Stream 3. An R3 value of "111" indicates that Stream 3 is off. If R2="111", then R3 is set to "111". R4 indicates the difference between the STR Value for Stream 3 and the STR Value for Stream 4. An R4 value of "111" indicates that Stream 4 is off. If R3="111" then R4 is set to "111".

When ES=0, i.e. spatial spreading, an alternate encoding of the DRVF is as follows: Number of Streams (2 bits), Rate per Stream (4 bits). The Rate per Stream field is coded as STR Value above. The remaining 7 bits are Reserved.

TABLE 5

STR Encoding

| STR Value | Coding Rate | Modulation Format | Bits/symbol per Stream |
|---|---|---|---|
| 0000 | 1/2 | BPSK | 0.5 |
| 0001 | 3/4 | BPSK | 0.75 |
| 0010 | 1/2 | QPSK | 1.0 |
| 0011 | 3/4 | QPSK | 1.5 |
| 0100 | 1/2 | 16 QAM | 2.0 |
| 0101 | 5/8 | 16 QAM | 2.5 |
| 0110 | 3/4 | 16 QAM | 3.0 |
| 0111 | 7/12 | 64 QAM | 3.5 |
| 1000 | 2/3 | 64 QAM | 4.0 |
| 1001 | 3/4 | 64 QAM | 4.5 |
| 1010 | 5/6 | 64 QAM | 5.0 |
| 1011 | 5/8 | 256 QAM | 5.0 |
| 1100 | 3/4 | 256 QAM | 6.0 |
| 1101 | 7/8 | 256 QAM | 7.0 |

In addition to the DRVF, STA B also provides power control feedback to the transmitting STA A. This feedback is included in the Power Control field and is also transmitted at the data segment rate. This field is 2 bits and indicates either to increase or decrease power or to leave the power level unchanged. The resultant transmit power level is designated the Data Segment Transmit Power level.

Example Power Control field values are illustrated in Table 6. Alternate embodiments may deploy power control fields of various sizes, and with alternate power adjustment values.

TABLE 6

Power Control Field Values

| Power Control Field | Meaning |
|---|---|
| 00 | No Change |
| 01 | Increase power by 1 dB |
| 10 | Decrease power by 1 dB |
| 11 | Reserved |

The transport power level remains constant for the entire PPDU. When the Data Segment Transmit Power Level and the Open Loop STA Transmit Power (i.e. the power level required for the AP to decode the transmission, detailed above) are different, the PPDU is transmitted at the maximum of the two power levels. That is, PPDU Transmit Power Level is the maximum of the Open Loop STA Transmit Power (dBm) and the Data Segment Transmit Power (dBm).

In the example embodiment, the Power Control field is set to "00" in the first frame of any frame exchange sequence. In subsequent frames, it indicates the increase or decrease of power in 1 dB steps. The receiving STA will use this feedback information in all subsequent frame transmissions to that STA.

SIGNAL 1 5020 comprises RATE/Type field 5022 (4 bits), 1 Reserved Bit 5024, PPDU Size/Request 5026 (12 bits), Parity bit 5028, and a 6-bit Tail 5030. The SIGNAL 1 field 5020 is transmitted using the control segment rate and format (6 Mbit/s, in the example embodiment). The RATE/Type field 5022 is set to 0000. The Reserved bit 5024 may be set to 0.

The PPDU Size/Request Field 5026 serves two functions, depending on the transmission mode. In contention-based STA transmissions and all AP transmissions, this field denotes the PPDU Size. In this first mode, Bit 1 indicates that the PPDU uses expanded OFDM symbols, Bit 2 indicates that the PPDU uses OFDM symbols with shortened GI and Bits 3-12 indicate the number of OFDM symbols.

In scheduled non-AP STA transmissions, PPDU Size/Request Field 5026 denotes Request. In this second mode, Bits 1-2 indicate the SCHED Rate. SCHED Rate indicates the highest numbered SCHED (0, 1, 2 or 3) field that may be used to transmit an assignment to the STA. During Training symbol transmissions from the AP, each non-AP STA estimates the rate at which it can robustly receive SCHED frame transmissions from the AP. In subsequent scheduled transmissions from the STA, this maximum permissible rate is included in the SCHED Rate field. This field is decoded by the AP. The AP uses this information to schedule subsequent TXOPs for the STA and determines the CTRIJ (0, 1, 2, or 3) for issuing those allocations to the STA.

In the second mode, Bits 3-4 indicate the QoS field, which identifies the fraction (in thirds) of the request that is for TC 0 or 1 (i.e. 0%, 33%, 67%, 100%). Bits 5-12 indicate the requested length of TXOP (in multiples of 16 μs, in the example embodiment).

The SIGNAL1 field 5020 is checked by 1 Parity bit 5028 and terminated with a 6-bit Tail 5030 for the convolutional encoder.

The presence and length of the SIGNAL2 field 5040 is indicated by the RATE/Type field 5022 in SIGNAL1 5020. The SIGNAL2 field 5040 is transmitted using the control segment rate and format. SIGNAL2 5040 comprises a Reserved bit 5042, Training Type 5044 (3 bits), Data Rate Vector (DRV) 5046 (13 bits), Parity bit 5048, and Tail 5050 (6 bits). The 3-bit Training Type field indicates the length and format of the MIMO OFDM Training symbols. Bits 1-2 indicate the number of MIMO OFDM Training Symbols 5060 (0, 2, 3 or 4 OFDM symbols). Bit 3 is the Training Type field: 0 indicates SS, 1 indicates ES. The DRV 5046 provides the rate for each of up to four spatial modes. The DRV 5046 is encoded in the same manner as DRVF (included in FEEDBACK 5084, detailed above). The SIGNAL2 field 5040 is checked by 1 Parity bit 5048 and terminated with a 6-bit Tail 5050 for the convolutional encoder.

Figure 51:
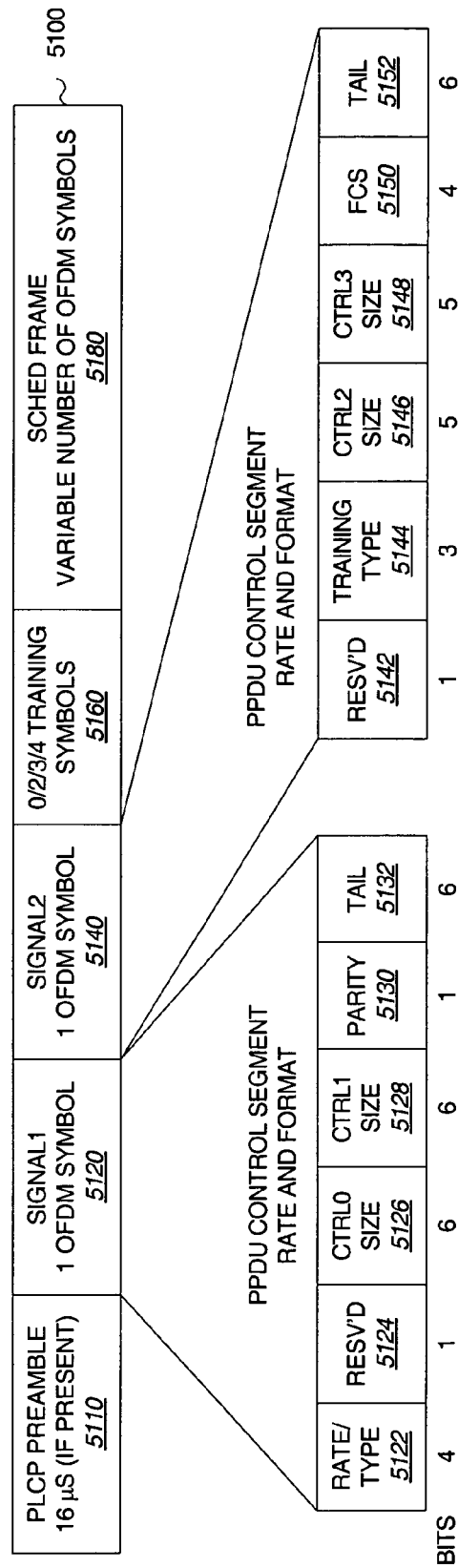
FIG. 51 depicts an example SCHED PPDU.

FIG. 51 depicts SCHED PPDU 5100 (Rate/Type=0010). SCHED PPDU 5100 comprises a PLCP preamble 5110, SIGNAL 1 5120 (1 OFDM symbol), SIGNAL 2 5140 (1 OFDM symbol), Training Symbols 5160 (0, 2, 3, or 4 symbols), and a variable length SCHED Frame 5180. PLCP preamble 5010, when present, is 16 μs in the example embodiment. SIGNAL 1 5020 and SIGNAL 2 5040 are transmitted using the PPDU control segment rate and modulation format. SCHED Frame 5180 may include various rates, as detailed above, with respect to the ACF description.

SIGNAL1 5120 comprises RATE/Type 5122 (4 bits), a Reserved bit 5124, CTRL0 Size 5126 (6 bits), CTRL1 Size 5128 (6 bits), Parity bit 5130, and Tail 5132 (6 bits). RATE/Type 5122 is set to 0010. The Reserved bit 5124 may be set to 0. CTRL0 Size 5126 indicates the length of the segment of the SCHED PPDU transmitted at the lowest rate (6 Mbps in this example). This segment includes the SERVICE field of the PLCP Header, the MAC Header and the CTRL0 segment 5126. The value is encoded in multiples of 4 μs, in this example. CTRL1 Size 5128 indicates the length of the segment of the SCHED PPDU transmitted at the next higher rate (12 Mbps in this example). The value is encoded in multiples of 4 μs, in this example. A CTRL1 Size of '0' indicates that the corresponding CTRL1 segment is not present in the SCHED PPDU. The SIGNAL1 field 5120 is checked by 1 Parity bit 5130 and terminated with a 6-bit Tail 5132 for the convolutional encoder.

SIGNAL2 5140 comprises a Reserved bit 5142, Training Type 5144 (3 bits), CTRL2 Size 5146 (5 bits), CTRL3 Size 5148 (5 bits), FCS 5150 (4 bits), and Tail 5152 (6 bits). The Reserved bit 5142 may be set to 0. Training Type 5144 is as specified for PPDU Type 0000 (Training Type 5044).

CTRL2 Size 5146 indicates the length of the segment of the SCHED PPDU transmitted at the next highest rate (18 Mbps in this example). The value is encoded in multiples of 4 μs, in this example. A CTRL2 Size of '0' indicates that the corresponding CTRL2 segment is not present in the SCHED PPDU. CTRL3 Size 5148 indicates the length of the segment of the SCHED PPDU transmitted at the highest rate (24 Mbps in this example). The value is encoded in multiples of 4 μs, in this example.

A CTRL2 Size of '0' indicates that the corresponding CTRL3 segment is not present in the SCHED PPDU.

FCS 5150 is computed over the entire SIGNAL1 and SIGNAL2 fields. The SIGNAL2 field 5152 is terminated with a 6-bit Tail 5152 for the convolutional encoder.

Figure 52:
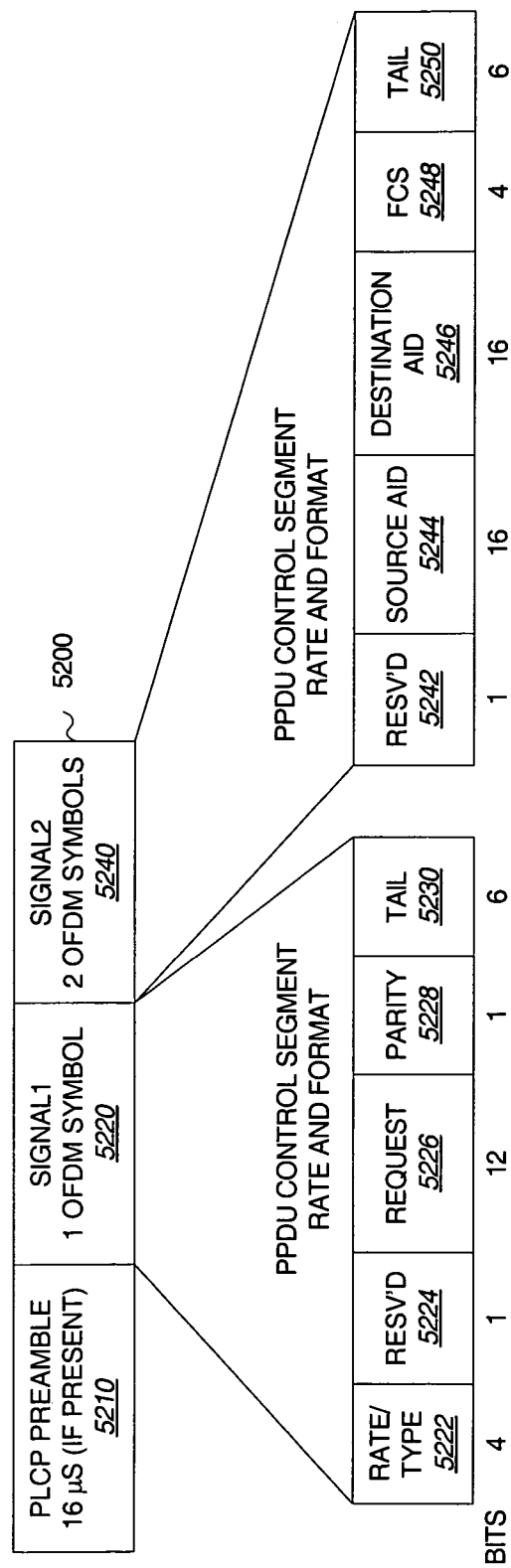
FIG. 52 depicts an example FRACH PPDU.

FIG. 52 depicts FRACH PPDU 5200 (Rate/Type=0100). FRACH PPDU 5200 comprises a PLCP preamble 5210, SIGNAL 1 5220 (1 OFDM symbol), and SIGNAL 2 5240 (2 OFDM symbols). PLCP preamble 5210, when present, is 16 As in the example embodiment. SIGNAL 1 5220 and SIGNAL 2 5240 are transmitted using the PPDU control segment rate and modulation format. The FRACH PPDU 5200 is transmitted by a STA during the FRACH period within the MIMO Scheduled Access Period. The FRACH period is established by and therefore known to the AP (as detailed above).

SIGNAL1 5220 comprises RATE/Type 5222 (4 bits), a Reserved bit 5224, Request 5226 (12 bits), Parity bit 5228, and Tail 5230 (6 bits). RATE/Type 5222 is set to 0100. The Reserved bit 5124 may be set to 0. The Request Field 5226 is as specified for PPDU Type 0000 (5000), detailed above. The SIGNAL1 field 5220 is checked by 1 Parity bit 5228 and terminated with a 6-bit Tail 5230 for the convolutional encoder.

SIGNAL2 5240 comprises a Reserved bit 5242, Source AID 5244 (16 bits), Destination AID 5246 (16 bits), FCS 5248 (4 bits), and Tail 5250 (6 bits). The Reserved bit 5242 may be set to 0. Source AID 5244 identifies the STA transmitting on the FRACH. Destination AID 5246 identifies the destination STA for which a TXOP is being requested. In the example embodiment, in the case where the destination is the AP, the value of the Destination AID field 5246 is set to 2048. A 4-bit FCS 5248 is computed over the entire SIGNAL1 and SIGNAL2 fields. A 6 bit Tail 5250 is added prior to convolutional encoding.

In the example embodiment, STAs may use slotted Aloha to access the channel and transmit the request message in the FRACH. If received successfully by the AP, the AP provides the requesting STA with a scheduled TXOP in a subsequent scheduled access period. The number of FRACH slots for the current scheduled access period is indicated in the SCHED message, N_FRACH.

The STA may also maintain a variable B_FRACH. Following a transmission on the FRACH, if the STA receives a TXOP assignment from the AP, it resets B_FRACH.

If the STA does not receive a TXOP assignment within a predetermnined number, FRACH RESPONSE, of SCHED transmissions from the AP, B_FRACH is incremented by 1 up to a maximum value of 7. The parameter FRACH RESPONSE is included in an ACF element of the Beacon. During any FRACH, the STA picks a FRACH slot with probability $(N\_FRACH)^{-1} * 2^{-B\_FRACH}$.

If no FRACH period is scheduled by the AP, MIMO STAs may contend during the protected contention period during the SCAP using EDCA rules.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Headings are included herein for reference and to aid in locating various sections. These headings are not intended to limit the scope of the concepts described with respect thereto. Such concepts may have applicability throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless communication system, comprising:
    means for accessing a shared medium with a first station using a contention-based procedure, during a first period, to transmit to a second station;
    means for accessing the shared medium with a third station in accordance with scheduled access, during a second period, to transmit to a fourth station, wherein the first period corresponds to a first transmission opportunity and the second period corresponds to a second transmission opportunity;
    means for receiving, at one or more of the first or third stations, a first beacon from an access point prior to the first transmission opportunity; and
    means for receiving, at one or more of the first or third stations, a second beacon from the access point after the second transmission opportunity, wherein the first and second periods occur within a beacon interval between the first and second beacons.

2. A method for communicating on a shared medium, comprising:
    accessing a shared medium with a first station using a contention-based procedure, during a first period, to transmit to a second station;
    accessing the shared medium with a third station in accordance with scheduled access, during a second period, to transmit to a fourth station, wherein the first period corresponds to a first transmission opportunity and the second period corresponds to a second transmission opportunity;
    receiving, at one or more of the first or third stations, a first beacon from an access point prior to the first transmission opportunity; and
    receiving, at one or more of the first or third stations, a second beacon from the access point after the second transmission opportunity, wherein the first and second periods occur within a beacon interval between the first and second beacons.

3. The method of claim 2, wherein the first station and the third station are the same station.

4. The method of claim 2, wherein the first station and the fourth station are the same station.

5. The method of claim 2, wherein the second station and the third station are the same station.

6. The method of claim 2, wherein the second station and the fourth station are the same station.

7. The method of claim 2, wherein the first period and the second period are adaptively coordinated within a scheduled frame.

8. The wireless communication system of claim 1, wherein the first period and the second period are adaptively coordinated within a scheduled frame.

9. The wireless communication system of claim 1, wherein the first station and the third station are the same station.

10. The wireless communication system of claim 1, wherein the first station and the fourth station are the same station.

11. The wireless communication system of claim 1, wherein the second station and the third station are the same station.

12. The wireless communication system of claim 1, wherein the second station and the fourth station are the same station.

13. The method of claim 2, further comprising:
receiving, at the third station, an indication that the second period is unavailable for contention-based access,
wherein the third station accesses the shared medium in accordance with scheduled access based on the received indication.

14. The method of claim 13, wherein the received indication is included within one or more of the first beacon or a Request To Send (RTS) frame.

15. The method of claim 2, wherein the third station accesses the shared medium via a Multiple Input Multiple Output (MIMO) transmission.

16. The method of claim 2, further comprising:
accessing the shared medium with a fifth station in a third transmission opportunity obtained via polled access.

17. A wireless communication system, comprising:
a first station configured to access a shared medium using a contention-based procedure, during a first period, to transmit to a second station; and
a third station configured to access the shared medium in accordance with scheduled access, during a second period, to transmit to a fourth station,
wherein the first period corresponds to a first transmission opportunity and the second period corresponds to a second transmission opportunity,
wherein one or more of the first or third stations receives a first beacon from an access point prior to the first transmission opportunity,
wherein one or more of the first or third stations receives a second beacon from the access point after the second transmission opportunity,
wherein the first and second periods occur within a beacon interval between the first and second beacons.

18. A non-transitory computer-readable storage medium containing instructions stored thereon, which, when executed by a wireless communication system, cause the wireless communication system to perform actions, the instructions comprising:
program code to access a shared medium with a first station using a contention-based procedure, during a first period, to transmit to a second station;
program code to access the shared medium with a third station in accordance with scheduled access, during a second period, to transmit to a fourth station, wherein the first period corresponds to a first transmission opportunity and the second period corresponds to a second transmission opportunity;
program code to receive, at one or more of the first or third stations, a first beacon from an access point prior to the first transmission opportunity; and
program code to receive, at one or more of the first or third stations, a second beacon from the access point after the second transmission opportunity, wherein the first and second periods occur within a beacon interval between the first and second beacons.

\* \* \* \* \*